United States Patent
Asenjo et al.

(10) Patent No.: US 10,984,677 B2
(45) Date of Patent: Apr. 20, 2021

(54) USING CLOUD-BASED DATA FOR INDUSTRIAL AUTOMATION SYSTEM TRAINING

(71) Applicant: Rockwell Automation Technologies, Inc., Mayfield Heights, OH (US)

(72) Inventors: Juan Asenjo, Timberlake, OH (US); John Strohmenger, Strongsville, OH (US); Stephen Nawalaniec, Southlake, TX (US); Bradford H. Hegrat, Montville, OH (US); Joseph A. Harkulich, Willoughby, OH (US); Jessica Lin Korpela, Milwaukee, WI (US); Jenifer Rydberg Wright, Renton, WA (US); Rainer Hessmer, Los Gatos, CA (US); John Dyck, Chardon, OH (US); Edward Alan Hill, Chagrin Falls, OH (US); Sal Conti, Olmsted Township, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 134 days.

(21) Appl. No.: 15/714,333

(22) Filed: Sep. 25, 2017

(65) Prior Publication Data
US 2018/0012510 A1   Jan. 11, 2018

Related U.S. Application Data

(63) Continuation of application No. 14/087,922, filed on Nov. 22, 2013, now Pat. No. 9,786,197.
(Continued)

(51) Int. Cl.
*G06Q 10/06* (2012.01)
*G06Q 10/10* (2012.01)
*G09B 19/18* (2006.01)

(52) U.S. Cl.
CPC ............. *G09B 19/18* (2013.01); *G06Q 10/06* (2013.01); *G06Q 10/1097* (2013.01)

(58) Field of Classification Search
None
See application file for complete search history.

(56) References Cited

U.S. PATENT DOCUMENTS

| 5,014,317 A | 5/1991 | Kita et al. |
| 5,122,948 A | 6/1992 | Zapolin |

(Continued)

FOREIGN PATENT DOCUMENTS

| CN | 1232553 A | 10/1999 |
| CN | 1529837 A | 9/2004 |

(Continued)

OTHER PUBLICATIONS

Office Action for U.S. Appl. No. 14/087,970 dated Feb. 12, 2018, 69 pages.

(Continued)

*Primary Examiner* — Sujay Koneru
(74) *Attorney, Agent, or Firm* — Amin, Turocy & Watson, LLP

(57) ABSTRACT

A cloud-based performance enhancement service captures and collects data relating to interactions of users with industrial automation systems of multiple industrial customers for storage and analysis on a cloud platform. The service employs a performance enhancement component that analyzes the data to facilitate determining correlations between certain user interactions and favorable performance of an industrial automation system, determining user interactions (Continued)

that are less favorable or unsafe, determining alternative actions that a user can take to achieve a same or similar preferred operational result, generating recommendations relating to the alternative actions, determining or designing components or techniques that can automate a preferred user action, determining improved user assignments in connection with the industrial automation system, and/or generating training modules or presentations based on preferred user actions that can be used to train users to more efficiently interact with an industrial automation system to achieve improved system performance.

20 Claims, 17 Drawing Sheets

Related U.S. Application Data

(60) Provisional application No. 61/821,639, filed on May 9, 2013.

(56) References Cited

U.S. PATENT DOCUMENTS

| | | | |
|---|---|---|---|
| 5,199,009 A | 3/1993 | Svast | |
| 5,598,572 A | 1/1997 | Tanikoshi et al. | |
| 5,611,059 A | 3/1997 | Benton et al. | |
| 5,612,869 A | 3/1997 | Letzt et al. | |
| 5,682,460 A | 10/1997 | Hyziak et al. | |
| 5,710,885 A | 1/1998 | Bondi | |
| 5,844,794 A | 12/1998 | Keeley | |
| 5,845,149 A | 12/1998 | Husted et al. | |
| 5,856,931 A | 1/1999 | McCasland | |
| 5,957,985 A | 9/1999 | Wong et al. | |
| 5,966,301 A | 10/1999 | Cook et al. | |
| 5,970,430 A | 10/1999 | Burns et al. | |
| 5,978,568 A | 11/1999 | Abraham et al. | |
| 6,167,337 A | 12/2000 | Haack et al. | |
| 6,175,770 B1 | 1/2001 | Bladow | |
| 6,175,801 B1 | 1/2001 | Millington | |
| 6,199,068 B1 | 3/2001 | Carpenter | |
| 6,279,113 B1 | 8/2001 | Vaidya | |
| 6,282,455 B1 | 8/2001 | Engdahl | |
| 6,324,607 B1 | 11/2001 | Korowitz et al. | |
| 6,381,502 B1 | 4/2002 | Rudder et al. | |
| 6,400,996 B1 | 6/2002 | Hoffberg et al. | |
| 6,412,032 B1 | 6/2002 | Neet et al. | |
| 6,437,692 B1 | 8/2002 | Petite et al. | |
| 6,457,024 B1 | 9/2002 | Felsentein et al. | |
| 6,463,338 B1 | 10/2002 | Neet | |
| 6,466,972 B1 | 10/2002 | Paul et al. | |
| 6,529,780 B1* | 3/2003 | Soergel | B21B 37/00 700/10 |
| 6,535,926 B1 | 3/2003 | Esker | |
| 6,578,005 B1 | 6/2003 | Lesaint et al. | |
| 6,624,388 B1 | 9/2003 | Blankenship et al. | |
| 6,640,145 B2 | 10/2003 | Hoffberg et al. | |
| 6,651,062 B2 | 11/2003 | Ghannam et al. | |
| 6,675,226 B1 | 1/2004 | Nair et al. | |
| 6,686,838 B1 | 2/2004 | Rezvani et al. | |
| 6,691,159 B1 | 2/2004 | Grewal et al. | |
| 6,705,229 B2 | 3/2004 | Frankenberger | |
| 6,708,074 B1 | 3/2004 | Chi et al. | |
| 6,708,385 B1 | 3/2004 | Lemelson | |
| 6,714,974 B1 | 3/2004 | Machida | |
| 6,728,262 B1 | 4/2004 | Woram | |
| 6,732,165 B1 | 5/2004 | Jennings, III | |
| 6,732,191 B1 | 5/2004 | Baker et al. | |
| 6,757,897 B1* | 6/2004 | Shi | G06F 9/4843 710/240 |
| 6,774,598 B1 | 8/2004 | Kohler et al. | |
| 6,801,920 B1 | 10/2004 | Wischinski | |
| 6,819,960 B1 | 11/2004 | McKelvey et al. | |
| 6,891,850 B1 | 5/2005 | Vandesteeg et al. | |
| 6,895,532 B2 | 5/2005 | Raynham | |
| 6,904,600 B1 | 6/2005 | James et al. | |
| 6,907,302 B2 | 6/2005 | Karbassi | |
| 6,920,502 B2 | 7/2005 | Araujo et al. | |
| 6,952,680 B1 | 10/2005 | Melby et al. | |
| 6,965,802 B2 | 11/2005 | Sexton | |
| 6,968,242 B1 | 11/2005 | Hwu et al. | |
| 6,970,913 B1 | 11/2005 | Albert et al. | |
| 6,982,953 B1 | 1/2006 | Swales | |
| 7,032,045 B2 | 4/2006 | Kostadinov | |
| 7,085,814 B1 | 8/2006 | Gandhi et al. | |
| 7,103,428 B2 | 9/2006 | Varone et al. | |
| 7,133,900 B1 | 11/2006 | Szeto | |
| 7,149,792 B1 | 12/2006 | Hansen et al. | |
| 7,151,966 B1 | 12/2006 | Baier et al. | |
| 7,203,560 B1 | 4/2007 | Wylie et al. | |
| 7,210,095 B1 | 4/2007 | Mor | |
| 7,233,830 B1 | 6/2007 | Callaghan et al. | |
| 7,242,009 B1 | 7/2007 | Wilson et al. | |
| 7,275,037 B2 | 9/2007 | Lauer | |
| 7,277,865 B1 | 10/2007 | Silverstone et al. | |
| 7,289,994 B2 | 10/2007 | Nixon et al. | |
| 7,298,275 B2 | 11/2007 | Brandt et al. | |
| 7,310,344 B1 | 12/2007 | Sue | |
| 7,383,155 B2 | 6/2008 | Rosam et al. | |
| 7,412,548 B2 | 8/2008 | Sichner | |
| 7,428,495 B2* | 9/2008 | Dhar | A61J 9/00 705/7.26 |
| 7,478,010 B2 | 1/2009 | Hashemian | |
| 7,480,728 B2 | 1/2009 | Evans | |
| 7,539,724 B1 | 5/2009 | Callaghan | |
| 7,734,590 B2 | 6/2010 | Chand et al. | |
| 7,827,122 B1 | 11/2010 | Campbell, Jr. et al. | |
| 7,831,317 B2 | 11/2010 | McGreevy et al. | |
| 8,150,959 B1 | 4/2012 | Bezdicek et al. | |
| 8,266,066 B1 | 9/2012 | Wezter et al. | |
| 8,353,012 B2 | 1/2013 | Del Real | |
| 8,392,845 B2 | 3/2013 | Cahill et al. | |
| 8,451,753 B2 | 5/2013 | Vanga et al. | |
| 8,468,272 B2 | 6/2013 | Giroti | |
| 8,686,871 B2 | 4/2014 | Jensen et al. | |
| 8,924,328 B1 | 12/2014 | Kozlovsky et al. | |
| 9,024,955 B2 | 5/2015 | Ramarao et al. | |
| 9,117,076 B2 | 8/2015 | Devost | |
| 9,438,648 B2 | 9/2016 | Asenjo et al. | |
| 9,507,807 B1 | 11/2016 | Florissi et al. | |
| 9,685,053 B2 | 6/2017 | Palmeri | |
| 9,690,669 B2 | 6/2017 | Bernal et al. | |
| 10,026,049 B2 | 7/2018 | Asenjo et al. | |
| 10,054,914 B2 | 8/2018 | Vartiainen et al. | |
| 2001/0035729 A1 | 11/2001 | Graiger et al. | |
| 2002/0004798 A1 | 1/2002 | Babula et al. | |
| 2002/0016839 A1 | 2/2002 | Smith | |
| 2002/0042756 A1 | 4/2002 | Kumar et al. | |
| 2002/0046239 A1 | 4/2002 | Stawikowski et al. | |
| 2002/0049833 A1 | 4/2002 | Kikinis | |
| 2002/0065898 A1 | 5/2002 | Leontiev et al. | |
| 2002/0068983 A1 | 6/2002 | Sexton | |
| 2002/0068984 A1 | 6/2002 | Alexander et al. | |
| 2002/0073236 A1 | 6/2002 | Helgeson et al. | |
| 2002/0077711 A1 | 6/2002 | Nixon et al. | |
| 2002/0078432 A1* | 6/2002 | Charisius | G06Q 10/06 717/102 |
| 2002/0082966 A1 | 6/2002 | O'Brien et al. | |
| 2002/0094588 A1 | 7/2002 | Fan et al. | |
| 2002/0096077 A1 | 7/2002 | Frankenberger | |
| 2002/0107904 A1 | 8/2002 | Talluri et al. | |
| 2002/0138378 A1 | 9/2002 | Leskuski | |
| 2002/0156872 A1 | 10/2002 | Brown | |
| 2002/0156926 A1 | 10/2002 | Batke et al. | |
| 2002/0161745 A1 | 10/2002 | Call | |
| 2002/0169993 A1 | 11/2002 | Woods et al. | |
| 2003/0004937 A1 | 1/2003 | Salmenkaita et al. | |
| 2003/0009253 A1 | 1/2003 | McIntyre et al. | |
| 2003/0009572 A1 | 1/2003 | Thurner | |
| 2003/0011467 A1 | 1/2003 | Suomela | |
| 2003/0014149 A1 | 1/2003 | Kreidler et al. | |
| 2003/0023336 A1 | 1/2003 | Kreidler et al. | |
| 2003/0033179 A1 | 2/2003 | Katz et al. | |

(56) References Cited

U.S. PATENT DOCUMENTS

| | | |
|---|---|---|
| 2003/0041089 A1 | 2/2003 | Mauro |
| 2003/0051074 A1 | 3/2003 | Edwards |
| 2003/0056224 A1 | 3/2003 | Stone |
| 2003/0084016 A1* | 5/2003 | Norgaard ............... G06Q 10/10 706/60 |
| 2003/0105535 A1 | 6/2003 | Rammler |
| 2003/0105585 A1 | 6/2003 | Ukita |
| 2003/0109942 A1 | 6/2003 | Yeh et al. |
| 2003/0120817 A1 | 6/2003 | Ott et al. |
| 2003/0150908 A1 | 8/2003 | Pokorny et al. |
| 2003/0156639 A1 | 8/2003 | Liang |
| 2003/0167238 A1 | 9/2003 | Zeif |
| 2003/0167449 A1 | 9/2003 | Warren et al. |
| 2003/0177169 A1 | 9/2003 | Nutt et al. |
| 2003/0177201 A1 | 9/2003 | Shen |
| 2003/0198188 A1 | 10/2003 | Castlebury et al. |
| 2003/0208545 A1 | 11/2003 | Eaton et al. |
| 2003/0217100 A1 | 11/2003 | Kronk |
| 2003/0224769 A1 | 12/2003 | Solve et al. |
| 2003/0236576 A1 | 12/2003 | Resnick et al. |
| 2004/0024572 A1 | 2/2004 | Pagnano et al. |
| 2004/0025173 A1 | 2/2004 | Levonai et al. |
| 2004/0032935 A1* | 2/2004 | Mills ....................... G06F 8/20 379/88.22 |
| 2004/0083165 A1 | 4/2004 | Lawrence |
| 2004/0111512 A1 | 6/2004 | Barth |
| 2004/0148039 A1 | 7/2004 | Farchmin et al. |
| 2004/0148187 A1 | 7/2004 | Boettcher et al. |
| 2004/0148383 A1 | 7/2004 | Gonsalves |
| 2004/0159113 A1 | 8/2004 | Singh et al. |
| 2004/0199573 A1 | 10/2004 | Schwartz et al. |
| 2004/0203895 A1 | 10/2004 | Balasuriya |
| 2004/0214566 A1 | 10/2004 | Suzuki et al. |
| 2004/0215551 A1 | 10/2004 | Eder |
| 2004/0225629 A1 | 11/2004 | Eder |
| 2004/0267729 A1 | 12/2004 | Swaminathan et al. |
| 2005/0005093 A1 | 1/2005 | Bartels et al. |
| 2005/0021158 A1 | 1/2005 | De meyer et al. |
| 2005/0038528 A1 | 2/2005 | McKelvey et al. |
| 2005/0055429 A1 | 3/2005 | Abele et al. |
| 2005/0080799 A1 | 4/2005 | Hamden et al. |
| 2005/0091410 A1 | 4/2005 | Gibart et al. |
| 2005/0120112 A1 | 6/2005 | Wing et al. |
| 2005/0125441 A1 | 6/2005 | Clemens et al. |
| 2005/0137735 A1 | 6/2005 | Loy et al. |
| 2005/0149922 A1 | 7/2005 | Vincent |
| 2005/0203869 A1 | 9/2005 | Minamino et al. |
| 2005/0209902 A1 | 9/2005 | Iwasaki et al. |
| 2005/0257204 A1 | 11/2005 | Bryant et al. |
| 2005/0278441 A1 | 12/2005 | Bond et al. |
| 2006/0022048 A1 | 2/2006 | Johnson |
| 2006/0026193 A1 | 2/2006 | Hood |
| 2006/0046712 A1 | 3/2006 | Shamp et al. |
| 2006/0077095 A1 | 4/2006 | Tucker et al. |
| 2006/0078859 A1 | 4/2006 | Mullin |
| 2006/0149813 A1 | 7/2006 | Janik |
| 2006/0153089 A1 | 7/2006 | Silverman |
| 2006/0173873 A1 | 8/2006 | Prompt et al. |
| 2006/0190106 A1 | 8/2006 | Kay et al. |
| 2006/0236374 A1 | 10/2006 | Hartman |
| 2006/0253205 A1 | 11/2006 | Gardiner |
| 2006/0259472 A1 | 11/2006 | MacClellan |
| 2006/0282432 A1 | 12/2006 | Cassidy et al. |
| 2007/0008129 A1 | 1/2007 | Soliman |
| 2007/0019641 A1 | 1/2007 | Pai et al. |
| 2007/0021968 A1 | 1/2007 | Amir et al. |
| 2007/0050206 A1 | 3/2007 | Whikehart et al. |
| 2007/0061018 A1 | 3/2007 | Callaghan et al. |
| 2007/0073850 A1 | 3/2007 | Callaghan et al. |
| 2007/0078525 A1 | 4/2007 | Chand |
| 2007/0078536 A1 | 4/2007 | Gordon et al. |
| 2007/0078537 A1 | 4/2007 | Chand et al. |
| 2007/0078862 A1 | 4/2007 | Chand et al. |
| 2007/0095907 A1 | 5/2007 | Robinson et al. |
| 2007/0112801 A1 | 5/2007 | McGreevy et al. |
| 2007/0118560 A1 | 5/2007 | Bornhoevd et al. |
| 2007/0130112 A1 | 6/2007 | Lin |
| 2007/0168057 A1 | 7/2007 | Blevins et al. |
| 2007/0192213 A1 | 8/2007 | Wu et al. |
| 2007/0194097 A1 | 8/2007 | Jones |
| 2007/0213989 A1* | 9/2007 | Cooksy ................. G06Q 10/06 704/275 |
| 2007/0244892 A1 | 10/2007 | Narancic |
| 2007/0245169 A1 | 10/2007 | Farchmin et al. |
| 2007/0247789 A1 | 10/2007 | Benson et al. |
| 2007/0255431 A1 | 11/2007 | Kinsey |
| 2008/0004739 A1* | 1/2008 | Varadhan ......... G05B 19/41865 700/100 |
| 2008/0027704 A1 | 1/2008 | Kephart et al. |
| 2008/0049013 A1 | 2/2008 | Nasle |
| 2008/0065243 A1 | 3/2008 | Fallman et al. |
| 2008/0077512 A1 | 3/2008 | Grewal |
| 2008/0082186 A1 | 4/2008 | Hood et al. |
| 2008/0109099 A1 | 5/2008 | Moshier |
| 2008/0125887 A1 | 5/2008 | Case |
| 2008/0155064 A1 | 6/2008 | Kosuge et al. |
| 2008/0162688 A1 | 7/2008 | Reumann et al. |
| 2008/0189637 A1 | 8/2008 | Krajewski et al. |
| 2008/0208365 A1 | 8/2008 | Grgic et al. |
| 2008/0209211 A1 | 8/2008 | Grgic et al. |
| 2008/0214104 A1 | 9/2008 | Baumert et al. |
| 2008/0263514 A1 | 10/2008 | DeMesa et al. |
| 2008/0303472 A1 | 12/2008 | John et al. |
| 2009/0024440 A1* | 1/2009 | Spahn ................... G06Q 50/22 705/7.26 |
| 2009/0037378 A1* | 2/2009 | Moor ................... G06F 40/174 |
| 2009/0037872 A1 | 2/2009 | Schnabele et al. |
| 2009/0063258 A1 | 3/2009 | Mueller et al. |
| 2009/0065578 A1 | 3/2009 | Peterson et al. |
| 2009/0070163 A1 | 3/2009 | Angell et al. |
| 2009/0083204 A1 | 3/2009 | Baier et al. |
| 2009/0086692 A1 | 4/2009 | Chen |
| 2009/0088875 A1 | 4/2009 | Baier et al. |
| 2009/0089032 A1* | 4/2009 | Sturrock ................ G05B 17/02 703/7 |
| 2009/0089233 A1 | 4/2009 | Gach et al. |
| 2009/0089359 A1 | 4/2009 | Siorek et al. |
| 2009/0089682 A1 | 4/2009 | Baier et al. |
| 2009/0109889 A1 | 4/2009 | Budampati et al. |
| 2009/0125460 A1 | 5/2009 | Hewison et al. |
| 2009/0127325 A1 | 5/2009 | Macurek et al. |
| 2009/0132458 A1* | 5/2009 | Edwards ................. E21B 44/00 706/50 |
| 2009/0182689 A1* | 7/2009 | Chiles ................... G06N 5/025 706/12 |
| 2009/0204234 A1 | 8/2009 | Sustaeta et al. |
| 2009/0210071 A1 | 8/2009 | Agrusa et al. |
| 2009/0210814 A1 | 8/2009 | Agrusa et al. |
| 2009/0216341 A1 | 8/2009 | Enkerud et al. |
| 2009/0300151 A1 | 12/2009 | Friedman et al. |
| 2009/0316977 A1* | 12/2009 | Juncker ................. G06Q 40/12 382/133 |
| 2010/0010859 A1* | 1/2010 | Ratakonda ............ G06Q 10/06 705/7.13 |
| 2010/0023562 A1 | 1/2010 | Kreuch et al. |
| 2010/0057660 A1 | 3/2010 | Kato |
| 2010/0076575 A1 | 3/2010 | Vasko et al. |
| 2010/0082127 A1 | 4/2010 | Plache et al. |
| 2010/0082129 A1 | 4/2010 | McGreevy et al. |
| 2010/0082142 A1* | 4/2010 | Usadi ................... G06N 20/00 700/104 |
| 2010/0082453 A1 | 4/2010 | Speers et al. |
| 2010/0082669 A1 | 4/2010 | Obitko et al. |
| 2010/0083232 A1 | 4/2010 | Chouinard et al. |
| 2010/0118895 A1 | 5/2010 | Radulescu |
| 2010/0146014 A1 | 6/2010 | Ionescu et al. |
| 2010/0153487 A1 | 6/2010 | Greven et al. |
| 2010/0192144 A1 | 7/2010 | Schmit |
| 2010/0211509 A1 | 8/2010 | Jacobs |
| 2010/0219950 A1* | 9/2010 | Kong .................. G05B 23/0229 340/540 |
| 2010/0223212 A1* | 9/2010 | Manolescu ............ G06Q 10/06 706/12 |

(56) References Cited

U.S. PATENT DOCUMENTS

| | | |
|---|---|---|
| 2010/0241260 A1 | 9/2010 | Kilibarda et al. |
| 2010/0256795 A1 | 10/2010 | McLaughlin et al. |
| 2010/0257227 A1 | 10/2010 | McLaughlin et al. |
| 2010/0257228 A1 | 10/2010 | Staggs et al. |
| 2010/0306377 A1 | 12/2010 | DeHaan et al. |
| 2010/0318392 A1* | 12/2010 | Cassels .............. G06Q 10/06 705/7.12 |
| 2010/0318837 A1 | 12/2010 | Murphy et al. |
| 2010/0324855 A1 | 12/2010 | Parker |
| 2010/0332008 A1* | 12/2010 | Knipfer .............. G05B 19/042 700/103 |
| 2011/0016058 A1 | 1/2011 | Pinchuk |
| 2011/0035253 A1* | 2/2011 | Mason ................ G06Q 10/06 705/7.13 |
| 2011/0047230 A1 | 2/2011 | McGee |
| 2011/0078300 A9 | 3/2011 | Grelewicz et al. |
| 2011/0093308 A1* | 4/2011 | Majeed ............... G06Q 10/06 705/7.27 |
| 2011/0161378 A1 | 6/2011 | Williamson |
| 2011/0173127 A1 | 7/2011 | Ho et al. |
| 2011/0257766 A1 | 10/2011 | Sundaram et al. |
| 2011/0265020 A1* | 10/2011 | Fields ............... G06F 11/3668 715/760 |
| 2011/0276498 A1 | 11/2011 | Madhok |
| 2011/0288667 A1* | 11/2011 | Noda .................. G05B 19/42 700/98 |
| 2011/0295634 A1* | 12/2011 | Bhamidipaty ..... G06Q 10/0631 705/7.12 |
| 2012/0005242 A1 | 1/2012 | Eng et al. |
| 2012/0054246 A1 | 3/2012 | Fischer |
| 2012/0072597 A1 | 3/2012 | Teather et al. |
| 2012/0079461 A1 | 3/2012 | Copass et al. |
| 2012/0083906 A1 | 4/2012 | Weatherhead et al. |
| 2012/0084400 A1 | 4/2012 | Almadi et al. |
| 2012/0089920 A1 | 4/2012 | Eick |
| 2012/0095808 A1 | 4/2012 | Kattapuram et al. |
| 2012/0101801 A1 | 4/2012 | Van Dorsselaer |
| 2012/0143374 A1* | 6/2012 | Mistry ............... B62D 57/032 700/259 |
| 2012/0147894 A1 | 6/2012 | Mulligan et al. |
| 2012/0232876 A1 | 9/2012 | Misra |
| 2012/0257544 A1 | 10/2012 | Schein et al. |
| 2012/0262069 A1 | 10/2012 | Reed |
| 2012/0290104 A1 | 11/2012 | Holt et al. |
| 2012/0297249 A1 | 11/2012 | Yang et al. |
| 2012/0304007 A1* | 11/2012 | Hanks ................ H04L 67/12 714/26 |
| 2012/0306620 A1 | 12/2012 | Karaffa et al. |
| 2012/0311387 A1* | 12/2012 | Santhosh ............ G06F 11/3433 714/33 |
| 2013/0004281 A1 | 1/2013 | Anders et al. |
| 2013/0012220 A1 | 1/2013 | Waris et al. |
| 2013/0018696 A1 | 1/2013 | Meldrum |
| 2013/0024542 A1 | 1/2013 | Keller et al. |
| 2013/0031158 A1 | 1/2013 | Salsburg |
| 2013/0036198 A1 | 2/2013 | Galm et al. |
| 2013/0041705 A1 | 2/2013 | Hampapur |
| 2013/0097563 A1 | 4/2013 | Pacheco Rodrigues Velho et al. |
| 2013/0097710 A1 | 4/2013 | Basavapatna et al. |
| 2013/0104236 A1 | 4/2013 | Ray et al. |
| 2013/0107772 A1 | 5/2013 | Splitz et al. |
| 2013/0111019 A1* | 5/2013 | Tjew ................. H04L 63/1425 709/224 |
| 2013/0111034 A1 | 5/2013 | Upadhya |
| 2013/0117064 A1 | 5/2013 | Sadeghi et al. |
| 2013/0117806 A1 | 5/2013 | Parthasarathy et al. |
| 2013/0125233 A1 | 5/2013 | Bush et al. |
| 2013/0138812 A1 | 5/2013 | Assuncao et al. |
| 2013/0138818 A1 | 5/2013 | Wolf |
| 2013/0145033 A1 | 6/2013 | Polla et al. |
| 2013/0159500 A1 | 6/2013 | Reus et al. |
| 2013/0182107 A1 | 7/2013 | Anderson |
| 2013/0191106 A1* | 7/2013 | Kephart .............. G05B 17/02 703/21 |
| 2013/0204982 A1 | 8/2013 | Kim et al. |
| 2013/0211546 A1 | 8/2013 | Lawson et al. |
| 2013/0211547 A1 | 8/2013 | Buchdunger et al. |
| 2013/0211555 A1 | 8/2013 | Lawson et al. |
| 2013/0211559 A1 | 8/2013 | Lawson et al. |
| 2013/0211870 A1 | 8/2013 | Lawson et al. |
| 2013/0212420 A1 | 8/2013 | Lawson et al. |
| 2013/0212521 A1* | 8/2013 | Fedoseyeva ........... G06Q 10/00 715/781 |
| 2013/0218971 A1 | 8/2013 | Sasaki et al. |
| 2013/0237204 A1 | 9/2013 | Buck et al. |
| 2013/0257627 A1 | 10/2013 | Rafael |
| 2013/0262654 A1 | 10/2013 | Masli et al. |
| 2013/0283265 A1 | 10/2013 | Acharya et al. |
| 2013/0304237 A1 | 11/2013 | Schroeder et al. |
| 2013/0311827 A1* | 11/2013 | Drory ................ G06F 11/3664 714/32 |
| 2013/0325545 A1 | 12/2013 | Mordvinova et al. |
| 2013/0347003 A1* | 12/2013 | Whitmore ............ G06Q 10/06 718/108 |
| 2014/0013100 A1 | 1/2014 | Menzel et al. |
| 2014/0046618 A1 | 2/2014 | Arunachalam et al. |
| 2014/0046977 A1 | 2/2014 | Gopalakrishnan et al. |
| 2014/0047107 A1 | 2/2014 | Maturana et al. |
| 2014/0052499 A1 | 2/2014 | Wagner et al. |
| 2014/0059056 A1 | 2/2014 | Chaney et al. |
| 2014/0067360 A1* | 3/2014 | Bhamidipaty ... G05B 19/41885 703/22 |
| 2014/0081691 A1* | 3/2014 | Wendell ......... G06Q 10/063114 705/7.15 |
| 2014/0095231 A1 | 4/2014 | Cherusseri et al. |
| 2014/0095654 A1 | 4/2014 | Finnerty et al. |
| 2014/0121789 A1 | 5/2014 | Brandes et al. |
| 2014/0137257 A1 | 5/2014 | Martinez et al. |
| 2014/0156032 A1 | 6/2014 | Jenkins et al. |
| 2014/0156584 A1 | 6/2014 | Motukuri et al. |
| 2014/0215487 A1* | 7/2014 | Cherkasova ........... G06F 9/5083 718/106 |
| 2014/0250153 A1 | 9/2014 | Nixon et al. |
| 2014/0250337 A1 | 9/2014 | Yamaji et al. |
| 2014/0278738 A1* | 9/2014 | Feit ................... G06Q 30/0201 705/7.29 |
| 2014/0279201 A1* | 9/2014 | Iyoob ................. G06Q 30/0631 705/26.7 |
| 2014/0279641 A1 | 9/2014 | Singh et al. |
| 2014/0279948 A1 | 9/2014 | Mahate et al. |
| 2014/0282015 A1 | 9/2014 | Nixon et al. |
| 2014/0282257 A1 | 9/2014 | Nixon et al. |
| 2014/0297354 A1* | 10/2014 | Kogiso ............ G06Q 10/06316 705/7.26 |
| 2014/0306533 A1 | 10/2014 | Paquin et al. |
| 2014/0316794 A1* | 10/2014 | Goll ................... G16H 40/20 705/2 |
| 2014/0335480 A1 | 11/2014 | Asenjo et al. |
| 2014/0336785 A1 | 11/2014 | Asenjo et al. |
| 2014/0336786 A1 | 11/2014 | Asenjo et al. |
| 2014/0336791 A1 | 11/2014 | Asenjo et al. |
| 2014/0336795 A1 | 11/2014 | Asenjo et al. |
| 2014/0337000 A1 | 11/2014 | Asenjo et al. |
| 2014/0337086 A1 | 11/2014 | Asenjo et al. |
| 2014/0358606 A1 | 12/2014 | Hull |
| 2014/0372347 A1 | 12/2014 | Cohen et al. |
| 2015/0012763 A1 | 1/2015 | Cohen et al. |
| 2015/0019191 A1 | 1/2015 | Maturana et al. |
| 2015/0032242 A1 | 1/2015 | Schouwenburg et al. |
| 2015/0032886 A1 | 1/2015 | Wang |
| 2015/0048952 A1 | 2/2015 | Murphy |
| 2015/0235161 A1 | 8/2015 | Azar et al. |
| 2015/0278407 A1 | 10/2015 | Vennelakanti et al. |
| 2015/0304193 A1 | 10/2015 | Ishii et al. |
| 2015/0378356 A1 | 12/2015 | Hefeeda et al. |
| 2016/0154693 A1 | 6/2016 | Uhde et al. |
| 2016/0217378 A1 | 7/2016 | Bellala et al. |
| 2016/0217410 A1 | 7/2016 | Santos et al. |
| 2017/0019483 A1 | 1/2017 | Maturana et al. |
| 2017/0236391 A1 | 8/2017 | Palmeri |

(56) References Cited

U.S. PATENT DOCUMENTS

| | | |
|---|---|---|
| 2018/0157995 A1 | 6/2018 | O'Malley |
| 2018/0205803 A1 | 7/2018 | Asenjo et al. |

FOREIGN PATENT DOCUMENTS

| | | |
|---|---|---|
| CN | 1690685 A | 11/2005 |
| CN | 1833424 A | 9/2006 |
| CN | 100362442 C | 1/2008 |
| CN | 101114160 | 1/2008 |
| CN | 101326471 A | 12/2008 |
| CN | 101536002 | 9/2009 |
| CN | 101739007 | 6/2010 |
| CN | 101776862 A | 7/2010 |
| CN | 102435870 A | 5/2012 |
| CN | 102449567 | 5/2012 |
| CN | 102640475 A | 8/2012 |
| CN | 102830666 A | 12/2012 |
| CN | 102927937 | 2/2013 |
| CN | 103019102 | 4/2013 |
| CN | 103403753 A | 11/2013 |
| CN | 104142629 A | 11/2014 |
| CN | 104142630 A | 11/2014 |
| CN | 104142662 A | 11/2014 |
| CN | 104142664 A | 11/2014 |
| CN | 104142679 A | 11/2014 |
| DE | 19834456 | 2/2000 |
| DE | 10 2014 102 844 A1 | 9/2014 |
| EP | 1209558 | 5/2002 |
| EP | 1 491 977 A2 | 12/2004 |
| EP | 1531373 | 5/2005 |
| EP | 1686442 | 8/2006 |
| EP | 1 868 152 A1 | 12/2007 |
| EP | 1933214 | 6/2008 |
| EP | 2189900 | 5/2010 |
| EP | 2293164 | 3/2011 |
| EP | 2453326 | 5/2012 |
| EP | 2469466 | 6/2012 |
| EP | 2 509 042 A1 | 10/2012 |
| EP | 2 660 667 A2 | 11/2013 |
| EP | 2 704 401 A1 | 3/2014 |
| EP | 2 778 816 A1 | 9/2014 |
| EP | 2 790 101 A1 | 10/2014 |
| EP | 2 801 935 A1 | 11/2014 |
| EP | 2 801 936 A1 | 11/2014 |
| EP | 2801938 | 11/2014 |
| EP | 2801940 | 11/2014 |
| EP | 2801941 | 11/2014 |
| EP | 3 037 901 A2 | 6/2016 |
| EP | 3 070 550 B1 | 7/2018 |
| JP | 2001-242931 A | 9/2001 |
| WO | 0111586 | 2/2001 |
| WO | 0169329 | 9/2001 |
| WO | 0217131 | 2/2002 |
| WO | 02/057856 A2 | 7/2002 |
| WO | 03/007097 A1 | 1/2003 |
| WO | 03058506 | 7/2003 |
| WO | 2008133715 | 11/2008 |
| WO | 2009046095 | 4/2009 |
| WO | 2011050482 | 5/2011 |
| WO | 2013007866 | 1/2013 |
| WO | 2014/090310 A1 | 6/2014 |
| WO | 2016/001718 A1 | 1/2016 |

OTHER PUBLICATIONS

Chinese Office Action for CN Application Serial No. 201410196114. 8, dated Dec. 13, 2017, 26 pages.

Office Action for U.S. Appl. No. 15/143,733 dated Mar. 8, 2018, 141 pages.

European Search Report dated Aug. 11, 2014 for European Application No. 14167714.6-1955, 5 pages.

European Search Report dated Aug. 11, 2014 for European Application No. 14167706.2-1955, 7 pages.

European Search Report dated Aug. 11, 2014 for European Application No. 14167626.2-1955, 9 pages.

European Search Report dated Aug. 11, 2014 for European Application No. 14167627.0-1955, 6 pages.

European Search Report dated Aug. 11, 2014 for European Application No. 14167703.9-1955, 7 pages.

European Search Report dated Aug. 11, 2014 for European Application No. 14167707.0-1955, 7 pages.

European Search Report dated Aug. 11, 2014 for European Application No. 14167708.8-1955, 5 pages.

European Search Report dated Aug. 11, 2014 for European Application No. 14167712.0-1955, 5 pages.

European Search Report dated Aug. 11, 2014 for European Application No. 14167511.6-1955, 6 pages.

Office Action dated Dec. 27, 2004 for U.S. Appl. No. 10/162,315, 8 pages.

Office Action dated Jun. 15, 2005 for U.S. Appl. No. 10/162,315, 9 pages.

Office Action dated Sep. 9, 2005 for U.S. Appl. No. 10/162,315, 10 pages.

Vasudevan, A Web Services Primer, Apr. 4 2001, XML.com, http://webservices.xml.com/pub/a/ws/2001/04/04/webservices/index.html.

Office Action dated Mar. 6, 2006 for U.S. Appl. No. 10/162,315, 8 pages.

W3C, Web Services Description Language, http://www.w3.org/TR/wsdl, Mar. 15, 2001, 36 pages.

European Search Report dated Mar. 18, 2004 for European Patent Application Serial No. 03026339, 3 Pages.

Compuquest, Inc., SPM-IM-Instant Messaging Client for SpreadMsg Wireless Messaging Software, http://www.compuquestinc.com/spmim.html, Aug. 13, 2002, 4 pages.

Compuquest, Inc., SpreadMsg Lite—Data Capture, Scanning, Extraction & Rule Based Instant Messaging Software, http://web.archive.org/web/20020813080848/ http://www.compuquestinc.com/spmsgl.html, retrieved Jul. 21, 2006, 6 pages.

International Business Machines Corporation, Cross platform instant messaging using web services, Research Disclosure, Kenneth Mason Publications, Hampshire, GB, vol. 458, No. 156, Jun. 2002.

Office Action dated Jun. 18, 2014 for U.S. Appl. No. 13/725,578, 13 pages.

Office Action dated Aug. 19, 2014 for U.S. Appl. No. 13/615,195, 22 pages.

Office Action dated Oct. 9, 2014 for U.S. Appl. No. 13/725,543, 10 pgs.

Office Action dated Dec. 12, 2014 for U.S. Appl. No. 13/725,578, 24 pages.

Office Action dated Jan. 20, 2015 for U.S. Appl. No. 13/615,195, 22 pages.

Third Party Submission under 37 CFR 1.290 dated Nov. 21, 2014 for U.S. Appl. No. 14/087,873, 23 pages.

Office Action for U.S. Appl. No. 13/725,543 dated May 20, 2015, 15 pages.

Office Action for U.S. Appl. No. 13/608,821 dated Jun. 1, 2015, 44 pages.

Office Action for U.S. Appl. No. 13/608,850 dated Jun. 1, 2015, 38 pages.

Office Action for U.S. Appl. No. 13/677,060 dated Apr. 24, 2015, 54 pgs.

Office Action for U.S. Appl. No. 13/725,619 dated Jul. 17, 2015, 45 pages.

Office Action for U.S. Appl. No. 13/725,660 dated Aug. 18, 2015, 90 pgs.

Colombo, A.W., et al., "Factory of the Future: A Service-Oriented System of Modular, Dynamic Reconfigurable and Collaborative Systems," Artificial Intelligence Techniques for Networked Manufacturing Enterprises Management, Springer Series in Advanced Manufacuring 2010, pp. 459-481.

Colombo, Amando Walter, et al., "Towards the Factory of the Future: A Service-Oriented Cross-layer Infrastructure," ICT Shaping the World: A Scientific View, 2009, pp. 65-81.

Notice of Allowance for U.S. Appl. No. 13/725,578, dated Apr. 24, 2015, 23 pages.

(56) References Cited

OTHER PUBLICATIONS

Office Action for U.S. Appl. No. 13/677,060, dated Oct. 20, 2015, 48 pages.
Office Action for U.S. Appl. No. 13/615,195, dated Sep. 21, 2015, 19 pages.
Office Action for U.S. Appl. No. 13/725,660, dated Oct. 26, 2015, 79 pages.
Office Action dated Nov. 25, 2015 for U.S. Appl. No. 14/087,873, 57 pages.
Final Office Action for U.S. Appl. No. 13/725,619 dated Dec. 4, 2015, 21 pages.
Final Office Action for U.S. Appl. No. 13/608,821 dated Dec. 7, 2015, 39 pages.
Final Office Action for U.S. Appl. No. 13/615,195, dated Feb. 11, 2016, 19 pages.
Non-Final Office Action for U.S. Appl. No. 13/725,543, dated Feb. 2, 2016, 15 pages.
Non-Final Office Action for U.S. Appl. No. 13/725,660, dated Jan. 21 2016, 72 pages.
Final Office Action for U.S. Appl. No. 13/608,850, dated Dec. 9, 2015, 25 pages.
Office Action dated Nov. 24, 2015 for European Application No. 14167706.2-1955, 8 pages.
Office Action dated Nov. 24, 2015 for European Application No. 14167626.2-1955, 8 pages.
Notice of Allowance for U.S. Appl. No. 13/725,619 dated Mar. 31, 2016, 26 pages.
Non-Final Office Action for U.S. Appl. No. 13/677,060 dated Mar. 10, 2016, 66 pages.
Notice of Allowance for U.S. Appl. No. 13/725,660 dated Feb. 3, 2016, 47 pages.
Non-Final Office Action for U.S. Appl. No. 14/087,730 dated Mar. 11, 2016, 81 pages.
Non-Final Office Action received for U.S. Appl. No. 10/234,504 dated Oct. 18, 2006, 15 pages.
Final Office Action received for U.S. Appl. No. 10/234,504 dated Feb. 7, 2007, 12 pages.
Final Office Action received for U.S. Appl. No. 10/234,504 dated May 1, 2007, 12 pages.
Non-Final Office Action received for U.S. Appl. No. 10/162,314 dated Dec. 15, 2005, 17 pages.
Final Office Action received for U.S. Appl. No. 10/162,314 dated Jun. 5, 2006, 23 pages.
Non-Final Office Action received for U.S. Appl. No. 10/162,314 dated Nov. 16, 2006, 20 pages.
Final Office Action received for U.S. Appl. No. 10/162,314 dated Apr. 30, 2007, 35 pages.
Non-Final Office Action received for U.S. Appl. No. 10/162,314 dated Oct. 25, 2007, 28 pages.
Final Office Action received for U.S. Appl. No. 10/162,314 dated May 5, 2008, 31 pages.
Non-Final Office Action received for U.S. Appl. No. 10/161,848 dated Nov. 15, 2005, 15 pages.
Final Office Action received for U.S. Appl. No. 10/161,848 dated Mar. 27, 2006, 13 pages.
Non-Final Office Action received for U.S. Appl. No. 10/161,848 dated Sep. 5, 2006, 15 pages.
Final Office Action received for U.S. Appl. No. 10/161,848 dated Feb. 23, 2007, 17 pages.
Non-Final Office Action received for U.S. Appl. No. 10/161,848 dated May 7, 2007, 14 pages.
Final Office Action received for U.S. Appl. No. 10/161,848 dated Oct. 17, 2007, 15 pages.
Non-Final Office Action received for U.S. Appl. No. 10/161,848 dated Feb. 7, 2008, 14 pages.
Final Office Action received for U.S. Appl. No. 10/161,848 dated Sep. 9, 2008, 17 pages.
Non-Final Office Action received for U.S. Appl. No. 12/410,632 dated Feb. 1, 2011, 56 pages.
Final Office Action received for U.S. Appl. No. 12/410,632 dated May 17, 2011, 17 pages.
Non-Final Office Action received for U.S. Appl. No. 12/410,632 dated Sep. 2, 2011, 11 pages.
Non-Final Office Action received for U.S. Appl. No. 10/298,366 dated Apr. 20, 2006, 13 pages.
Final Office Action received for U.S. Appl. No. 10/298,366 dated Sep. 29, 2006, 16 pages.
Non-Final Office Action received for U.S. Appl. No. 10/298,366 dated Jan. 31, 2007, 12 pages.
Final Office Action received for U.S. Appl. No. 10/298,366 dated Jul. 18, 2007, 14 pages.
Non-Final Office Action received for U.S. Appl. No. 10/298,366 dated Dec. 17, 2007, 10 pages.
Non-Final Office Action received for U.S. Appl. No. 10/298,366 dated Jun. 11, 2008, 24 pages.
Final Office Action received for U.S. Appl. No. 10/298,366 dated Nov. 18, 2008, 20 pages.
Notice of Allowance received for U.S. Appl. No. 10/298,366 dated Feb. 2, 2009, 23 pages.
Non-Final Office Action received for U.S. Appl. No. 13/615,195, dated Aug. 19, 2014, 24 pages.
Communication pursuant to Article 96(2) EPC for EP Application Serial No. 03026339.6 dated Apr. 6, 2006, 6 pages.
Communication pursuant to Article 96(2) EPC for EP Application Serial No. 13166670.3 dated Dec. 14, 2018, 4 pages.
Chinese Third Office Action for Chinese Application No. 201410196114.8 dated Apr. 12, 2017, 25 pages (Including English Translation).
Chinese Fourth Office Action for Chinese Application No. 201410196114.8 dated Aug. 15, 2017, 24 pages (Including English Translation).
Chinese Second Office Action for Chinese Application No. 201410196198.5 dated Dec. 21, 2016, 10 pages (Including English Translation).
Chinese Third Office Action for Chinese Application No. 201410196198.5 dated Mar. 28, 2017, 10 pages (Including English Translation).
Chinese Second Office Action for Chinese Application No. 201410196525.7 dated Dec. 21, 2016, 8 pages (Including English Translation).
Chinese Second Office Action for Chinese Application No. 201410196775.0 dated Dec. 7, 2016, 8 pages (Including English Translation).
Chinese Third Office Action for CN Application Serial No. 201410196150.4, dated Nov. 29, 2017, 10 pages (Including English Translation).
Communication pursuant to Article 94(3) EPC for EP Application Serial No. 14167511.6 dated Jan. 23, 2019, 7 pages.
Communication pursuant to Article 94(3) EPC for EP Application Serial No. 14167703.9 dated Jan. 23, 2019, 6 pages.
Anonymous: "Hash function—Wikipedia", Wikipedia, Apr. 19, 2009, URL:https://en.wikipedia.org/w/index.php?title=Hash_function &oldid=284890279, 9 pages.
Communication pursuant to Article 94(3) EPC for EP Application Serial No. 16160611.6 dated Apr. 5, 2017, 5 pages.
Communication pursuant to Article 94(3) EPC for EP Application Serial No. 16160611.6 dated May 10, 2017, 5 pages.
Second Office Action received for Chinese Patent Application Serial No. 201610151417.7 dated Jan. 22, 2019, 7 pages (Including English Translation).
Communication pursuant to Article 94(3) EPC for EP Application Serial No. 16160604.1 dated Jun. 13, 2017, 6 pages.
Summons to attend oral proceedings pursuant to Rule 115(1) EPC received for EP Patent Application Serial No. 14167706.2 dated Dec. 13, 2018, 65 pages.
Second Office Action received for Chinese Patent Application Serial No. 201410196150.4 dated Aug. 3, 2017, 10 pages (Including English Translation).
Extended European Search Report received for EP Patent Application Serial No. 16160610.8 dated Sep. 8, 2016, 9 pages.
Non-Final Office Action received for U.S. Appl. No. 13/725,543 dated Oct. 9, 2014, 10 pages.

(56) References Cited

OTHER PUBLICATIONS

Final Office Action received for U.S. Appl. No. 13/725,543 dated May 20, 2015, 15 pages.
Office Action for U.S. Appl. No. 15/143,733, dated Jun. 18, 2018, 76 pages.
Office Action for U.S. Appl. No. 15/599,921, dated Jun. 29, 2018, 75 pages.
Office Action for U.S. Appl. No. 14/087,970, dated Aug. 1, 2018, 68 pages.
Wikipedia; "PID Controller"; Jul. 20, 2018; https://en.wikipedia.org/wiki/PID_controller (Year: 2018).
Communication pursuant to Article 94(3) EPC for EP Application Serial No. 14167714.6 dated Aug. 3, 2018, 5 pages.
Communication pursuant to Article 94(3) EPC for EP Application Serial No. 14167708.8 dated Aug. 3, 2018, 5 pages.
Communication pursuant to Article 94(3) EPC for EP Application Serial No. 14167712.0 dated Aug. 3, 2018, 5 pages.
Search Report received for Chinese Application Serial No. 201610149668.1 dated Apr. 2, 2018, 1 page.
Search Report received for Chinese Application Serial No. 201610149635.7 dated Apr. 2, 2018, 1 page.
First Office Action received for Chinese Patent Application Serial No. 201610151380.8 dated Jul. 17, 2018, 65 pages.
Office Action for U.S. Appl. No. 15/490,076 dated Apr. 2, 2018, 23 pages.
Office Action for U.S. Appl. No. 14/658,327 dated Apr. 10, 2018, 43 pages.
Office Action for U.S. Appl. No. 14/658,345 dated Mar. 14, 2018, 56 pages.
Office Action for U.S. Appl. No. 14/658,365, dated Apr. 5, 2018, 64 pages.
Office Action for U.S. Appl. No. 14/658,394, dated Apr. 6, 2018, 40 pages.
Office Action for U.S. Appl. No. 15/206,744 dated Nov. 6, 2017, 48 pages.
Final Office Action for U.S. Appl. No. 15/388,260 dated Oct. 18, 2017, 76 pages.
Office Action for U.S. Appl. No. 14/658,327 dated Oct. 30, 2017, 48 pages
Final Office Action for U.S. Appl. No. 14/658,394 dated Nov. 16, 2017, 49 pages.
Office Action for U.S. Appl. No. 15/490,076 dated Dec. 20, 2017, 37 pages.
Office Action for U.S. Appl. No. 15/278,139 dated Jan. 11, 2018, 103 pages.
Final Office Action for U.S. Appl. No. 14/087,821 dated Dec. 14, 2017, 37 pages.
Final Office Action for U.S. Appl. No. 14/088,011 dated Nov. 22, 2017, 77 pages.
Final Office Action received for U.S. Appl. No. 14/658,345, dated Sep. 13, 2018, 49 pages.
Final Office Action received for U.S. Appl. No. 14/658,365, dated Oct. 16, 2018, 42 pages.
Notice of Allowance received for U.S. Appl. No. 15/923,127 dated Nov. 21, 2018, 85 pages.
Non-Final Office Action received for U.S. Appl. No. 14/658,327 dated Nov. 1, 2018, 58 pages.
Final Office Action received for U.S. Appl. No. 14/658,394 dated Nov. 1, 2018, 51 pages.
Second Office Action received for Chinese Patent Application Serial No. 201610149668.1 dated Oct. 24, 2018, 18 pages (including English Translation).
Second Office Action received for Chinese Patent Application Serial No. 201610149635.7 dated Oct. 24, 2018, 24 pages (including English Translation).
First Office Action received for Chinese Patent Application Serial No. 201610151417.7 dated Sep. 18, 2018, 28 pages (including English Translation).
Final Office Action received for U.S. Appl. No. 13/615,195 dated Jan. 20, 2015, 22 pages.

Chinese First Office Action for Chinese Application No. 20170339669.7 dated Dec. 11, 2018, 25 pages (Including English Translation).
Non-Final Office Action for U.S. Appl. No. 14/087,821 dated Mar. 2, 2016, 86 pages.
Non-Final Office Action for U.S. Appl. No. 14/087,977 dated Mar. 17, 2016, 83 pages.
Recursion Software, "SCADA-Aware Mobile", Frisco, TX, Aug. 29, 2012 (accessed from http://www.emsenergyautomation.com/brochures/scada.pdf on Feb. 11, 2016).
Ars Technica, "Windows 7 themes: how to unlock them or create your own", Nov. 12, 2009 (accessed from http://arstechnica.com/information-technology/2009/11/unlock-hidden-windows-7-themesl on Mar. 8, 2016).
Non-Final Office Action for U.S. Appl. No. 14/088,014 dated Mar. 22, 2016, 98 pages.
"Microsoft," "Sharing Outlook 2010 Contact\Notes/Field?", microsoft.com, Jun. 23, 2011 (accessed on Mar. 11, 2016 from http://answers.microsoft.com/en-us/office/forum/office_2010-outlook/sharing-outlook-2010-contactnotes-field/c7e74273-ff60-4da3-a3aa-ccb6cadcd25e?auth=1).
Notice of Allowance for U.S. Appl. No. 13/608,850 dated Apr. 12, 2016, 37 pages.
Notice of Allowance for U.S. Appl. No. 14/087,873 dated Apr. 18, 2016, 26 pages.
Chinese Office Action for Chinese Application No. 201410196198.5 dated Mar. 29, 2016, 18 pages.
Non-Final Office Action for U.S. Appl. No. 14/088,011 dated May 12, 2016, 96 pages.
Chinese Office Action for Chinese Application No. 201410198289.2 dated Apr. 5, 2016, 18 pages.
Chinese Office Action for Chinese Application No. 201410196905.0 dated Apr. 5, 2016, 20 pages.
Chinese Office Action for Chinese Application No. 201410196127.5 dated Apr. 7, 2016, 13 pages.
Chinese Office Action for Chinese Application No. 201410196775.0 dated May 5, 2016, 14 pages.
Chinese Office Action for Chinese Application No. 201410196525.7 dated May 5, 2016, 13 pages.
Office Action dated Jun. 21, 2016 for U.S. Appl. No. 13/615,195, 27 pages.
Final Office Action dated Jun. 17, 2016 for U.S. Appl. No. 13/725,543, 19 pages.
Office Action dated Jun. 17, 2016 for U.S. Appl. No. 14/087,970, 36 pages.
Chinese Office Action for Chinese Application No. 201410196114.8 dated Apr. 25, 2016, 20 pages.
Office Action dated Sep. 22, 2015 for European Application No. 14167707.0-1955, 9 pages.
Chinese Office Action dated May 26, 2016 for Chinese Application No. 201410195780.X, 16 pages.
Final Office Action U.S. Appl. No. 14/087,977, dated Jul. 13, 2016, 59 pages.
Final Office Action for U.S. Appl. No. 14/088,014, dated Jul. 15, 2016, 65 pages.
Non-Final Office Action for U.S. Appl. No. 14/087,922, dated Jul. 19, 2016, 120 pages.
Extended European Search Report for European Patent Application Serial No. 16160604.1, dated Aug. 17, 2016, 9 pages.
Extended European Search Report for EP Patent Application Serial No. 16160611.6, dated Aug. 24, 2016, 10 pages.
Final Office Action for U.S. Appl. No. 14/087,730, dated Aug. 24, 2016, 113 pages.
Extended European Search Report for EP Patent Application Serial No. 16160602.5, dated Sep. 2, 2016, 9 pages.
"Cloud Computing," Whatis.com, Oct. 27, 2009, http://searchcloudcomputing.techtarget/com/sDefinition/0,,sid201_gci1287881,00.html, 2 pages.
Mell, P., et al., "The NIST Definition of Cloud Computing," Oct. 7, 2009, http://csrc.nist.gov/groups/SNS/cloud/computing/index.html, 2 pages.
European Office Action for EP Patent Application Serial No. 16160611.6, dated Sep. 26, 2016, 2 pages.

(56) References Cited

OTHER PUBLICATIONS

European Office Action for EP Patent Application Serial No. 13166670.3, dated Jul. 18, 2016, 2 pages.
European Office Action for EP Patent Application Serial No. 16160604.1, dated Sep. 26, 2016, 2 pages.
Office Action for U.S. Appl. No. 13/615,195, dated Oct. 21, 2016, 44 pages.
Office Action for U.S. Appl. No. 14/088,011, dated Nov. 1, 2016, 79 pages.
European Office Action for EP Patent Application Serial No. 16160610.8, dated Oct. 17, 2016, 2 pages.
European Office Action for EP Patent Application Serial No. 16160602.5, dated Oct. 10, 2016, 2 pages.
Office Action for U.S. Appl. No. 14/088,014, dated Nov. 17, 2016, 61 pages.
Chinese Office Action for CN Application Serial No. 201410196114.8, dated Nov. 9, 2016, 19 pages.
Chinese Office Action for CN Application Serial No. 201410196905.0, dated Nov. 18, 2016, 6 pages.
Office Action for U.S. Appl. No. 14/087,922, dated Nov. 25, 2016, 65 pages.
Final Office Action for U.S. Appl. No. 14/658,365 dated Sep. 8, 2017, 59 pages.
Office Action for U.S. Appl. No. 14/087,821 dated Sep. 7, 2017, 63 pages.
Final Office Action for U.S. Appl. No. 14/087,730 dated Aug. 18, 2017, 72 pages.
Office Action for U.S. Appl. No. 15/214,583 dated Aug. 28, 2017, 80 pages.
Final Office Action for U.S. Appl. No. 14/658,345 dated Sep. 25, 2017, 52 pages.
Office Action for U.S. Appl. No. 14/658,365, dated Mar. 23, 2017, 100 pages.
Chinese Office Action for CN Application Serial No. 201410196150.4, dated Mar. 2, 2017, 37 pages (with English Translation).
Office Action for U.S. Appl. No. 14/087,970, dated Apr. 12, 2017, 59 pages.
Office Action for U.S. Appl. No. 14/658,394, dated Apr. 21, 2017, 97 pages.
Office Action for U.S. Appl. No. 15/388,260, dated Apr. 24, 2017, 101 pages.
Office Action for U.S. Appl. No. 14/658,345, dated Mar. 17, 2017, 95 pages.
Office Action for U.S. Appl. No. 14/658,327, dated May 1, 2017, 99 pages.
Examiner Answer to Appeal Brief for U.S. Appl. No. 14/087,977, dated Feb. 1, 2017.
Givehchi, et al., "Control-as-a-Service from the Cloud: A Case Study for using Virtualized PLCs," 2014 10th IEEE Workshop on Factory Communication Systems (WFCS 2014), May 5, 2014 IEEE, 4 pages
Office Action for U.S. Appl. No. 14/088,011, dated May 17, 2017.
Rouse, et al. "Definition Industrial Control System (ICS," whatis.techtarget.com, ed. Mar. 2016 (accessed from <<http://whatis.techtarget.com/definition/industrial-control-tsystem-ICS>> on Jan. 11, 2017).
Non-Final Office Action for U.S. Appl. No. 14/087,730, dated Feb. 9, 2017, 78 pages.
Chinese Office Action for CN Application Serial No. 201410198289.2, dated Dec. 15, 2016, 21 pages.
Chinese Office Action for CN Application Serial No. 201410196127.5, dated Nov. 30, 2016, 13 pages.
Chinese Office Action for CN Application Serial No. 201410195780.X, dated Feb. 3, 2017, 18 pages.
Office Action for European Patent Application Serial No. 16160604.1-1802, dated May 17, 2017, 6 pages.
Notice of Allowance for U.S. Appl. No. 14/087,922 dated Jun. 7, 2017, 28 pages.
Notice of Allowance received for U.S. Appl. No. 15/621,206 dated Aug. 19, 2019, 52 pages.
Non-Final Office Action received for U.S. Appl. No. 14/658,394 dated Aug. 19, 2019, 70 pages.
First Office Action received for Chinese Patent Application Serial No. 201710778822.6 dated Jun. 24, 2019, 29 pages (Including English Translation).
Second Office Action received for Chinese Patent Application Serial No. 201710339669.7 dated Jul. 2, 2019, 20 pages (Including English Translation).
Non-Final Office Action received for U.S. Appl. No. 15/621,206 dated Mar. 22, 2019, 118 pages.
Non-Final Office Action received for U.S. Appl. No. 14/658,345 dated May 13, 2019, 78 pages.
Non-Final Office Action received for U.S. Appl. No. 14/658,365 dated Jun. 3, 2019, 70 pages.
Third Office Action received for Chinese Patent Application Serial No. 201610149635.7 dated Apr. 26, 2019, 23 pages (including English Translation).
Notice of Opposition received for EP Patent Application Serial No. 16160611.6 dated Apr. 11, 2019, 789 pages.
Wen et al., "Current Trends and Perspectives in Wireless Virtualization", 2013 International Conference on Selected Topics in Mobile and Wireless Networking (MoWNeT), 2013, 6 pages.
Wang et al., "The Research of Chemical Plant Monitoring Base on the Internet of Things and 3D Visualization Technology", Proceeding of the IEEE International Conference on Information and Automation, Aug. 2013, 5 pages.
Supplementary Search Report received for Chinese Patent Application Serial No. 201710339669.7 dated Sep. 18, 2019, 2 pages.
Non-Final Office Action received for U.S. Appl. No. 15/970,932 dated Nov. 14, 2019, 122 pages.
Second Office Action received for Chinese Patent Application Serial No. 201710778822.6 dated Sep. 20, 2019, 5 pages.
Final Office Action received for U.S. Appl. No. 14/658,345 dated Nov. 26, 2019, 48 pages.
Final Office Action received for U.S. Appl. No. 14/658,365 dated Nov. 29, 2019, 48 pages.
Non-Final Office Action received for U.S. Appl. No. 14/658,394 dated Feb. 20, 2020, 67 pages.
Third Office Action received for Chinese Patent Application Serial No. 201710778822.6 dated Mar. 3, 2020, 43 pages (Including English Translation).
Communication pursuant to Article 94(3) EPC received for EP Patent Application Serial No. 14167627.0 dated Jan. 23, 2020, 6 pages.
Summons to attend oral proceedings pursuant to Rule 115(1) EPC received for EP Patent Application Serial No. 14167703.9. dated Feb. 6, 2020, 8 pages.
Notification of Grant of Patent for Invention received for Chinese Patent Application Serial No. 201710339669.7 dated Dec. 31, 2019, 7 pages (Including English Translation).
Summons to attend oral proceedings pursuant to Rule 115(1) EPC received for EP Patent Application Serial No. 16160611.6. dated Dec. 19, 2019, 26 pages.
Communication pursuant to Article 94(3) EPC received for EP Patent Application Serial No. 16160602.5 dated May 19, 2020, 07 pages.
Communication pursuant to Article 94(3) EPC received for EP Patent Application Serial No. 16160610.8 dated May 27, 2020, 08 pages.
Non-Final Office Action received for U.S. Appl. No. 16/129,116 dated Apr. 1, 2020, 142 pages.
Final Office Action received for U.S. Appl. No. 15/970,932 dated Apr. 13, 2020, 37 pages.
Non-Final Office Action received for U.S. Appl. No. 14/658,345 dated May 14, 2020, 83 pages.
Final Office Action received for U.S. Appl. No. 16/129,116 dated Jul. 2, 2020, 58 pages.
Non-Final Office Action received for U.S. Appl. No. 14/658,365 dated Jul. 13, 2020, 72 pages.
Non-Final Office Action received for U.S. Appl. No. 14/658,394 dated Aug. 5, 2020, 59 pages.
Final Office Action received for U.S. Appl. No. 15/714,333 dated Nov. 4, 2020, 62 pages.

(56) References Cited

OTHER PUBLICATIONS

Summons to attend oral proceedings pursuant to Rule 115(1) EPC received for EP Patent Application Serial No. 16160611.6 dated Oct. 30, 2020, 5 pages.
Notification of Reexamination received for Chinese Application No. 201610149635.7, dated Nov. 5, 2020, 17 pages.
Notification of Reexamination received for Chinese Application No. 201610149668.1, dated Oct. 20, 2020, 3 pages.
Non-Final Office Action received for U.S. Appl. No. 16/129,116 dated Nov. 16, 2020, 51 pages.
Final Office Action received for U.S. Appl. No. 14/658,365 dated Jan. 21, 2021, 96 pages.
Notice of Allowance received for U.S. Appl. No. 14/658,394 dated Feb. 9, 2021, 92 pages.

* cited by examiner

USING CLOUD-BASED DATA FOR INDUSTRIAL AUTOMATION SYSTEM TRAINING

CROSS-REFERENCE TO RELATED APPLICATIONS

This application is a continuation of, and claims priority to each of, U.S. patent application Ser. No. 14/087,922, filed Nov. 22, 2013, and entitled "USING CLOUD-BASED DATA FOR INDUSTRIAL AUTOMATION SYSTEM TRAINING," which claims priority to U.S. Provisional Patent Application Ser. No. 61/821,639, filed on May 9, 2013, and entitled "REMOTE SERVICES AND ASSET MANAGEMENT SYSTEMS AND METHODS," the entireties of which applications are hereby incorporated herein by reference.

TECHNICAL FIELD

The subject application relates generally to industrial automation, e.g., to using cloud-based data to facilitate enhancing performance in connection with an industrial automation system.

BACKGROUND INFORMATION

Industrial automation systems can perform various processes to produce desired products or processed materials. An industrial control system can comprise various industrial devices, industrial processes, other industrial assets, and network-related assets (e.g., communication network devices and software).

Industrial controllers and their associated input/output (I/O) devices can be useful to the operation of modern industrial automation systems. These industrial controllers can interact with field devices on the plant floor to control automated processes relating to such objectives as product manufacture, material handling, batch processing, supervisory control, and other such applications. Industrial controllers can store and execute user-defined control programs to effect decision-making in connection with the controlled process. Such programs can include, but are not limited to, ladder logic, sequential function charts, function block diagrams, structured text, or other such programming structures. In general, industrial controllers can read input data from sensors and metering devices that can provide discreet and telemetric data regarding one or more states of the controlled system, and can generate control outputs based on these inputs in accordance with the user-defined program.

In addition to industrial controllers and their associated I/O devices, some industrial automation systems also can include low-level control systems, such as vision systems, barcode marking systems, variable frequency drives, industrial robots, and the like, which can perform local control of portions of the industrial process, or which can have their own localized control systems.

Operators and other users can interact with industrial automation systems, for example, to facilitate performing manual operations to facilitate operation of an industrial automation system and/or monitoring or managing machines or processes associated with the industrial automation system. For example, operators and other users can interact with (e.g., work with, monitor, manage, etc.) industrial devices, industrial processes, control programs, human machine interfaces (HMIs), etc., associated with the industrial automation system, to facilitate operation of the industrial automation system. Some operators or users can have more experience than other operators or users, which often can translate into the more experienced operators or users being better performing operators or users in connection with the industrial automation system. Also, regardless of the amount of experience in industrial automation, some operators or users can perform better than other operators or users with respect to the industrial automation system. As a result, an industrial automation system, or portion thereof, typically can operate more efficiently when certain operators or users (e.g., more experienced or better performing operators or users) are working with, monitoring, or managing the industrial automation system, or portion thereof, than when other operators or users (e.g., less experienced or lower performing operators or users) are working with, monitoring, or managing the industrial automation system, or portion thereof.

The above-described deficiencies of today's industrial control and business systems are merely intended to provide an overview of some of the problems of conventional systems, and are not intended to be exhaustive. Other problems with conventional systems and corresponding benefits of the various non-limiting embodiments described herein may become further apparent upon review of the following description.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Various aspects and embodiments of the disclosed subject matter relate to the use of data analysis in a cloud platform to facilitate training users (e.g., operators, technicians, managers, etc.) to more efficiently interact with industrial automation systems. A cloud-based training service can employ a performance enhancement component that can capture user actions with respect to industrial automation systems of multiple industrial customers across one or more industrial enterprises. The performance enhancement component can receive, collect, or obtain data relating to or representative of the user actions with respect to the industrial automation systems of multiple industrial customers for storage and analysis on a cloud platform. The performance enhancement component can analyze the data (e.g., cloud-based data) to generate analysis results that can be used to facilitate training users to more efficiently interact with an industrial automation system, improve performance of an industrial automation system, and/or for other purposes, such as those disclosed herein. For instance, based at least in part on the results of the analysis of the data, the performance enhancement component can determine correlations between certain user interactions with an industrial automation system and favorable performance of the industrial automation system. The performance enhancement component also can determine user interactions with respect to an industrial automation system that can be less favorable (e.g., less efficient from a time and/or money standpoint) or unsafe based at least in part on the data analysis results.

In some implementations, the performance enhancement component can determine an alternative action(s) that a user can take to achieve a same or similar preferred operational result with respect to the industrial automation system (e.g., if the user is unable to perform the initial or primary action(s) for achieving the preferred operation result) based at least in part on the data analysis results. The performance enhancement component can generate a recommendation and/or an alternative action plan relating to the alternative action(s) that can be provided to the user to facilitate training the user to achieve the same or similar preferred operational result with respect to the industrial automation system.

The performance enhancement component also can determine and/or design components, models, or techniques that can be employed to facilitate automating a preferred user action(s) with respect to an industrial automation system based at least in part on the data analysis results. For example, if the performance enhancement component determines or identifies a set of preferred user actions of a user(s) that correlate with optimal or favorable performance of the industrial automation system, the performance enhancement component can facilitate determining and/or designing one or more components, models, or techniques that can emulate the set of preferred user actions of a user(s). The one or more components, models, or techniques can be employed by or incorporated in the industrial automation system to automatically perform the set of preferred actions that had been performed by the user(s).

In some implementations, based at least in part on the data analysis results, the performance enhancement component can determine improved user assignments in connection with the industrial automation system, wherein the improved user assignments can facilitate improved performance of the industrial automation system. The performance enhancement component also can generate training modules or training presentations based at least in part on one or more preferred user actions (e.g., user actions that correlate with favorable performance of the industrial automation system). The training modules or training presentations can be used to train users to more efficiently interact with an industrial automation system to achieve improved system performance.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
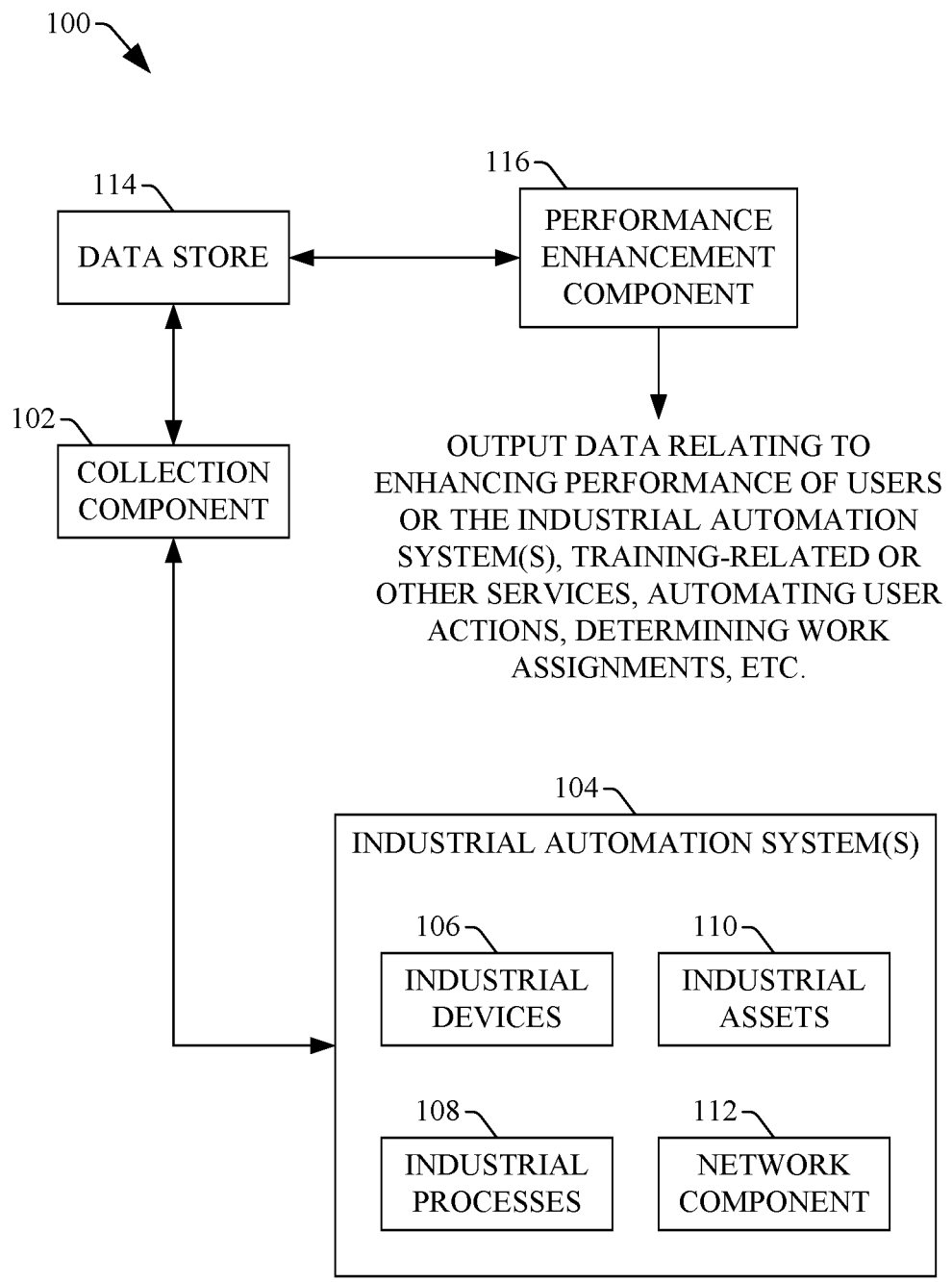
FIG. 1 illustrates a block diagram of an example system (e.g., performance enhancement system) that can facilitate enhancing performance (e.g., training users) and performing other operations in connection with an industrial automation system associated with an industrial enterprise based on cloud-based data relating to the industrial enterprise, in accordance with various implementations and embodiments of the disclosed subject matter.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

To the extent any amendments, interpretations, characterizations, disclaimers of scope, remarks, or other assertions previously made, in this patent application or in any related patent application(s) or patent(s), including any parent, sibling, or child patent application(s) or patent(s) related to this patent application, with respect to any art, cited art or otherwise, could be construed as a disclaimer(s) of any subject matter supported by the disclosed subject matter of this patent application, Applicant hereby rescinds and retracts such disclaimer(s). Applicant also respectfully submits that any cited art previously considered in any related patent application(s) or patent(s), including any parent, sibling, or child patent application(s) or patent(s) related to this patent application, may need to be re-visited.

Industrial automation systems can perform various processes to produce desired products or processed materials. An industrial control system can comprise various industrial devices, industrial processes, other industrial assets, and network-related assets (e.g., communication network devices and software).

Operators and other users can interact with industrial automation systems, for example, to facilitate performing manual operations to facilitate operation of an industrial automation system and/or monitoring or managing machines or processes associated with the industrial automation system. For example, operators and other users can interact with (e.g., work with, monitor, manage, etc.) industrial devices, industrial processes, control programs, human machine interfaces (HMIs), etc., associated with the industrial automation system, to facilitate operation of the industrial automation system. Some operators or users can have more experience than other operators or users, which often can translate into the more experienced operators or users being better performing operators or users in connection with the industrial automation system. Also, regardless of the amount of experience in industrial automation, some operators or users can perform better than other operators or users with respect to the industrial automation system. Further, with respect to customers, some operators or users can be more familiar with or have more knowledge of a particular customer's industrial-automation-system configuration than other operators or users. For instance, a well-performing operator (e.g., experienced or skilled operator) can accrue a detailed working knowledge of how to manage or process for optimal performance given a range of operating scenarios (e.g., how to quickly clear a particular fault, which preventative operations will maximize a machine or process uptime, etc.). This can include not only knowledge of the manufacturing process itself, which may be common across multiple customers working in similar industries, but also knowledge of the idiosyncrasies of a customer's particular system configuration (e.g., the particular combination of machines, automation devices, and software running the process).

As a result, an industrial automation system, or portion thereof, typically can operate more efficiently when certain operators or users (e.g., more experienced or better performing operators or users, operators or users who are more familiar with a particular customer's industrial-automation-system configuration) are working with, monitoring, or managing the industrial automation system, or portion thereof, than when other operators or users (e.g., less experienced or lower performing operators or users, or operators or users who are less familiar with, or are less knowledgeable regarding, a particular customer's industrial-automation-system configuration) are working with, monitoring, or managing the industrial automation system, or portion thereof.

To that end, presented are various systems, methods, and techniques of the disclosed subject matter that relate to the use of data analysis (e.g., big data analysis) in a cloud platform to facilitate enhancing performance, and/or performing training-related and other operations, in connection with industrial automation systems. A cloud-based performance enhancement service can capture and collect data relating to interactions of users with industrial automation systems of multiple industrial customers for storage and analysis on a cloud platform. The cloud-based performance enhancement service can employ a performance enhancement component that can analyze the data to generate analysis results that can be used to facilitate making various determinations relating to enhancing performance, and/or training of users, in connection with an industrial automation system or other determinations in connection with an industrial automation system, or performing other actions or operations in connection with an industrial automation system, to facilitate improving the performance of the industrial automation system and the users associated with the industrial automation system. For instance, based at least in part on the data analysis results, the performance enhancement component can facilitate determining correlations between certain user interactions and favorable performance of an industrial automation system, determining user interactions that are less favorable or unsafe, determining alternative actions that a user can take to achieve a same or similar preferred operational result, generating recommendations relating to the alternative actions, determining or designing components or techniques that can automate a preferred user action(s), determining improved user assignments in connection with the industrial automation system, and/or generating training modules or presentations based at least in part on preferred user actions that can be used to train users to more efficiently interact with an industrial automation system to achieve improved system performance.

As used in this application, the terms "component," "system," "platform," "layer," "controller," "terminal," "station," "node," "interface" can refer to a computer-related entity or an entity related to, or that is part of, an operational apparatus with one or more specific functionalities, wherein such entities can be either hardware, a combination of hardware and software, software, or software in execution.

For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 illustrates a block diagram of an example system 100 (e.g., performance enhancement system) that can facilitate enhancing performance, training users, and/or performing other operations in connection with an industrial automation system associated with an industrial enterprise based on cloud-based data relating to the industrial enterprise, in accordance with various implementations and embodiments of the disclosed subject matter. The system 100 can leverage the broad range of customer-related data that can be captured and stored in the cloud platform to facilitate enhancing performance, training users, and/or performing other operations in connection with the industrial automation system, wherein the customer-related data can characterize the assets and automation process of the customer's industrial automation system. The system 100 also can capture data relating to the workflow, interactions, behavior, and habits of users and store such data in the cloud platform, wherein such data also can be used to facilitate enhancing performance or training users in connection with working with the industrial automation system.

The system 100 can comprise a collection component 102 (e.g., data collection component) that can be associated with an industrial automation system 104 associated with an industrial enterprise. The industrial automation system 104 can comprise one or more industrial devices 106, industrial processes 108, or other industrial assets 110 that can be distributed throughout an industrial facility(ies) in accordance with a desired industrial-automation-system configuration. The industrial automation system 104 can perform industrial processes or other actions to facilitate producing desired products, processed materials, etc., as an output.

The industrial automation system 104 also can include a network component 112 that can be associated with (e.g., interfaced with, communicatively connected to) the various industrial devices 106, processes 108, and/or other assets 110 of the industrial automation system 104 to facilitate communication of information (e.g., command or control information, status information, production information, etc.) between the various industrial devices 106, processes 108, and/or other assets 110 via the network component 112. The network component 112 can be associated with (e.g., interfaced with, communicatively connected to) the collection component 102 to facilitate the communication of data between the industrial automation system 104 and the collection component 102.

The collection component 102 can monitor or track the operation of the industrial automation system 104 and users associated with the industrial automation system 104 (e.g., operators, technicians, managers, engineers, etc., interacting or working with the industrial automation system 104). The collection component 102 can receive, obtain, detect, capture, or collect data relating to the operation of the industrial automation system 104, the users associated with the industrial automation system 104, and the network component 112. The collection component also can receive, obtain, detect, capture, or collect data from other sources, such as extrinsic sources.

The collection component 102 can receive, obtain, detect, capture, or collect data relating to the work or interactions of users with the industrial automation system 104 and the network component 112. For example, the collection component 102 can receive and/or capture data relating to the respective work or interactions of respective users with the industrial automation system 104, including the respective work or interactions of respective users with the various industrial devices 106, processes 108, HMIs, control programs, other assets 110, the network component 112, etc., associated with the industrial automation system 104. The collection component 102 can comprise or be associated with various sensor components (not shown in FIG. 1) that can facilitate sensing, detecting, obtaining, or capturing data relating to the work or interactions of users with the industrial automation system 104 and the network component 112, the operation of the industrial automation system 104, and the operation of the network component 112. The sensor components can comprise, for example, video sensor components that can be distributed across the industrial automation system 104 and can sense or capture visual data, audio sensor components that can be distributed across the industrial automation system 104 and can sense or capture audio data, motion sensor components that can be distributed across the industrial automation system 104 and can sense or capture motion data, operational sensor components that can be distributed across the industrial automation system 104 and can sense or capture various operational aspects or parameters (e.g., status, temperature, quantity, quality, etc.) relating to the industrial automation system 104, location sensor components that can sense the respective locations of respective users (e.g., based at least in part on determining the respective locations of their respective mobile communication devices or tags (e.g., radio-frequency identification (RFID) tags), etc. For example, the collection component 102, e.g., via the various sensor components, can facilitate capturing user actions and/or behavior with respect to the various portions (e.g., various industrial devices 106, processes 108, HMIs, control programs, other assets 110, the network component 112, etc.) of the industrial automation system 104.

The collection component 102 also, e.g., via the various sensor components, can receive, obtain, detect, capture, or collect data relating to the industrial devices 106 (e.g., operation or status of the industrial devices, properties or characteristics of the industrial devices, maintenance records of the industrial devices, configurations of the industrial devices, etc.), industrial processes 108 (e.g., operation or status of the industrial processes, properties or characteristics of the industrial processes, maintenance records associated with the industrial processes, configurations of the industrial processes, etc.), and the other industrial assets 110 (e.g., operation or status of the industrial assets, properties or characteristics of the industrial assets, maintenance records associated with the industrial assets, configurations of the industrial assets, etc.). The collection component 102 also can receive or collect data relating to operation of the components of the network component 112 (e.g., operation or status of the network devices or assets, communication conditions associated with a communication channel, total bandwidth of a communication channel, available bandwidth of a communication channel, properties or characteristics of the network devices or assets, maintenance records associated with the network devices or assets, configurations of the network devices or assets, etc.).

The system 100 also can comprise a data store 114 that can be associated with (e.g., interfaced with, communicatively connected to) the collection component 102. The collection component 102 can provide (e.g., communicate, write, etc.) the data relating to the user interactions with the industrial automation system 104, the operation of the industrial automation system 104, and the operation of the network component 112 to the data store 114 for storage in the data store 114.

The system 100 further can include a performance enhancement component 116 that can facilitate performing various tasks and functions relating to enhancing performance of users and/or the industrial automation system 104, training users associated with the industrial automation system 104, or performing other tasks and functions. In accordance with various implementations, the performance enhancement component 116 can comprise the collection component 102, or a portion thereof, and/or the data store 114, or a portion thereof, or can be associated with (e.g., interfaced with, communicatively connected to) the collection component 102 and/or the data store 114 to facilitate obtaining data associated with the users, the industrial automation system 104, and network component 112, or data obtained from other sources (e.g., extrinsic sources), wherein the data (e.g., big data or cloud data) can be analyzed by the performance enhancement component 116 to facilitate performing the various tasks and functions relating to enhancing performance and/or training users in connection with the industrial automation system 104 or performing other tasks and functions.

The performance enhancement component 116 can determine or identify correlations between certain user interactions or behaviors in connection with operation of an industrial automation system 104 and favorable performance of the industrial automation system 104, in accordance with a set of defined performance criteria. The set of defined performance criteria can facilitate defining what is considered favorable performance of an industrial automation system 104 or determining whether performance of an industrial automation system 104 is favorable. The set of defined performance criteria, including criteria relating to favorable performance of an industrial automation system 104, can be or relate to, for example, whether a golden batch (e.g., a defined optimal or ideal production batch or operation run) has been achieved in operation of an industrial automation system 104, whether a desired (e.g., an optimal, or a substantially or acceptably close to optimal) condition or result has been achieved in operation of the industrial automation system 104, whether a lack or substantial lack of poor user actions has been observed or determined in connection with the operation of the industrial automation system 104, whether a lack or substantial lack of breakdowns or repairs have been observed or determined in connection with the operation of the industrial automation system 104, whether a desired amount of energy usage (e.g., desirably, optimally, or acceptably small amount of energy usage) has been achieved in connection with the operation of the industrial automation system 104, whether a lowest or acceptably low cost of operation of (e.g., lowest or acceptably low cost per unit produced by) the industrial automation system 104 has been achieved, or other desired criteria (e.g., criteria relating to favorable performance of an industrial automation system, as desired or specified by a customer).

In accordance with various implementations, in accordance with the set of defined performance criteria, the performance enhancement component 116 can determine or identify preferred user actions in relation to (e.g., in connection with) the industrial automation system 104 (e.g., user actions that result in more favorable performance of the industrial automation system 104), determine or identify poor or unsafe user practices in relation to the industrial automation system 104 (e.g., user actions that result in less favorable performance of the industrial automation system 104 or are unsafe), facilitate training users to perform their tasks more efficiently with respect to the industrial automation system 104 (e.g., based at least in part on the preferred user actions), facilitate automating preferred user actions, and/or performing other tasks or functions, as more fully disclosed herein. The disclosed subject matter, including the various aspects and implementations regarding the performance enhancement component 116, collection component 102, and data store 114, can be employed to facilitate the set up and deployment of an industrial automation system(s), improvement of an industrial automation system(s), performance analysis relating to operation of the of an industrial automation system(s), cost analysis (e.g., production cost analysis) relating to an industrial automation system(s), training of users (e.g., operators, technicians, managers, engineers, maintenance personnel, etc.) associated with an industrial automation system(s), etc.

In some implementations, the performance enhancement component 116, collection component 102, and/or the data store 114 can be located in a cloud platform that can be interfaced with the industrial automation system 104. In accordance with various other implementations, one or more of the performance enhancement component 116, collection component 102, and/or the data store 114 can be located at the plant or original equipment manufacturer (OEM) level associated with the industrial automation system 104, or can be located in a different platform or level.

To facilitate performing performance-enhancement-related functions or operations (e.g., determining preferred user actions in relation to the industrial automation system 104, determining poor or unsafe user practices in relation to the industrial automation system 104, facilitating training users to perform their tasks more efficiently with respect to the industrial automation system 104 (e.g., based at least in part on the preferred user actions), facilitating automating preferred user actions, etc.), the performance enhancement component 116 can access the data store 114 (e.g., cloud-based data store) to obtain a set of data relating to the operation of the industrial automation system 104 and/or another industrial automation system (e.g., another system comprising an industrial device(s), process(es), and/or asset(s) that can be the same or similar to an industrial device(s) 106, process(es) 108, and/or asset(s) 110 of the industrial automation system 104), the interaction or behavior of users in relation to the industrial automation system 104 and/or another industrial automation system (e.g., another system comprising an industrial device(s), process(es), and/or asset(s) that can be the same or similar to an industrial device(s) 106, process(es) 108, and/or asset(s) 110 of the industrial automation system 104), the operation of the network component 112, and/or the interaction or behavior of users in relation to the network component 112. The set of data can comprise information relating to, for example, the work, interactions, or behavior of users in relation to the industrial automation system 104 and the network component 112; the respective operations, responses, properties, characteristics, functions, configurations, etc., of respective industrial devices 106, industrial processes 108, other industrial assets 110, or network-related devices of the network component 112; or the configuration of industrial devices 106, industrial processes, or other assets in relation to each other.

For example, with regard to work, interactions, or behavior of users in relation to the industrial automation system 104 or network component 112, the set of data can include information relating to affirmative actions taken by users in connection with the industrial automation system 104 or network component 112, active or passive responses of users in connection with the industrial automation system 104 or network component 112 (e.g., response of user to an operation or response of the industrial automation system 104 or network component 112, response of user to an alarm or notification associated with the industrial automation system 104 or network component 112, etc.), shift-specific or user-specific behavior or interaction of users (e.g., operators, managers, technicians, etc.) with the industrial automation system 104, work schedules or assignments of users, maintenance schedules for respective portions of the industrial automation system 104 or network component 112, production or process flows of the industrial automation system 104 at particular times or in connection with particular projects or users, and/or other aspects or features of the industrial automation system 104. For instance, the performance enhancement component 116 can monitor keystrokes of users, mouse movements made by users, HMI screen navigations of users, information displayed on an HMI screen (e.g., via HMI screen captures), manual control panel interactions (e.g., sequence and timing of pushbutton and/or switch operations), observed usage patterns of users, observed operator locations in relation to the industrial automation system 104, etc. The performance enhancement component 116 can associate (e.g., link, map, marry, etc.) the captured human activity data with particular user identifiers, for example, using explicit login information (e.g., username, password, etc.) for respective users, by detecting (e.g., automatically detecting) the user's mobile communication device (e.g., mobile phone, electronic pad or tablet, laptop computer, etc., via a communication device identifier (e.g., media access control (MAC) address)) or other identifier or tag (e.g., radio-frequency identification (RFID) tag) associated with the user near the location of activity (e.g., determine who is interacting with an industrial device, process, or asset based at least in part on proximity of the user's mobile communication device to the industrial device, process, or asset), or by detecting (e.g., automatically detecting) biometric information (e.g., information relating to fingerprints, facial recognition, eye or iris recognition, etc.) of a user near the location of activity, etc. In some scenarios, monitoring of a user's mobile communication device (e.g., personal communication device) by the performance enhancement component 116 can be contingent on approval from both the customer (associated with the industrial facility) and/or the user.

The performance enhancement component 116 can utilize authentication techniques and/or can leverage the authentication procedures associated with the industrial automation system 104 to facilitate identifying users and their relationship to or interactions with the industrial automation system 104. If a user (e.g., an authorized operator) is using a device associated with the industrial automation system 104, and the device is handed over to a different user (e.g., portable device is physically passed from one user to another user, or the other user takes over operation of the device), the performance enhancement component 116 can detect the new user who is operating the device based at least in part on authentication information (e.g., username, password, biometric information, etc.) associated with the new user and/or by detecting the location of the new user in relation to the device based at least in part on the new user's communication device (e.g., the location of the communication device via the communication device identifier) and/or ID tag (e.g., RFID tag) of the user. In some implementations, the performance enhancement component 116 can facilitate controlling access to devices, processes, or assets associated with the industrial automation system 104 by a user based at least in part on authentication of the user. For example, the performance enhancement component 116 can facilitate granting access to devices, processes, or assets associated with the industrial automation system 104 to users who present valid authentication information to the performance enhancement component 116 or industrial automation system 104, and denying access to devices, processes, or assets associated with the industrial automation system 104 to users who do not present valid authentication information to the performance enhancement component 116 or industrial automation system 104.

The performance enhancement component 116 also can facilitate scoping or tailoring the data collection, including the collection and use of identification information or authentication information associated with a user, in a manner that can add value to facilitate the performance of functions and operations by the performance enhancement component 116 without impeding production by the users or the industrial automation system 104, or violating safety procedures. For example, in some situations, fingerprint-based or retina-based authentication information may not be appropriate in areas of the industrial enterprise that require gloves or goggles to be worn by users. As another example, in other situations, monitoring of a communication device (e.g., mobile communication device) of a user may not be possible or suitable for areas of the industrial enterprise where constant or reliable network communication (e.g., wireless network communication) is not available. With regard to such situations, the performance enhancement component 116 can facilitate determining the location of a user, determining a device or process being operated by the user, performing training-related functions or operations, etc., through other means (e.g., username or password provided by the user in connection with a device, process, or location; work assignment information for respective users; etc.). In some implementations, the performance enhancement component 116 or another component can notify a user if the monitoring of the user's location may increase the user's risk of exposure to electromagnetic forces (EMFs).

With further regard to the set of data, as an example of properties or characteristics of data in the set of data, the properties or characteristics for industrial devices 106 or industrial processes 108 can comprise mechanical or process properties or characteristics associated with industrial devices or processes (e.g., mechanical latency, process cycle times, operating schedules, etc., associated with industrial devices). The properties or characteristics for network-related devices can comprise communication properties or characteristics (e.g., wireless and/or wireline communication functionality, type(s) of network or communication protocol(s), network or communication specifications, total bandwidth, etc.) of the respective network-related devices, etc.

The set of data also can comprise information relating to, for example, the configuration of the network-related devices in relation to each other, or the configuration of network-related devices in relation to the industrial devices 106, industrial processes 108, and/or other industrial assets 110; software, firmware, and/or operating system utilized by the industrial automation system 104 (e.g., type(s), version(s), revision(s), configuration(s), etc., of the software, firmware, and/or operating system); functional and communicative relationships between industrial devices 106, industrial processes 108, industrial assets 110, network-related devices of the network component 112, etc. (e.g., communication connections or conditions between industrial devices, types of connections between industrial devices, communication connections between industrial devices and network-related devices, etc.).

The performance enhancement component 116 can analyze (e.g., perform "big data" analysis on) the set of data relating to the industrial automation system 104 and/or the other industrial automation system, and can generate analysis results based at least in part on the analysis of the set of data, to facilitate enhancing performance of the industrial automation system 104 or users associated therewith, performing various user-training-related functions or operations, or performing other functions or operations (e.g., automating preferred user actions), in connection with the industrial automation system 104. The performance enhancement component 116 also can tailor the data analysis on the set of data, and even can tailor the set of data, based at least in part on the performance-enhancement-related functions or operations, user-training-related functions or operations, or other functions or operations. For instance, in connection with a first function (e.g., determining preferred user actions in relation to the industrial automation system 104), the performance enhancement component 116 can tailor a first set of data and tailor a first data analysis on that first set of data to facilitate efficiently performing the first function; and in connection with a second function (e.g., automating preferred user actions in relation to the industrial automation system 104), the performance enhancement component 116 can tailor the second set of data and tailor the second data analysis on the second set of data to facilitate efficiently performing the second function. For instance, with regard to the first function, the performance enhancement component 116 can tailor the first set of data retrieved from the data store 114 to obtain data that is determined to be relevant to the performing the first function. The performance enhancement component 116 also can tailor the first data analysis on the first set of data to efficiently obtain a desired result (e.g., accurately determining or identifying a preferred user action(s)) from performing the first function (e.g., determining preferred user actions in relation to the industrial automation system 104). The performance enhancement component 116 can tailor the data and analysis in connection with performing the second function in a similar manner that corresponds to the second function.

Based at least in part on the results of the data analysis (e.g., analysis of the human behavior data and other relevant data), the performance enhancement component 116 can determine or identify correlations between certain user actions (e.g., certain human action or behavior sequences) and favorable performance by the industrial automation system 104. This can thereby facilitate determining or identifying preferred or optimal user behavior that facilitates preferred or optimal performance of the industrial automation system 104. In this way, the performance enhancement component 116 can analyze human behavior patterns to facilitate determining how operators are to interact with particular industrial devices or machines, industrial processes, or industrial assets to achieve more favorable performance by the industrial automation system 104.

For instance, based at least in part on the analysis results, the performance enhancement component 116 can determine or identify preferred user actions in relation to (e.g., in connection with) the industrial automation system 104 (e.g., user actions that result in more favorable performance of the industrial automation system 104), in accordance with a set of defined performance criteria. For example, based at least in part on the analysis results, the performance enhancement component 116 can determine or identify that the interaction(s) or behavior(s) of a first user in connection with an operation(s) or event(s) associated with the industrial automation system 104 resulted in a more favorable response or performance of the industrial automation system 104 than a response or performance of the industrial automation system 104 that resulted from other interactions or behaviors of other users in connection with a same or similar operation(s) or event(s) associated with the industrial automation system 104. The performance enhancement component 116 can determine or identify the interaction(s) or behavior(s) of the first user as being a preferred user action(s) (e.g., an action or a sequence of actions) that is to be implemented in connection with the operation(s) or event(s) associated with the industrial automation system 104, in accordance with the set of defined performance criteria.

In some implementations, the performance enhancement component 116 can further analyze the interaction(s) or behavior(s) of the first user in connection with the operation(s) or event(s) associated with the industrial automation system 104 to facilitate determining whether the action(s) of the first user can be improved, enhanced, or modified to facilitate gaining an even more favorable response or performance of the industrial automation system 104 than the favorable response or performance of the industrial automation system 104 that resulted from the interaction(s) or behavior(s) of the first user in connection with the operation(s) or event(s) associated with the industrial automation system 104, in accordance with the set of defined performance criteria. If the performance enhancement component 116 determines that the action(s) of the first user can be improved, enhanced, or modified to facilitate gaining an even more favorable response or performance of the industrial automation system 104, the performance enhancement component 116 can determine or identify the interaction(s) or behavior(s) of the first user, as further improved, enhanced, or modified, as being a preferred user action(s) (e.g., an action or a sequence of actions) that is to be implemented in connection with the operation(s) or event(s) associated with the industrial automation system 104, in accordance with the set of defined performance criteria.

For example, based at least in part on the analysis results, the performance enhancement component 116 can determine that, in a sequence of four actions performed by the first user in connection with the operation(s) or event(s) associated with the industrial automation system 104, the first action, second action, and fourth action were optimal or at least substantially optimal, but the third action was substantially sub-optimal (e.g., failed to satisfy a defined threshold performance parameter or parameter range), in accordance with the set of defined performance criteria. The performance enhancement component 116 can determine a different or modified action that a user can perform, instead of performing the third action in the way the first user performed it, based at least in part on the data analysis results, wherein the different or modified action can satisfy the applicable defined threshold performance parameter or parameter range, in accordance with the set of defined performance criteria.

The performance enhancement component 116 can generate a training presentation or training module illustrating or presenting the preferred user action(s) (e.g., as originally performed by the first user, or as improved, enhanced, or modified by the performance enhancement component 116) and/or comprising a set of instructions that can facilitate training users to perform the preferred user action(s) in connection with the operation(s) or event(s) associated with the industrial automation system 104. The performance enhancement component 116 can store the training presentation or training module, or a portion thereof, in the data store 114, and/or can provide the training presentation or training module for use (e.g., presentation) in training users. The training presentation can be or comprise, for example, a video (e.g., an animated video), a visual illustration, an audio presentation, a training model, an interactive training simulation, printed materials (e.g., written instructions, training manual or guide, etc.), a searchable training or troubleshooting database (e.g., knowledgebase), a poster, a placard, and/or another suitable training presentations, presenting or illustrating the preferred user action(s) (or alternate user action(s), as disclosed herein). The training presentation or training module can be used to facilitate training users (e.g., new or inexperienced user, poor performing user) to perform their work tasks (e.g., work duties, work assignments, etc.) more efficiently when working with the industrial automation system 104 (e.g., based at least in part on the preferred user action(s)).

The performance enhancement component 116 also can determine or identify poor or unsafe user practices, and the users who are engaging in the poor or unsafe practices, in relation to the industrial automation system 104 (e.g., user actions that result in less favorable performance of the industrial automation system 104 or are unsafe), based at least in part on the data analysis results, in accordance with the set of defined performance criteria. For instance, the performance enhancement component 116 can determine or identify actions or behaviors of users in connection with an operation(s) or event(s) associated with the industrial automation system 104 that result in a relatively poor performance or response by the industrial automation system 104, are at least potentially unsafe as potentially being harmful to a user(s) or to the industrial automation system 104, and/or that have resulted in harm to a user(s) or the industrial automation system 104, in accordance with the set of defined performance criteria. The performance enhancement component 116 also can determine or identify the differences in user actions, habits, workflows, etc., between highly productive users and moderately or poorly productive users to facilitate determining preferred user actions, alternate user actions, or unproductive or unsafe user actions.

The performance enhancement component 116 can generate a training presentation or training module illustrating or presenting the poor or unsafe user action(s) and/or comprising a set of instructions, guidelines, or recommendations that can facilitate training instructing users to not perform the poor or unsafe user action(s) in connection with the operation(s) or event(s) associated with the industrial automation system 104 to facilitate mitigating poor work performance habits of under-performing users. The performance enhancement component 116 can store this training presentation or training module, or a portion thereof, in the data store 114, and/or can provide this training presentation or training module for use (e.g., presentation) in training users. This training presentation or training module can be employed to facilitate training users (e.g., new or inexperienced user, poor performing user) to perform their tasks more efficiently and/or safely with respect to the industrial automation system 104.

The performance enhancement component 116 can facilitate determining one or more alternate user actions that a user can perform to complete a work task to achieve a same or substantially same performance result as when the work task is completed by another user through performing one or more user actions (e.g., preferred user actions). For example, in some instances, a first user is able to perform one or more user actions (e.g., preferred user actions) to complete a work task in connection with the industrial automation system that produces a favorable performance or response by the industrial automation system, whereas a second user may not be able to perform the one or more user actions that the first user was able to perform when performing the work task. For instance, the second user may have physical limitations or other limitations (e.g., mental limitations, skill limitations, etc.) that can make it difficult, if not impossible, for the second user to perform the one or more user actions the way the first user was able to perform them. Based at least in part on the data analysis results, the performance enhancement component 116 can determine one or more alternate user actions that can be performed by the second user to complete the work task to achieve a same or substantially same performance result as when the work task is performed by the first user through performing one or more user actions (e.g., preferred user actions).

The performance enhancement component 116 also can facilitate automating preferred user actions in connection with the operation(s) or event(s) associated with the industrial automation system 104 so that the industrial automation system 104 can automatically perform the preferred user actions in connection with the operation(s) or event(s) associated with the industrial automation system 104 without a user having to perform the preferred user actions. To facilitate automating a preferred user action(s), the performance enhancement component 116 can determine and/or design components, models, techniques, or algorithms that, when implemented by the industrial automation system 104, can facilitate having the industrial automation system 104 perform (e.g., automatically perform) the preferred user action(s), based at least in part on the data analysis results. For example, if the performance enhancement component 116 determines or identifies a set of preferred user actions of a user(s) that correlate with optimal or favorable performance of the industrial automation system 104, the performance enhancement component 116 can facilitate determining and/or designing one or more components, models, techniques, or algorithms that can emulate or reproduce performing the set of preferred user actions of a user(s). The components or models can comprise hardware and/or software. With regard to software-related components or models, the performance enhancement component 116 can facilitate determining, designing, and/or generating code (e.g., machine or computer executable code) that can facilitate emulating the performance of the preferred user actions by the user. The performance enhancement component 116 or another component can facilitate employing or incorporating the one or more components, models, or techniques by or in the industrial automation system 104 to facilitate enabling the industrial automation system 104 to automatically perform the set of preferred actions that previously had been performed by the user(s).

In some implementations, based at least in part on the data analysis results, the performance enhancement component 116 also can determine improved user assignments in connection with the industrial automation system 104, wherein the improved user assignments can facilitate improved performance of the industrial automation system 104. For example, based at least in part on the data analysis results, the performance enhancement component 116 can determine or identify that a first user performs better than a second user in connection with a first portion (e.g., a first industrial process or first subset of industrial devices) of the industrial automation system 104 resulting in more favorable performance when the first user is interacting or working with the first portion of the industrial automation system 104. The performance enhancement component 116 also can determine or identify that the first user and second user perform comparably (e.g., the same or substantially the same) in connection with a second portion (e.g., a second industrial process or second subset of industrial devices) of the industrial automation system 104. With this knowledge that the first user performs better than the second user with regard to the first portion and the first user and second user perform comparably with regard to the second portion, in accordance with the set of defined performance criteria, the performance enhancement component 116 can determine that the first user is to be assigned to work with the first portion of the industrial automation system 104 and the second user is to be assigned to work with the second portion of the industrial automation system 104 for a particular work shift because such work assignments will produce a more favorable or improved performance by the industrial automation system 104 than if the second user was assigned to work with the first portion and the first user was assigned to work with the second portion. The performance enhancement component 116 can generate work assignments that assign the first user to work with the first portion of the industrial automation system 104 and assign the second user to work with the second portion of the industrial automation system 104 for that particular work shift. The performance enhancement component 116 can store the work assignments in the data store 114 and/or present the work assignments via a desired interface (e.g., display screen, printer, etc.).

In some implementations, to facilitate designing, developing, or generating training presentations or training modules, or determining, developing, designing, or generating components, models, or techniques that can facilitate automating one or more preferred user actions, the performance enhancement component 116 can facilitate simulating or emulating the industrial automation system 104 and its constituent industrial devices, processes, and other assets, and/or simulating or emulating preferred user actions, or simulating or emulating components, models, or techniques that can reproduce or perform the one or more preferred users actions. Based at least in part on the results of the analysis of the set of data, the performance enhancement component 116 can simulate or emulate (e.g., determine and/or generate a simulation or an emulation for) the industrial automation system 104, including determining respectively simulating or emulating the respective industrial devices 106, industrial processes 108, other assets 110, and network-related devices of the network component 112, simulating or emulating the interrelationships (e.g., system configuration, connections, etc.) between the respective industrial devices 106, industrial processes 108, other industrial assets 110, and network-related devices of the network component 112, and/or simulating or emulating the properties, characteristics, functions, etc., of the respective devices, processes, and/or assets of the industrial automation system 104, etc. Based at least in part on the results of the analysis of the set of data, the performance enhancement component 116 also can simulate or emulate (e.g., determine and/or generate a simulation or an emulation for) one or more components, models, or techniques that can facilitate automating one or more preferred user actions to facilitate developing or generating one or more components, models, or techniques that can be incorporated in or used by the industrial automation system 104 to facilitate automating performance of the one or more preferred actions by the industrial automation system 104 (e.g., instead of a user performing the one or more preferred actions) and enabling the industrial automation system 104 to perform more favorably and efficiently (e.g., based at least in part on the automating of the one or more preferred user actions), in accordance with the set of defined performance criteria.

Figure 2:
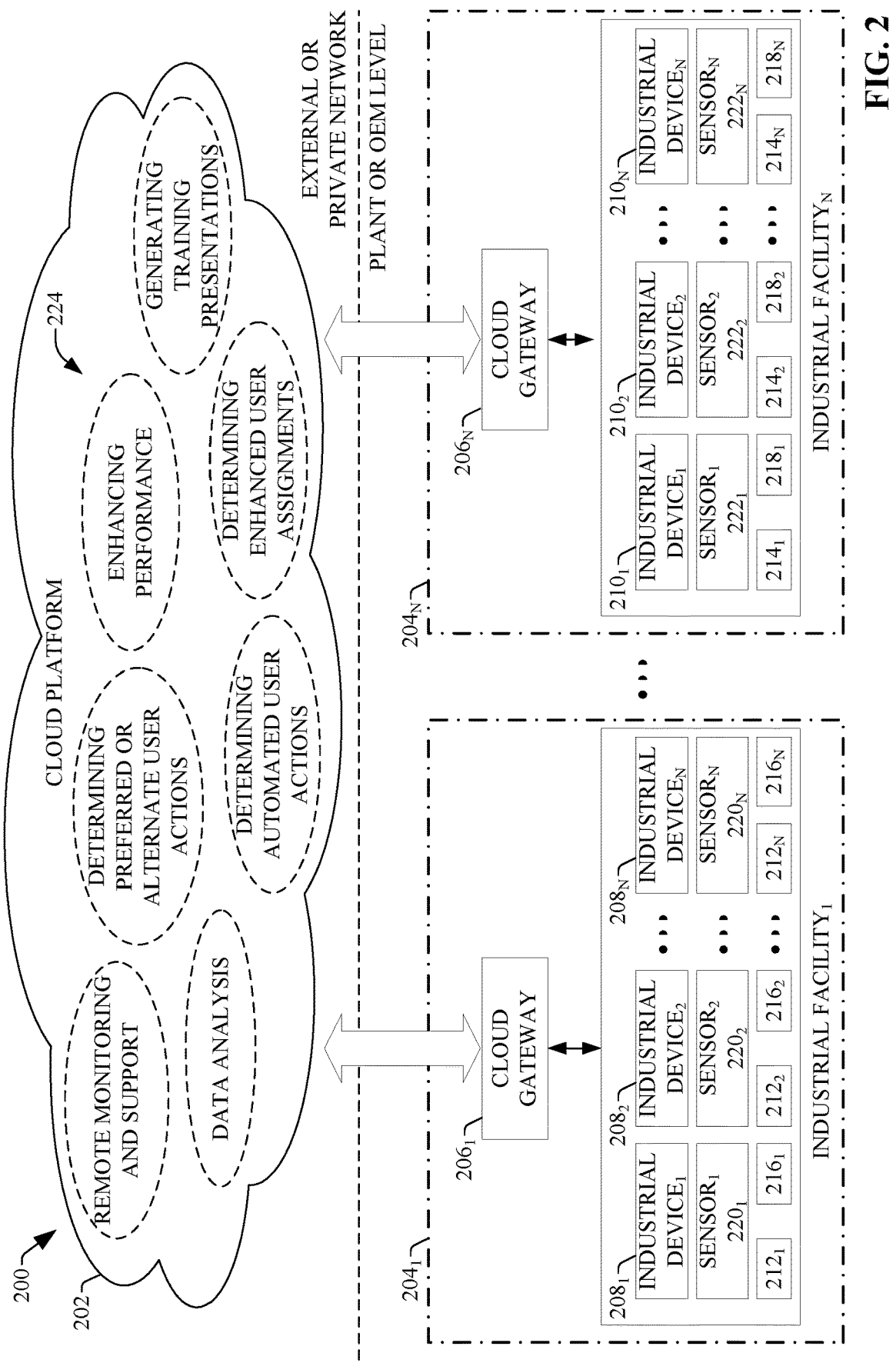
FIG. 2 is a diagram of a high-level overview of an example industrial enterprise that can leverage cloud-based services, including performance enhancement services, training-related services, data collection services, and data storage services, in accordance with various aspects and embodiments of the disclosed subject matter.

As disclosed herein, the system 100 (e.g., training system 100), or a portion thereof, can be located in a cloud platform. To provide a general context for the cloud-based system and services described herein, FIG. 2 illustrates a block diagram of a high-level overview of an example industrial enterprise 200 that can leverage cloud-based services, including training-related services, data collection services, and data storage services, in accordance with various aspects and embodiments of the disclosed subject matter. The industrial enterprise 200 can comprise one or more industrial facilities, such as industrial facility$_1$ 204$_1$ up through industrial facility$_N$ 204$_N$, wherein each industrial facilitate can include a number of industrial devices in use. For example, industrial facility$_1$ 204$_1$ can comprise industrial device$_1$ 208$_1$ up through industrial device$_N$ 208$_N$, and industrial facility$_N$ 204$_N$ can comprise industrial device$_1$ 210$_1$ up through industrial device$_N$ 210$_N$. The industrial devices (e.g., 208$_1$, 208$_N$, 210$_1$, 210$_N$, etc.) can make up one or more automation systems that can operate within the respective industrial facilities (e.g., industrial facility$_1$ 204$_1$ up through industrial facility$_N$ 204$_N$). Exemplary industrial automation systems can include, but are not limited to, batch control systems (e.g., mixing systems), continuous control systems (e.g., proportional-integral-derivative (PID) control systems), or discrete control systems. Industrial devices (e.g., 208$_1$, 208$_N$, 210$_1$, 210$_N$, etc.) can include such industrial devices as industrial controllers (e.g., programmable logic controllers or other types of programmable automation controllers); field devices such as sensors and meters; motor drives; HMIs; industrial robots, barcode markers, and readers; vision system devices (e.g., vision cameras); smart welders; or other types of industrial devices.

Exemplary industrial automation systems can include one or more industrial controllers that can facilitate monitoring and controlling of their respective industrial processes. The industrial controllers can exchange data with the field devices using native hardwired input/output (I/O) or via a plant network, such as Ethernet/Internet Protocol (IP), Data Highway Plus, ControlNet, Devicenet, or the like. A given industrial controller typically can receive any combination of digital or analog signals from the field devices that can indicate a current state of the industrial devices and/or their associated industrial processes (e.g., temperature, position, part presence or absence, fluid level, etc.), and can execute a user-defined control program that can perform automated decision-making for the controlled industrial processes based on the received signals. The industrial controller can output appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code that can be used to process input signals read into the controller and to control output signals generated by the industrial controller, including, but not limited to, ladder logic, sequential function charts, function block diagrams, structured text, or other such platforms.

Although the exemplary overview illustrated in FIG. 2 depicts the industrial devices (e.g., 208$_1$, 208$_N$, 210$_1$, 210$_N$) as residing in fixed-location industrial facilities (e.g., industrial facility$_1$ 204$_1$ up through industrial facility$_N$ 204$_N$, respectively), in some implementations, the industrial devices (e.g., 208$_1$, 208$_N$, 210$_1$, and/or 210$_N$) also can be part of a mobile control and/or monitoring application, such as a system contained in a truck or other service vehicle.

One or more users, such as user$_1$ 212$_1$, user$_2$ 212$_2$, up through user$_N$ 212$_N$, can be employed to perform various work tasks in connection with the industrial facility$_1$ 204$_1$, and one or more users, such as user$_1$ 214$_1$, user$_2$ 214$_2$, up through user$_N$ 214$_N$, can be employed to perform various work tasks in connection with the industrial facility$_N$ 204$_N$. The users of the industrial facility$_1$ 204$_1$ can have communication devices, such as communication device$_1$ 216$_1$, communication device$_2$ 216$_2$, up through communication device$_N$ 216$_N$, and the users of the industrial facility$_N$ 204$_N$ can have communication devices, such as communication device$_1$ 218$_1$, communication device$_2$ 218$_2$, up through communication device$_N$ 218$_N$. The respective communications devices can be, for example, a mobile phone (e.g., cellular phone, smart phone, etc.), a computer (e.g., laptop computer), an electronic pad or tablet, an RFID tag, or other type of communication or computing device (e.g., device with communication and/or computing capabilities). The respective users can use the respective communication devices to facilitate performing their respective work tasks or providing information regarding the respective locations of the respective users and/or respective communication devices. The respective users also can use the respective communications devices for other uses (e.g., personal use).

In some implementations, one or more sensor components, such as sensor component) 220$_1$, sensor component$_2$ 220$_2$, up through sensor component$_N$ 220$_N$, can be distributed throughout industrial facility$_1$ 204$_1$, and one or more sensor components, such as sensor component) 222$_1$, sensor component$_2$ 222$_2$, up through sensor component$_N$ 222$_N$, can be distributed throughout industrial facility$_N$ 204$_N$. The respective sensor components can facilitate sensing, detecting, obtaining, or capturing data relating to the work or interactions of users (e.g., user$_1$ 212$_1$, user$_2$ 212$_2$, user$_N$ 212$_N$, user$_1$ 214$_1$, user$_2$ 214$_2$, user$_N$ 214$_N$) in connection with the industrial automation systems and network components of the respective industrial facilities (e.g., industrial facility$_1$ 204$_1$, industrial facility$_N$ 204$_N$), and the operation of the respective industrial automation systems and respective network components. The sensor components can comprise, for example, video sensor components that can be distributed throughout the respective industrial facilities (e.g., industrial facility$_1$ 204$_1$, industrial facility$_N$ 204$_N$) and can sense or capture visual data, audio sensor components that can be distributed throughout the respective industrial facilities (e.g., industrial facility$_1$ 204$_1$, industrial facility$_N$ 204$_N$) and can sense or capture audio data, motion sensor components that can be distributed throughout the respective industrial facilities (e.g., industrial facility$_1$ 204$_1$, industrial facility$_N$ $204_N$) and can sense or capture motion data, operational sensor components that can be distributed throughout the respective industrial facilities (e.g., industrial facility$_1$ $204_1$, industrial facility$_N$ $204_N$) and can sense or capture various operational aspects or parameters (e.g., status, temperature, quantity, quality, etc.) relating to the respective industrial automation systems or respective network components, location sensor components that can sense the respective locations of respective users (e.g., based at least in part on determining the respective locations of their respective mobile communication devices or tags (e.g., RFID tags), etc. In certain implementations, a sensor component(s) can be within an industrial device or asset.

The collection component (e.g., 102), e.g., via the various sensor components, can facilitate capturing user actions and/or behavior with respect to the various portions (e.g., various industrial devices, industrial processes, HMIs, control programs, other industrial assets, the network components, etc.) of or associated with the respective industrial automation systems. The collection component also, e.g., via the various sensor components, can receive, obtain, detect, capture, or collect data relating to the respective industrial devices (e.g., operation or status of the industrial devices, properties or characteristics of the industrial devices, maintenance records of the industrial devices, configurations of the industrial devices, etc.), respective industrial processes (e.g., operation or status of the industrial processes, properties or characteristics of the industrial processes, maintenance records associated with the industrial processes, configurations of the industrial processes, etc.), and the other respective industrial assets (e.g., operation or status of the industrial assets, properties or characteristics of the industrial assets, maintenance records associated with the industrial assets, configurations of the industrial assets, etc.). The collection component also can receive or collect data relating to operation of the components of the network component (e.g., operation or status of the network devices or assets, communication conditions associated with a communication channel, total bandwidth of a communication channel, available bandwidth of a communication channel, properties or characteristics of the network devices or assets, maintenance records associated with the network devices or assets, configurations of the network devices or assets, etc.).

According to one or more embodiments of the disclosed subject matter, the industrial devices (e.g., $208_1$, $208_2$, $208_N$, $210_1$, $210_2$, $210_N$, etc.), the communication devices (e.g., $216_1$, $216_2$, $216_N$, $218_1$, $218_2$, $218_N$, etc.), and/or the sensor components (e.g., $220_1$, $220_2$, $220_N$, $222_1$, $222_2$, $222_N$, etc.) can be coupled to (e.g., communicatively connected to) a cloud platform 202 to facilitate leveraging cloud-based applications and services (e.g., training services, data collection services, data storage services, simulation generation services, etc.) associated with the cloud platform 202. That is, the industrial devices (e.g., $208_1$, $208_2$, $208_N$, $210_1$, $210_2$, $210_N$, etc.), the communication devices (e.g., $216_1$, $216_2$, $216_N$, $218_1$, $218_2$, $218_N$, etc.), and/or the sensor components (e.g., $220_1$, $220_2$, $220_N$, $222_1$, $222_2$, $222_N$, etc.) can be configured to discover and/or interact with (e.g., communicate with) cloud-based computing services 224 that can be hosted by the cloud platform 202. The cloud platform 202 can be any infrastructure that can allow cloud services 224 (e.g., cloud-based computing services, shared computing services) to be accessed and utilized by cloud-capable devices. The cloud platform 202 can be a public cloud that can be accessible via a public network, such as the Internet, by devices having public network connectivity (e.g., Internet connectivity) and appropriate authorizations to utilize the cloud services 224. In some scenarios, the cloud platform 202 can be provided by a cloud provider as a platform-as-a-service (PaaS), and the cloud services 224 can reside and execute on the cloud platform 202 as a cloud-based service. In some such configurations, access to the cloud platform 202 and associated cloud services 224 can be provided to customers as a subscription service by an owner of the cloud services 224. Additionally and/or alternatively, the cloud platform 202 can be a private cloud that can be operated internally by the industrial enterprise 200 or an associated enterprise associated with a third-party entity. An exemplary private cloud platform can comprise a set of servers that can host the cloud services 224 and can reside on a private network (e.g., an intranet, a corporate network, etc.) that can be protected by a firewall.

The cloud services 224 can include, but are not limited to, data collection, data storage, data analysis, control applications (e.g., applications that can generate and deliver control instructions to industrial devices (e.g., 2081, 208N, 2101, 210N, etc.) based on analysis of real-time or near real-time system data or other factors), remote monitoring and support, determining preferred or alternate user actions, generating training presentations or modules, automating user actions, enhancing work assignments, or other applications or services relating to industrial automation (e.g., simulating or emulating industrial automation systems; simulating or emulating devices, components, or techniques that facilitate automating user actions). If the cloud platform 202 is a web-based cloud, industrial devices (e.g., 2081, 208N, 2101, 210N, etc.) at the respective industrial facilities 204 can interact with cloud services 224 via the public network (e.g., the Internet). In an exemplary configuration, the industrial devices (e.g., 2081, 2082, 208N, 2101, 2102, 210N, etc.), the communication devices (e.g., 2161, 2162, 216N, 2181, 2182, 218N, etc.), and/or the sensor components (e.g., 2201, 2202, 220N, 2221, 2222, 222N, etc.) can access the cloud services 224 through separate cloud gateways (e.g., cloud gateway 2061 up through cloud gateway 206N) at the respective industrial facilities (e.g., industrial facility1 2041 up through industrial facilityN 204N, respectively), wherein the industrial devices the industrial devices (e.g., 2081, 2082, 208N, 2101, 2102, 210N, etc.), the communication devices (e.g., 2161, 2162, 216N, 2181, 2182, 218N, etc.), and/or the sensor components (e.g., 2201, 2202, 220N, 2221, 2222, 222N, etc.) can connect to the respective cloud gateways (e.g., cloud gateway 2061 up through cloud gateway 206N) through a physical (e.g., wireline) or wireless local area network or radio link. In another exemplary configuration, the industrial devices (e.g., 2081, 2082, 208N, 2101, 2102, 210N, etc.), the communication devices (e.g., 2161, 2162, 216N, 2181, 2182, 218N, etc.), and/or the sensor components (e.g., 2201, 2202, 220N, 2221, 2222, 222N, etc.) can access the cloud platform 202 directly using an integrated cloud gateway service. Cloud gateways (e.g., cloud gateway 2061 up through cloud gateway 206N) also can comprise an integrated component of a network infrastructure device, such as a firewall box, router, or switch.

Providing industrial devices and other devices or components with cloud capability via the cloud gateways (e.g., cloud gateway $206_1$ up through cloud gateway $206_N$) can offer a number of advantages particular to industrial automation. For instance, cloud-based storage (e.g., cloud-based data store) offered by the cloud platform 202 can be easily scaled to accommodate the large quantities of data that can be generated daily by an industrial enterprise. Further, multiple industrial facilities (e.g., industrial facility$_1$ $204_1$ up through industrial facility$_N$ 204$_N$) at different geographical locations can migrate (e.g., communicate) their respective industrial automation data to the cloud platform 202 (e.g., via the collection component) for aggregation, collation, collective big data analysis, and enterprise-level reporting without the need to establish a private network between the respective industrial facilities. The industrial devices (e.g., 208$_1$, 208$_2$, 208$_N$, 210$_1$, 210$_2$, 210$_N$, etc.), the communication devices (e.g., 216$_1$, 216$_2$, 216$_N$, 218$_1$, 218$_2$, 218$_N$, etc.), and/or the sensor components (e.g., 220$_1$, 220$_2$, 220$_N$, 222$_1$, 222$_2$, 222$_N$, etc.) having smart configuration capability can be configured to automatically detect and communicate with the cloud platform 202 upon installation at any facility, which can thereby simplify integration with existing cloud-based data storage, analysis, or reporting applications used by the industrial enterprise 200. In other exemplary applications, cloud-based training-related applications (e.g., utilized by the training system comprising the performance enhancement component) can access the data relating to an industrial automation system(s) stored in the cloud-based data store, can determine preferred user actions in connection with performing a work task, can determine alternate user actions that can be performed instead of other user actions (e.g., preferred user actions), can generate training presentations or modules, can facilitate determining or designing components, devices, techniques, or algorithms that can facilitate automating user actions (e.g., automating preferred user actions), can enhance or optimize work assignments, and/or can generate a simulation model that can simulate the operation of the industrial automation system(s), simulate components, devices, techniques, or algorithms that can facilitate automating user actions, or simulate operation of the industrial automation system(s) based at least in part on simulating performance of users at respective work assignments (e.g., to facilitate determining enhanced or optimized work assignments), as more fully disclosed herein. These industrial cloud-computing applications and services are only intended to be exemplary, and the systems and methods described herein are not limited to these particular applications or services. As these examples demonstrate, the cloud platform 202, working with cloud gateways (e.g., cloud gateway 206$_1$ up through cloud gateway 206$_N$), can allow builders of industrial applications to provide scalable solutions as a service, removing the burden of maintenance, upgrading, and backup of the underlying infrastructure and framework.

Figure 3:
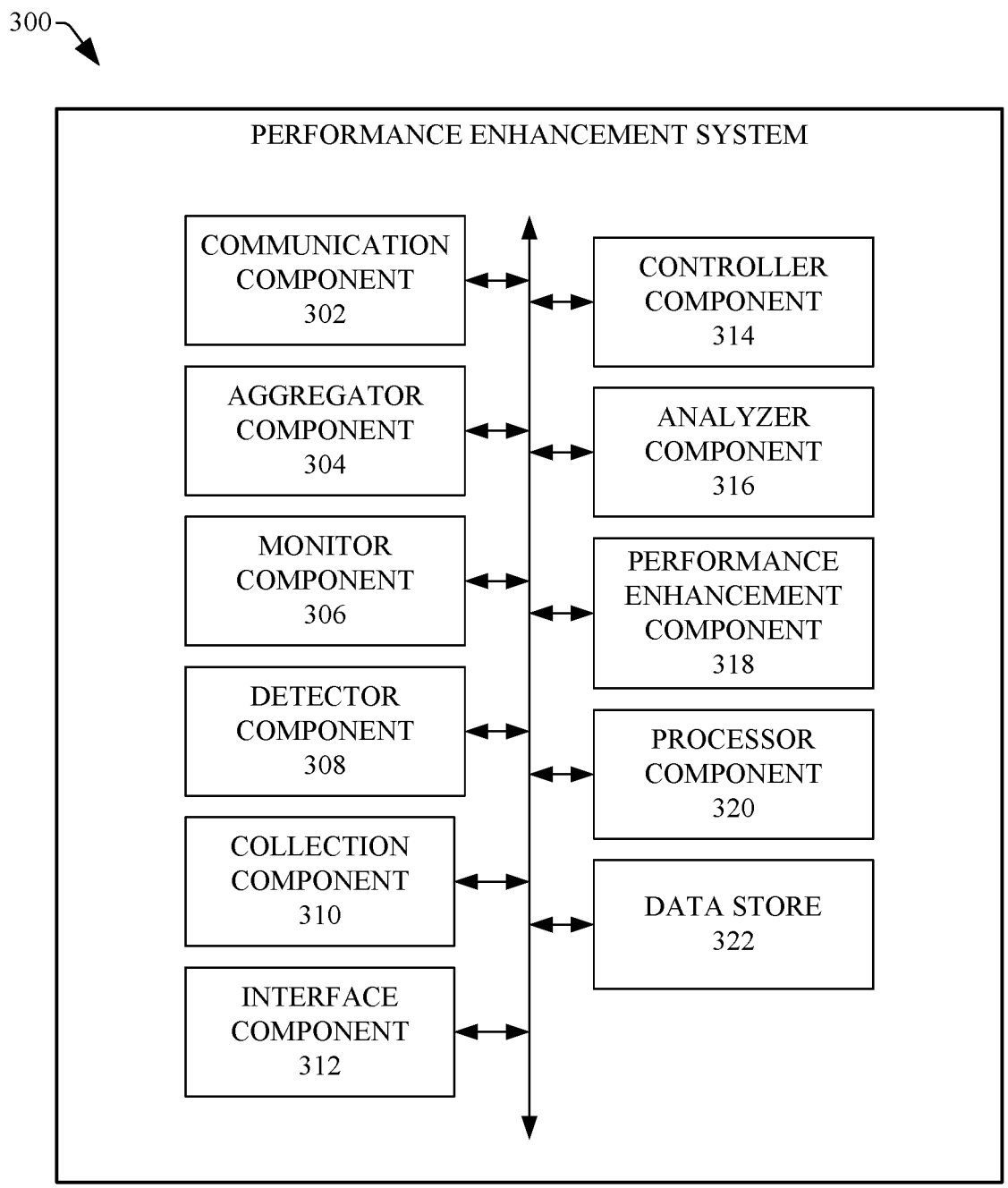
FIG. 3 presents a block diagram of an exemplary system (e.g., cloud-based, or partially cloud-based, performance enhancement system) according to various implementations and embodiments of the disclosed subject matter.

FIG. 3 presents a block diagram of an exemplary system 300 (e.g., cloud-based, or partially cloud-based, training system) according to various implementations and embodiments of the disclosed subject matter. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

The system 300 can comprise a communicator component 302 that can be used to communicate (e.g., transmit, receive) information between the system 300 and other components (e.g., industrial devices, other types of industrial assets that have communication functionality, communication devices, sensor components, other devices with communication functionality that are associated with industrial enterprises, cloud gateways, etc.). The information can include, for example, data relating to industrial automation systems, data relating to specifications, properties, or characteristics of industrial devices or other industrial assets, user-related data, customer-related data, work-order-related data relating to work orders that will or may be handled by an industrial automation system, etc.

The system 300 can comprise an aggregator component 304 that can aggregate data received (e.g., obtained, collected, detected, etc.) from various entities (e.g., industrial devices, industrial assets, cloud gateways, users (e.g., operators, managers, technicians, etc.), communication devices, other devices with communication functionality that are associated with industrial enterprises, processor component(s), user interface(s), data store(s), customers, etc.). The aggregator component 304 can correlate respective items of data based at least in part on type of data, source of the data, time or date the data was generated or received, type of device or asset, identifier associated with a device or asset, user (e.g., operator, manager, technician, etc.) associated with the data, customer associated with the data, industrial automation system associated with the data, industrial enterprise associated with the system, etc., to facilitate processing of the data (e.g., analyzing of the data, determining preferred or alternate user actions for performing a work task, generating training presentations, enhancing or optimizing work assignments, etc.).

The system 300 also can include a monitor component 306 that can monitor device data, process data, asset data, system data, user-related data, customer-related data, and/or other data in connection with the industrial automation systems. For instance, the monitor component 306 can monitor information (e.g., signals, device or process statuses, network communication of information, process flows, updates, modifications, etc.) associated with industrial automation systems, industrial enterprises, and/or systems or devices of customers associated with the industrial enterprises to facilitate detecting information associated with industrial automation systems that can be used to facilitate performing training-related functions or operations, or other functions or operations, associated with industrial automation systems. The monitor component 306 can be associated with sensor components, meters, HMIs, user communication devices (e.g., mobile phone, RFID tag, etc., of a user (e.g., operator, manager, technician, etc.) associated with an industrial automation system), communication monitoring components, or other components associated with industrial automation systems, industrial enterprises, and/or systems or devices of the customers to facilitate the monitoring of the industrial automation systems, industrial enterprises, and/or systems or devices of the customers.

The system 300 can comprise a detector component 308 that can detect desired information associated with industrial automation systems that can facilitate performing training-related functions or operations, or other functions or operations, associated with industrial automation systems, in accordance with the set of defined performance criteria. For instance, the detector component 308 can detect desired device data, process data, asset data, system data, user-related data, and/or customer-related data in connection with the industrial automation systems that can facilitate performing training-related functions or operations, or other functions or operations.

The system 300 also can include a collection component 310 that can receive, collect, or obtain data (e.g., desired device data, process data, asset data, system data, user-related data, customer-related data, extrinsic data from extrinsic sources) to facilitate performing training-related functions or operations, or other functions or operations, as more fully disclosed herein. The data collected by the collection component 310 can be stored in the data store 322, and/or can be made available to other components (e.g., analyzer component 316, performance enhancement component 318, etc.) to facilitate performing training-related functions or operations, or performing other functions or operations, using the data.

The system 300 can comprise an interface component 312 that can be employed to facilitate interfacing the system 300 with industrial automation systems and their constituent components (e.g., industrial devices or assets, network-related devices or assets, etc.) or processes, systems or devices associated with customers, systems or devices associated with device manufacturers, etc. For instance, the interface component 312 can be configured to receive industrial data (e.g., device data, process data, asset data, system data, configuration data, status data, process variable data, etc.) sent by one or more cloud-capable industrial devices, cloud gateways, or other sources of industrial data. The interface component 312 also can be configured to receive network-related data (e.g., data relating to communication conditions, network-status data, data identifying network-related devices, etc.) communicated by one or more network-related devices of the network component of an industrial automation system.

The interface component 312 further can be configured to exchange data with one or more client or customer devices via a communication connection (e.g., an Internet connection, a wireless communication connection, etc.). For example, the interface component 312 can receive customer profile data, requests for firmware upgrades, customer service selections, information relating to work orders for products, customer preferences or requirements with regard to a work order, or other such information from a client device (e.g., an Internet-capable client device, such as a phone, a computer, an electronic tablet or pad, or other suitable Internet-capable device). The interface component 312 also can deliver upgrade notifications, firmware upgrades, reports or notifications regarding the evaluation of and determinations regarding proposed modifications to an industrial automation system, notifications of impending device failures, identification of asset or system inefficiencies, configuration recommendations, or other such data to the client device.

The training system 300 also can contain a controller component 314 can control operations relating to processing data, determining preferred users actions, determining an alternate user action(s) to be performed instead of a preferred user action, generating training presentations, automating user actions for automatic performance of such actions by an industrial automation system, determining enhanced or optimized work assignments for users, generating simulation models that can simulate or emulate industrial automation systems, and/or other operations. The controller component 314 can facilitate controlling operations being performed by various components of the system 300, controlling data flow between various components of the system 300, controlling data flow between the system 300 and other components or systems associated with the system 300, etc.

The analyzer component 316 can analyze data (e.g., device data, process data, asset data, system data, user-related data, customer-related data, and/or other data) to facilitate determining preferred user actions associated with performing a work task in connection with an industrial automation system, determining an alternate user action(s) that can be performed in place of a preferred user action to facilitate performing a work task, generating a training presentation or module, determining or designing a component(s), a process(es), a technique(s), or an algorithm(s) that can facilitate automating user actions (e.g., automatically performing actions that were preferred user actions), determining enhanced or optimized work assignments for users associated with an industrial automation system, generating simulation models of industrial automation systems to facilitate performing training-related functions or operations or other functions or operations, etc. The analyzer component 316 can parse data to facilitate identifying data that is relevant to performing an operation (e.g., determining a preferred user action, generating a training presentation, etc.) by the system 300. Based at least in part on the analysis of the data, the analyzer component 316 can generate analysis results that can be provided to another component (e.g., performance enhancement component 318, processor component 320, etc.) to facilitate the performance of various operations by the system 300.

The system 300 also can comprise a performance enhancement component 318 that can perform various functions, operations, or tasks to facilitate training users associated with an industrial automation system to perform work tasks associated with the industrial automation system more efficiently and safely to facilitate achieving more favorable performance of the industrial automation system. The performance enhancement component 318 can determine one or more preferred user actions for completing a work task to achieve favorable performance of the industrial automation system. The performance enhancement component 318 also can determine an alternate user action(s) that can be performed in place of a preferred user action to facilitate performing a work task, wherein the alternate user action(s) can still achieve a same or substantially same performance result for the industrial automation system as that associated with the preferred user action. The performance enhancement component 318 also can generate a training presentation or module (e.g., based at least in part on a preferred user action(s) or alternate user action(s)) that can be used to facilitate training users to perform work tasks more efficiently or safely. The performance enhancement component 318 further can determine or design a component(s), process(es), technique(s), or algorithm(s) that can facilitate automating user actions (e.g., automatically performing actions that were preferred user actions). The performance enhancement component 318 also can determine enhanced or optimized work assignments for users associated with an industrial automation system. In some implementations, the performance enhancement component 318 can generate simulation models of an industrial automation system and/or component(s), process(es), technique(s), or algorithm(s) that can facilitate automating user actions to facilitate performing training-related functions or operations, determining or designing component(s), process(es), technique(s), or algorithm(s) that can facilitate automating user actions, or performing other functions or operations. For example, the performance enhancement component 318 can comprise a simulation generator component or an emulator component that respectively can facilitate simulating or emulating industrial automation systems, industrial devices, industrial processes, industrial assets, network components, network-related devices, user actions, interrelationships between various entities (e.g., connections between various devices), etc.

The system 300 also can comprise a processor component 320 that can operate in conjunction with the other components (e.g., communicator component 302, aggregator component 304, monitor component 306, etc.) to facilitate performing the various functions and operations of the system 300. The processor component 320 can employ one or more processors (e.g., central processing units (CPUs), graphical processing units (GPUs), field-programmable gate arrays (FPGAs), etc.), microprocessors, or controllers that can process data, such as industrial data (e.g., device data, process data, asset data, system data, etc.) associated with industrial control systems, user-related data, customer or client related data, data relating to parameters associated with the system 300 and associated components, etc., to facilitate determining preferred user actions associated with performing a work task in connection with an industrial automation system, determining an alternate user action(s) that can be performed in place of a preferred user action to facilitate performing a work task, generating a training presentation or module, determining or designing a component(s), process(es), technique(s), or algorithm(s) that can facilitate automating user actions (e.g., automatically performing actions that were preferred user actions), determining enhanced or optimized work assignments for users associated with an industrial automation system, generating simulation models of industrial automation systems to facilitate performing training-related functions or operations or other functions or operations, etc.; and can control data flow between the system 300 and other components associated with the system 300.

In yet another aspect, the system 300 can contain a data store 322 that can store data structures (e.g., user data, metadata); code structure(s) (e.g., modules, objects, classes, procedures), commands, or instructions; industrial data or other data associated with industrial automation systems or industrial enterprises; user-related data; customer or client related information; data relating to generation of simulation models of industrial automation systems; parameter data; algorithms (e.g., algorithm(s) relating to performing training-related operations, automating user actions, simulating or emulating industrial devices, industrial processes, industrial assets, network-related devices, interrelationships between such devices, processes, or assets, etc.); a set of defined operation criteria; and so on. In an aspect, the processor component 320 can be functionally coupled (e.g., through a memory bus) to the data store 322 in order to store and retrieve data desired to operate and/or confer functionality, at least in part, to the communicator component 302, aggregator component 304, monitor component 306, etc., of the system 300 and/or substantially any other operational aspects of the system 300. It is to be appreciated and understood that the various components of the system 300 can communicate data, instructions, or signals between each other and/or between other components associated with the system 300 as desired to carry out operations of the system 300. It is to be further appreciated and understood that respective components (e.g., communicator component 302, aggregator component 304, monitor component 306, etc.) of the system 300 each can be a stand-alone unit, can be included within the system 300 (as depicted), can be incorporated within another component of the system 300 (e.g., within the performance enhancement component 318) or a component separate from the system 300, and/or virtually any suitable combination thereof, as desired.

In accordance with various embodiments, one or more of the various components of the system 300 (e.g., communicator component 302, aggregator component 304, monitor component 306, etc.) can be electrically and/or communicatively coupled to one another to perform one or more of the functions of the system 300. In some implementations, one or more components of the system 300 (e.g., communicator component 302, aggregator component 304, monitor component 306, . . . , performance enhancement component 318) can comprise software instructions that can be stored in the data store 322 and executed by the processor component 320. The system 300 also can interact with other hardware and/or software components not depicted in FIG. 3. For example, the processor component 320 can interact with one or more external user interface devices, such as a keyboard, a mouse, a display monitor, a touchscreen, or other such interface devices.

Figure 4:
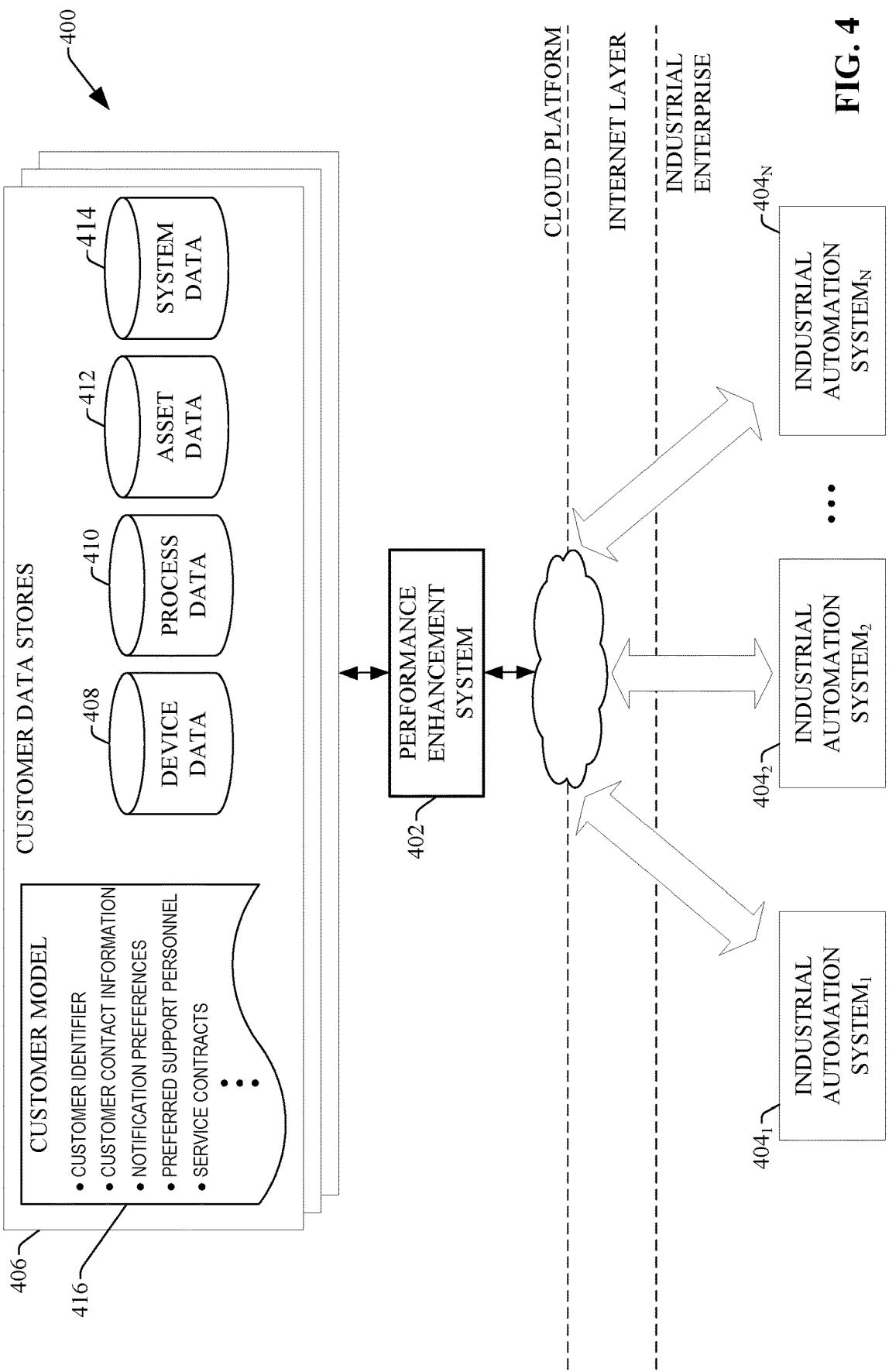
FIG. 4 illustrates a diagram of an example system that can facilitate enhancing performance in connection with industrial automation systems, performing training-related functions or operations, or performing other functions or operations, based at least in part collection of customer-specific industrial data by a cloud-based performance enhancement system, in accordance with various aspects and embodiments of the disclosed subject matter.

FIG. 4 illustrates a diagram of an example system 400 that can facilitate performing training-related functions or operations, or other functions or operations, based at least in part collection of customer-specific industrial data by a cloud-based training system, in accordance with various aspects and embodiments of the disclosed subject matter. The system 400 can include a training system 402 that can execute as a cloud-based service on a cloud platform (e.g., cloud platform 202 of FIG. 2), and can collect data from multiple industrial automation systems, such as industrial automation system$_1$ 404$_1$, industrial automation system$_2$ 404$_2$, and/or (up through) industrial automation system$_N$ 404$_N$. The industrial automation systems (e.g., 404$_1$, 404$_2$, 404$_N$) can comprise different industrial automation systems within a given facility and/or different industrial facilities at diverse geographical locations. Industrial automation systems (e.g., 404$_1$, 404$_2$, 404$_N$) also can correspond to different business entities (e.g., different industrial enterprises or customers), wherein the training system 402 can collect and maintain a distinct customer data store 406 for each customer or business entity.

The training system 402 can organize manufacturing data collected from the industrial automation systems (e.g., 404$_1$, 404$_2$, 404$_N$) according to various classes. In the illustrated example, manufacturing data can be classified according to device data 408, process data 410, asset data 412, and system data 414.

Figure 5:
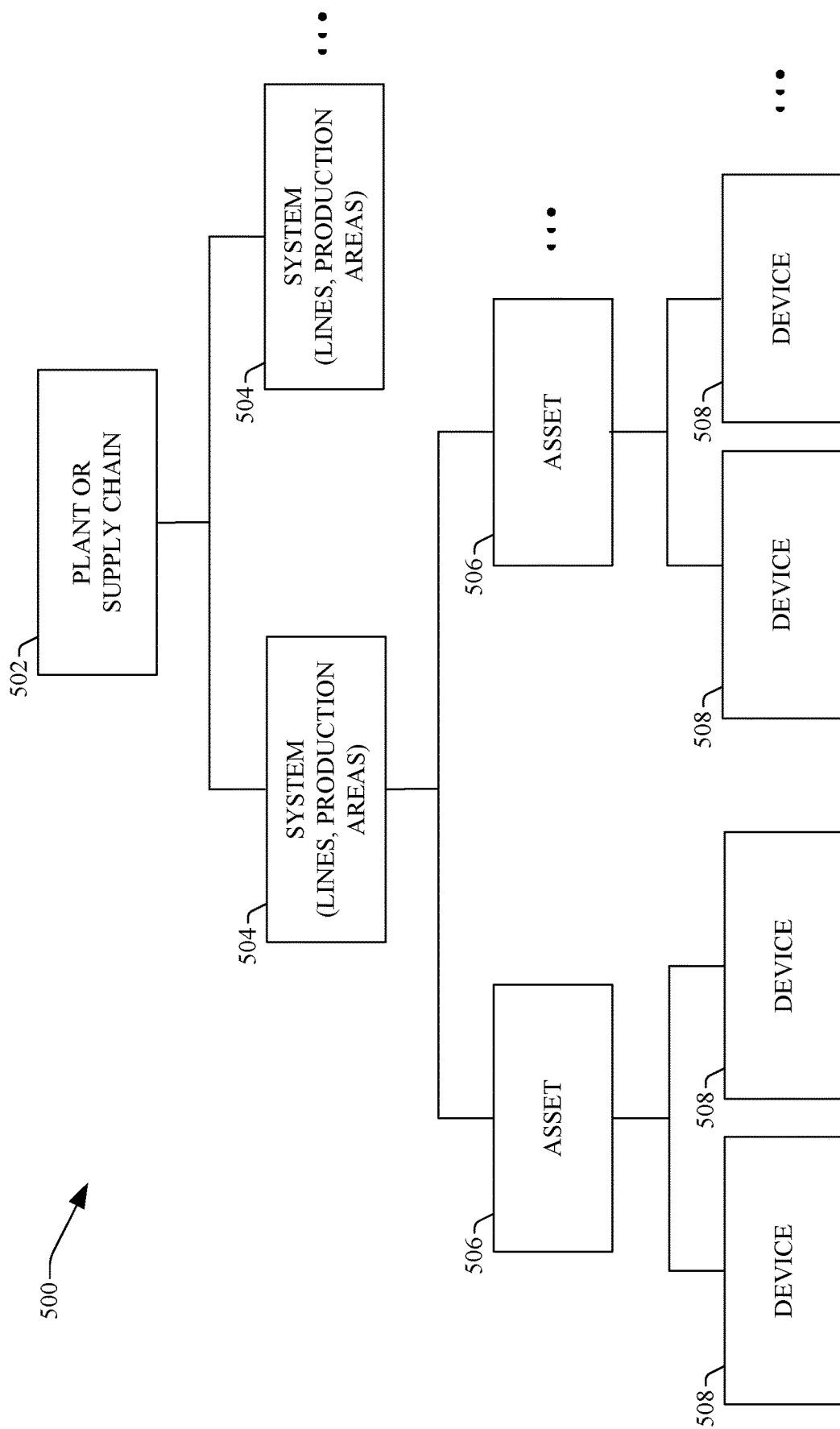
FIG. 5 illustrates a diagram of an example hierarchical relationship between these example data classes.

Referring briefly to FIG. 5, FIG. 5 illustrates a diagram of an example hierarchical relationship 500 between these example data classes. A given plant or supply chain 502 can comprise one or more industrial automation systems 504. The industrial automation systems 504 can represent the production lines or productions areas within a given plant facility or across multiple facilities of a supply chain. Each industrial automation system 504 can comprise a number of assets 506 that can represent the machines and equipment that make up the industrial automation system (e.g., the various stages of a production line). In general, each asset 506 can comprise one or more industrial devices 508, which can include, for example, the programmable controllers, motor drives, HMIs, sensors, meters, etc. comprising the asset 506. The various data classes depicted in FIGS. 4 and 5 are only intended to be exemplary, and it is to be appreciated that any organization of industrial data classes maintained by the training system 402 is within the scope of one or more embodiments of the disclosed subject matter.

Returning again to FIG. 4, the training system 402 can collect and maintain data from the various devices and assets that make up the industrial automation systems 504 and can classify the data according to the aforementioned classes for the purposes of facilitating analyzing the data, determining preferred user actions in connection with performing work tasks associated with the industrial automation systems (e.g., 404$_1$, 404$_2$, 404$_N$), determining an alternate user action(s) that can replace a preferred user action, generating training presentations or modules, automating user actions for automatic performance of such actions by an industrial automation system, determining enhanced work assignments for users, generating simulation models of the industrial automation systems (e.g., $404_1$, $404_2$, $404_N$), and/or performing other operations by the training system 402. Device data 408 can comprise device-level information relating to the identity, configuration, and status of the respective devices comprising the industrial automation systems (e.g., $404_1$, $404_2$, $404_N$), including but not limited to device identifiers, device statuses, current firmware versions, health and diagnostic data, device documentation, identification and relationship of neighboring devices that interact with the device, etc.

The process data 410 can comprise information relating to one or more processes or other automation operations carried out by the devices; e.g., device-level and process-level faults and alarms, process variable values (speeds, temperatures, pressures, etc.), and the like.

The asset data 412 can comprise information generated, collected, determined, or inferred based on data that can be aggregated from various (e.g., multiple) industrial devices over time, which can yield higher asset-level views of the industrial automation systems (e.g., $404_1$, $404_2$, $404_N$). Example asset data 412 can include performance indicators (KPIs) for the respective assets, asset-level process variables, faults, alarms, etc. Since the asset data 412 can yield a relatively longer term view of asset characteristics relative to the device and process data, the training system 402 can leverage the asset data 412 to facilitate identifying operational patterns and correlations unique to each asset, among other types of analysis, and this can facilitate simulation or emulation of the respective assets and generation of a simulation model of an industrial control system based on the simulation or emulation of the respective assets associated with the industrial control system.

The system data 414 can comprise collected, determined, or inferred information that can be generated based on data that can be aggregated from various (e.g., multiple) assets over time. The system data 414 can characterize system behavior within a large system of assets, yielding a system-level view of each of the industrial automation systems (e.g., $404_1$, $404_2$, $404_N$). The system data 414 also can document the particular system configurations in use and industrial operations performed at each of the industrial automation systems (e.g., $404_1$, $404_2$, $404_N$). For example, the system data 414 can document the arrangement of assets, interconnections between devices, the product being manufactured at a given facility, an industrial process performed by the assets, a category of industry of each industrial system (e.g., automotive, oil and gas, food and drug, marine, textiles, etc.), or other relevant information. Among other functions, this data can be accessed by technical support personnel during a support session so that particulars of the customer's unique system and device configurations can be obtained without reliance on the customer to possess complete knowledge of their assets.

As an example, a given industrial facility can include a packaging line (e.g., the system), which in turn can comprise a number of individual assets (e.g., a filler, a labeler, a capper, a palletizer, etc.). Each asset can comprise a number of devices (e.g., controllers, variable frequency drives, HMIs, etc.). Using an architecture similar to that depicted in FIG. 2, the training system 402 can collect industrial data from the individual devices during operation and can classify the data in the customer data store 406 according to the aforementioned classifications. Note that some data may be duplicated across more than one class. For example, a process variable classified under process data 410 also can be relevant to the asset-level view of the system represented by the asset data 412. Accordingly, such process variables can be classified under both classes. Moreover, subsets of data in one classification can be derived, determined, or inferred based on data under another classification. For example, subsets of system data 414 that characterize certain system behaviors can be derived, determined, or inferred based on a long-term analysis of data in the lower-level classifications.

In addition to maintaining the data classes (e.g., 408, 410, 412, 414), each customer data store also can maintain a customer model 416 that can contain data specific to a given industrial entity or customer. The customer model 416 can contain customer-specific information and preferences, which can be leveraged by (e.g., used by) the training system 402 to facilitate analyzing the data, determining preferred user actions in connection with performing work tasks associated with the industrial automation systems (e.g., $404_1$, $404_2$, $404_N$), determining an alternate user action(s) that can replace a preferred user action, generating training presentations or modules, automating user actions for automatic performance of such actions by an industrial automation system, determining enhanced work assignments for users, generating simulation models of the industrial automation systems (e.g., $404_1$, $404_2$, $404_N$), and/or performing other operations by the training system 402. Example information that can be maintained in the customer model 416 can include a client identifier, client preferences or requirements with regard to production or work orders associated with an industrial automation system, client contact information specifying which plant personnel are to be notified in response to results of an evaluation of user actions associated with an industrial automation system, notification preferences that can specify how plant personnel are to be notified (e.g., email, mobile phone, text message, etc.), service contracts that are active between the customer and the technical support entity, and other such information. The training system 402 can marry (e.g., associate, unite, map, etc.) data collected for each customer with the corresponding customer model 416 for identification and event handling purposes.

As noted above, industrial data can be migrated (e.g., communicated) from industrial devices to the cloud platform (e.g., 202) using cloud gateways (e.g., $206_1$, $206_N$). To this end, some devices can include integrated cloud gateways that can directly interface each device to the cloud platform. Additionally or alternatively, some configurations can utilize a cloud proxy device that can collect industrial data from multiple devices associated with the industrial automation systems (e.g., $404_1$, $404_2$, $404_N$) and can send (e.g., transmit) the data to the cloud platform. Such a cloud proxy can comprise a dedicated data collection device, such as a proxy server that can share a network (e.g., communication network) with the industrial devices. Additionally or alternatively, the cloud proxy can be a peer industrial device that can collect data from other industrial devices.

Figure 6:
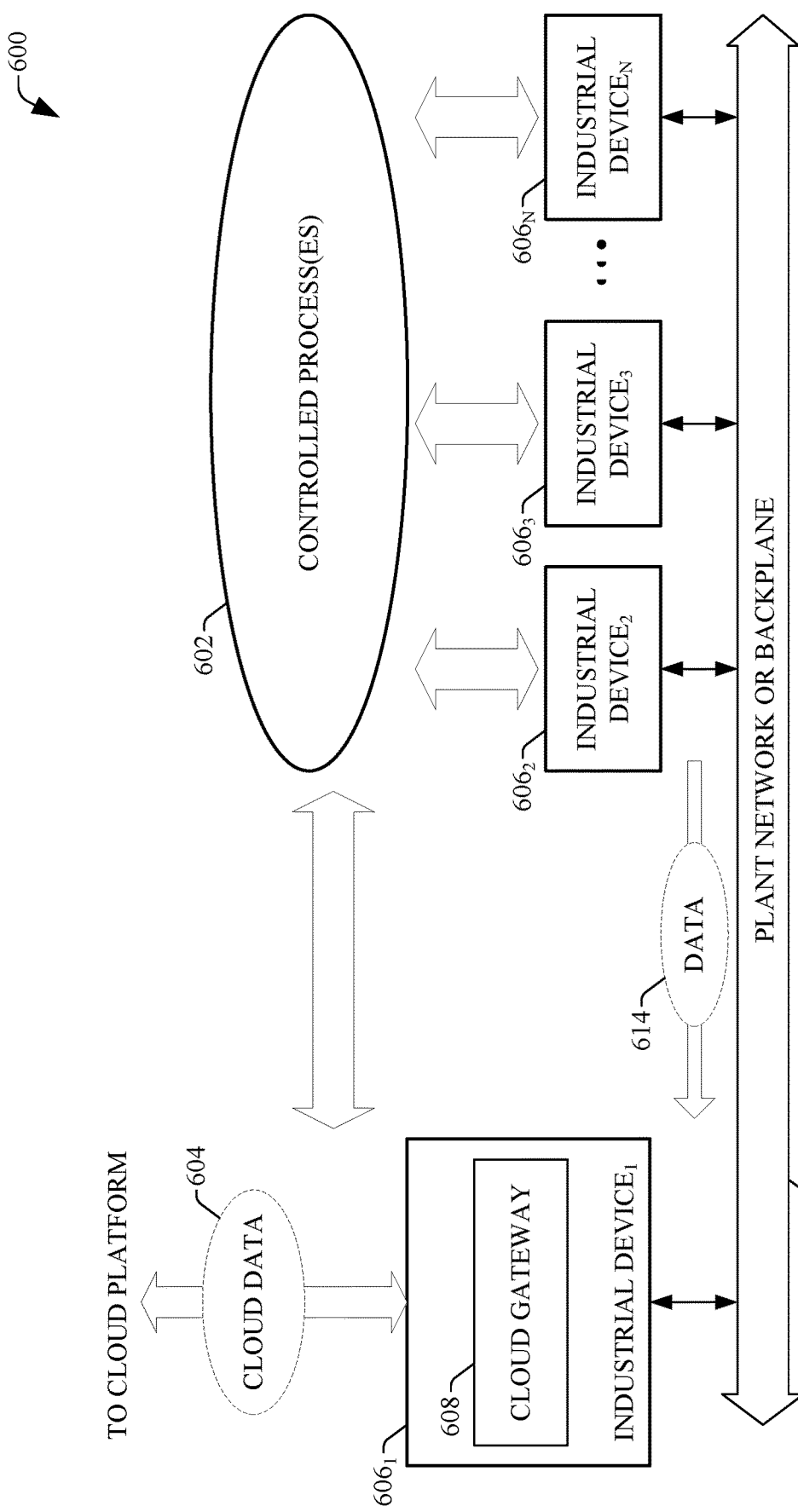
FIG. 6 depicts a block diagram of an example system that can be configured to comprise an industrial device that can act or operate as a cloud proxy for other industrial devices of an industrial automation system to facilitate migrating industrial data to the cloud platform for classification and analysis by the performance enhancement system, in accordance with various aspects and implementations of the disclosed subject matter.
Figure 7:
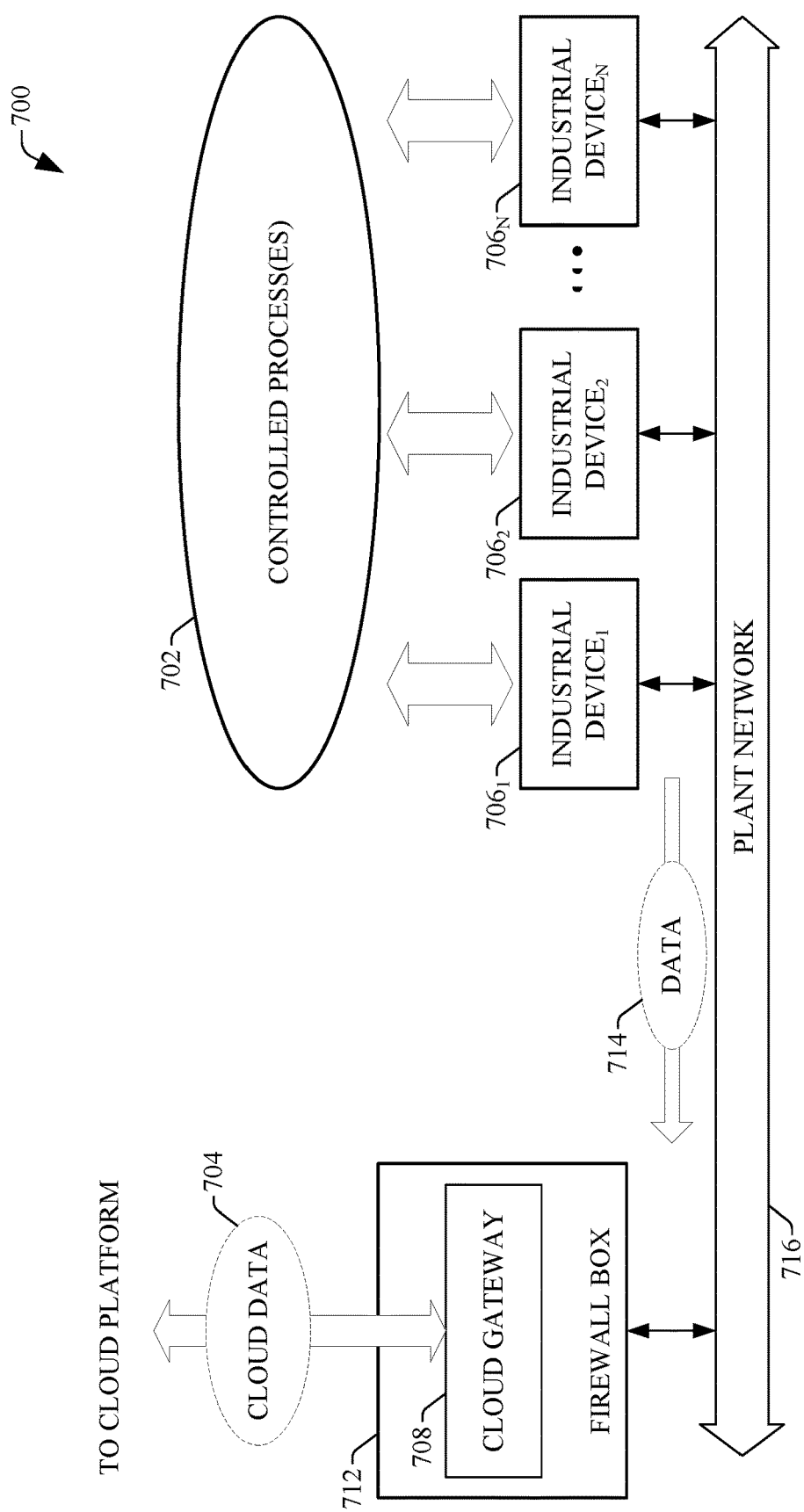
FIG. 7 illustrates a block diagram of an example system that can employ a firewall box that can serve as a cloud proxy for a set of industrial devices to facilitate migrating industrial data to the cloud platform for classification and analysis by the performance enhancement system, in accordance with various aspects and implementations of the disclosed subject matter.

FIGS. 6 and 7 depict block diagrams of example systems 600 and 700, respectively, illustrating respective techniques that can facilitate migrating industrial data to the cloud platform via proxy devices for classification and analysis by the training system, in accordance with various aspects and implementations of the disclosed subject matter. FIG. 6 depicts the system 600 that can be configured to comprise an industrial device that can act or operate as a cloud proxy for other industrial devices of an industrial automation system.

The industrial automation system can comprise a plurality of industrial devices, including industrial device$_1$ 606$_1$, industrial device$_2$ 606$_2$, industrial device$_3$ 606$_3$, and/or (up through) industrial device$_N$ 606$_N$, that collectively can monitor and/or control one or more controlled processes 602. The industrial devices 606$_1$, 606$_2$, 606$_3$, and/or (up through) 606$_N$ respectively can generate and/or collect process data relating to control of the controlled process(es) 602. For industrial controllers such as PLCs or other automation controllers, this can include collecting data from telemetry devices connected to an industrial controller's I/O, generating data internally based on measured process values, etc.

In the configuration depicted in FIG. 6, industrial device$_1$ 606$_1$ can act, operate, or function as a proxy for industrial devices 606$_2$, 606$_3$, and/or (up through) 606$_N$, whereby the data 614 from devices 606$_2$, 606$_3$, and/or (up through) 606$_N$ can be sent (e.g., transmitted) to the cloud via proxy industrial device$_1$ 606$_1$. Industrial devices 606$_2$, 606$_3$, and/or (up through) 606$_N$ can deliver their respective data 614 to the proxy industrial device$_1$ 606$_1$ over the plant network or backplane 612 (e.g., a Common Industrial Protocol (CIP) network or other suitable network protocol). Using such a configuration, it is only necessary to interface one industrial device to the cloud platform (via cloud gateway 608). In some embodiments, the cloud gateway 608 can perform preprocessing on the gathered data prior to migrating the data to the cloud platform (e.g., time stamping, filtering, formatting, normalizing, summarizing, compressing, etc.). The collected and processed data can be pushed (e.g., transmitted) to the cloud platform as cloud data 604 via cloud gateway 608. Once migrated to the cloud platform, the cloud-based training system can classify the data according to the example classifications described herein and/or can utilize the data to facilitate performing various operations relating to training users to perform work tasks associated with industrial automation systems more efficiently or safely, automating user actions to have such actions automatically performed by an industrial automation system, determining enhanced or optimized work assignments for users, or performing other desired tasks or operations.

While the proxy device illustrated in FIG. 6 is depicted as an industrial device that itself can perform monitoring and/or control of a portion of controlled process(es) 602, other types of devices also can be configured to serve as cloud proxies for multiple industrial devices according to one or more implementations of the disclosed subject matter. For example, FIG. 7 illustrates an example system 700 that can comprise a firewall box 712 that can serve as a cloud proxy for a set of industrial devices 706$_1$, 706$_2$, and/or (up through) 706$_N$. The firewall box 712 can act as a network infrastructure device that can allow the plant network 716 to access an outside network such as the Internet, while also providing firewall protection that can prevent unauthorized access to the plant network 716 from the Internet. In addition to these firewall functions, the firewall box 712 can include a cloud gateway 708 that can interface the firewall box 712 with one or more cloud-based services (e.g., training-related services, automation-related services, data collection services, data storage services, etc.). In a similar manner to the proxy industrial device 606$_1$ of FIG. 6, the firewall box 712 of FIG. 7 can collect industrial data 714 from including industrial device$_1$ 706$_1$, industrial device$_2$ 706$_2$, and/or (up through) industrial device$_N$ 706$_N$, which can monitor and control respective portions of controlled process(es) 702. Firewall box 712 can include a cloud gateway 708 that can apply appropriate pre-processing to the gathered industrial data 714 prior to pushing (e.g., communicating) the data to the cloud-based training system as cloud data 704. Firewall box 712 can allow industrial devices 706$_1$, 706$_2$, and/or (up through) 706$_N$ to interact with the cloud platform without directly exposing the industrial devices to the Internet.

In some embodiments, the cloud gateway 608 of FIG. 6 or cloud gateway 708 of FIG. 7 can tag the collected industrial data (e.g., 614 or 714) with contextual metadata prior to pushing the data as cloud data (e.g., 604 or 704) to the cloud platform. Such contextual metadata can include, for example, a time stamp, a location of the device at the time the data was generated, or other contextual information. In another example, some cloud-aware devices can comprise smart devices capable of determining their own context within the plant or enterprise environment. Such devices can determine their location within a hierarchical plant context or device topology. Data generated by such devices can adhere to a hierarchical plant model that can define multiple hierarchical levels of an industrial enterprise (e.g., a workcell level, a line level, an area level, a site level, an enterprise level, etc.), such that the data can be identified (e.g., by the training system) in terms of these hierarchical levels. This can allow a common terminology to be used across an entire industrial enterprise to identify devices and their associated data. Cloud-based applications and services that model an enterprise according to such an organizational hierarchy can represent industrial controllers, devices, machines, or processes as data structures (e.g., type instances) within this organizational hierarchy to provide context for data generated by respective devices within the enterprise relative to the enterprise as a whole. Such a convention can replace the flat name structure that is employed by some industrial applications.

In some embodiments, the cloud gateway 608 of FIG. 6 or cloud gateway 708 of FIG. 7 can comprise uni-directional "data only" gateways that can be configured only to move data from the premises (e.g., industrial facility) to the cloud platform. Alternatively, the cloud gateways 608 and 708 can comprise bi-directional "data and configuration" gateways that additionally can be configured to receive configuration or instruction data from services running on the cloud platform. Some cloud gateways can utilize store-and-forward technology that can allow the gathered industrial data (e.g., 614 or 714) to be temporarily stored locally on storage associated with the cloud gateway (e.g., 608 or 708) in the event that communication between a gateway and the cloud platform is disrupted. In such events, the cloud gateway (e.g., 608 or 708) can forward (e.g., communicate) the stored data to the cloud platform when the communication link is re-established.

To ensure a rich and descriptive set of data for analysis purposes, the cloud-based training system can collect device data in accordance with one or more standardized device models. To this end, a standardized device model can be developed for each industrial device. Device models can profile the device data that is available to be collected and maintained by the training system.

Figure 8:
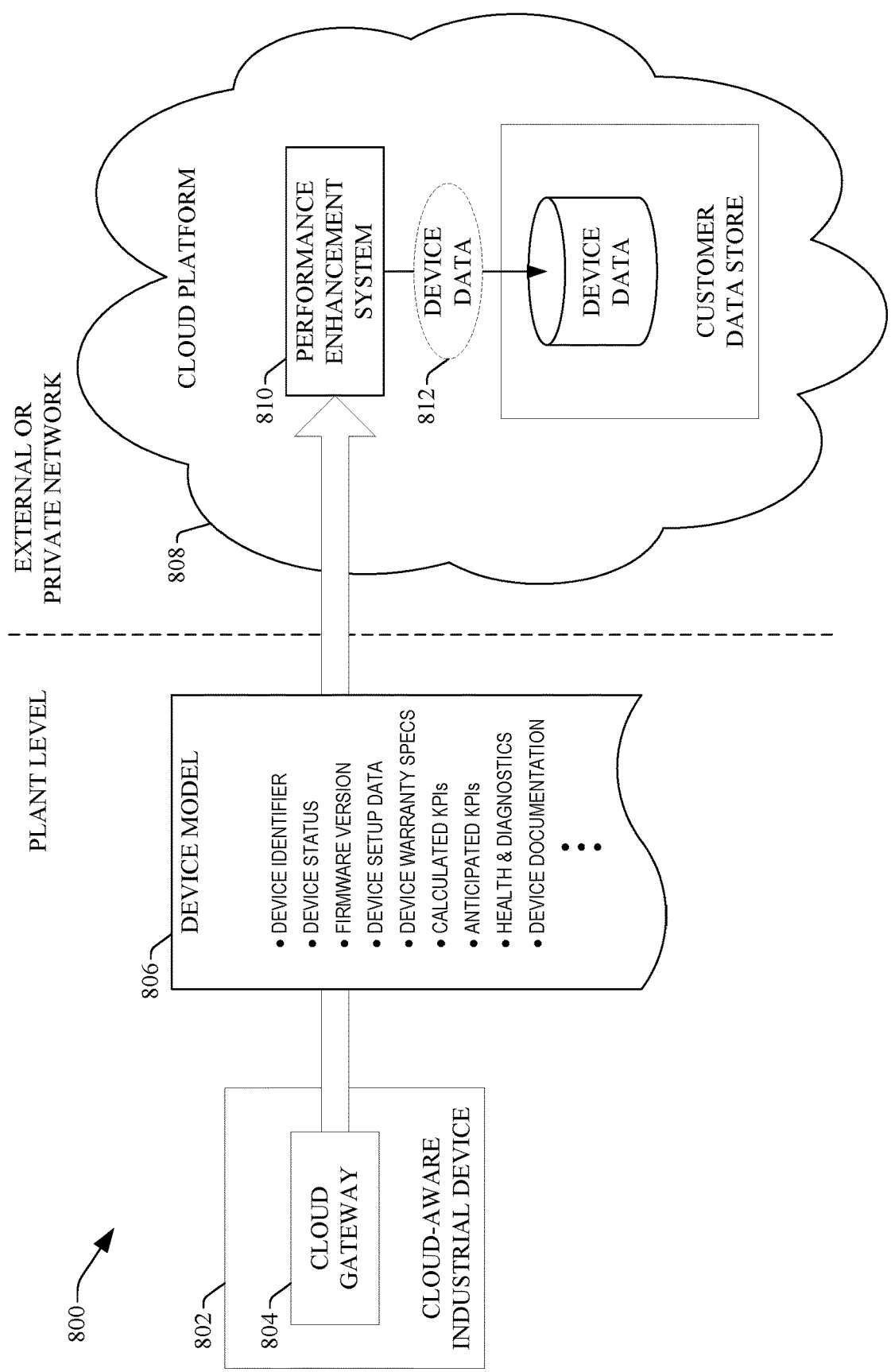
FIG. 8 illustrates a block diagram of an example device model according to various aspects and implementations of the disclosed subject matter.

FIG. 8 illustrates a block diagram of an example device model 800 according to various aspects and implementations of the disclosed subject matter. In the illustrated example model 800, the device model 806 can be associated with a cloud-aware industrial device 802 (e.g., a programmable logic controller, a variable frequency drive, an HMI, a vision camera, a barcode marking system, etc.). As a cloud-aware device, the industrial device 802 can be configured to automatically detect and communicate with the cloud platform 808 upon installation at a plant facility, simplifying integration with existing cloud-based data storage, analysis, and applications (e.g., as performed by the training system described herein). When added to an existing industrial automation system, the industrial device 802 can communicate with the cloud platform and can send identification and configuration information in the form of the device model 806 to the cloud platform 808. The device model 806 can be received by the training system 810, which can update the customer's device data 812 based on the device model 806. In this way, the training system 810 can leverage the device model 806 to facilitate integrating the new industrial device 802 into the greater system as a whole. This integration can include the training system 810 updating cloud-based applications or services to recognize the new industrial device 802, adding the new industrial device 802 to a dynamically updated data model of the customer's industrial enterprise or plant, modifying a sequence of preferred user actions or alternate user actions for performing a work task in connection with an industrial automation system, modifying a training presentation or module, modifying a component, process, technique, or algorithm that automated an action that had been a preferred user action, modifying a work assignment of a user, modifying a simulation model of the industrial automation system to integrate, incorporate, or include a simulation or an emulation of the new industrial device 802 based on the identification and configuration information (or other data), determining or predicting a response of the modified industrial automation system based on a modified simulation model that integrates the new industrial device 802, making other devices on the plant floor aware of the new industrial device 802, or other desired integration or updating functions. Once deployed, some data items comprising the device model 806 can be collected and monitored by the training system 810 on a real-time or near real-time basis.

The device model 806 can comprise such information as a device identifier (e.g., model and serial number) associated with the industrial device 802, status information for the industrial device 802, a currently installed firmware version associated with the industrial device 802, device setup data associated with the industrial device 802, warranty specifications associated with the industrial device 802, calculated and/or anticipated KPIs associated with the industrial device 802 (e.g., mean time between failures), health and diagnostic information associated with the industrial device 802, device documentation, or other such parameters.

Figure 9:
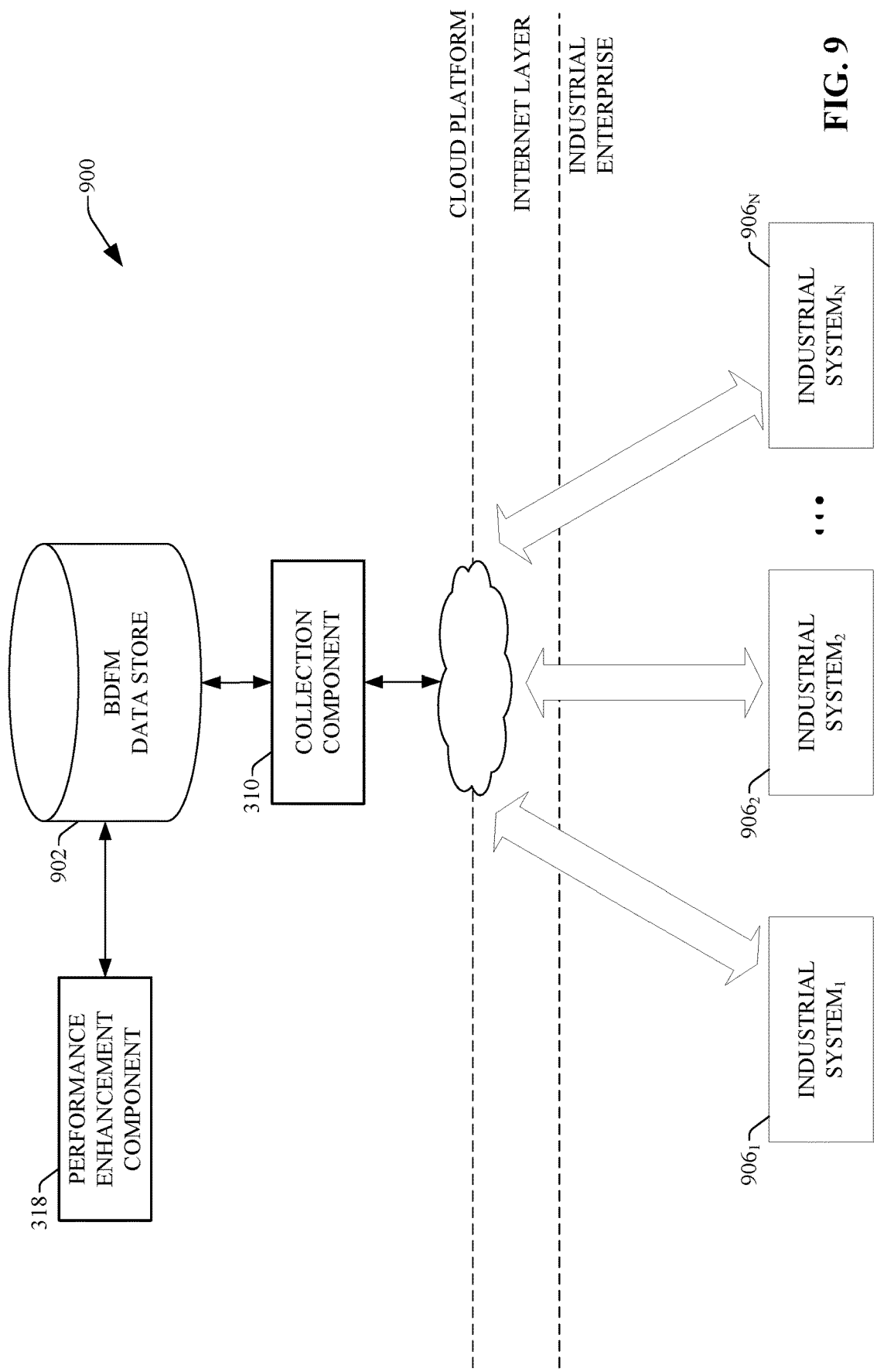
FIG. 9 presents a block diagram of an example system that can facilitate collection of data from devices and assets associated with respective industrial automation systems for storage in cloud-based data storage, in accordance with various aspects and implementations of the disclosed subject matter.

In addition to maintaining individual customer-specific data stores for each industrial enterprise, the training system (e.g., cloud-based training system) also can feed (e.g., transmit) sets of customer data to a global data storage (referred to herein as cloud-based data store or Big Data for Manufacturing (BDFM) data store) for collective big data analysis in the cloud platform (e.g., by the training system). FIG. 9 presents a block diagram of an example system 900 that can facilitate collection of data from devices and assets associated with respective industrial automation systems for storage in cloud-based data storage, in accordance with various aspects and implementations of the disclosed subject matter. As illustrated in FIG. 9, the collection component 310 of the training system (e.g., as facilitated by the interface component 312) can collect data from devices and assets comprising respective different industrial automation systems, such as industrial automation system$_1$ 906$_1$, industrial automation system$_2$ 906$_2$, and/or (up through) industrial automation system$_N$ 906$_N$, for storage in a cloud-based BDFM data store 902. In some embodiments, data maintained in the BDFM data store 902 can be collected anonymously with the consent of the respective customers. For example, customers can enter into a service agreement with a technical support entity whereby the customer can agree to have their device and asset data collected by the training system in exchange for training-related or other services or a credit towards training-related or other services. The data maintained in the BDFM data store 902 can include all or portions of the classified customer-specific data described in connection with FIG. 4, as well as additional data (e.g., derived, determined, or inferred data). The performance enhancement component 318 or another component of the training system can organize the collected data stored in the BDFM data store 902 according to device type, system type, application type, applicable industry, or other relevant categories. The performance enhancement component 318 can analyze data stored in the resulting multi-industry, multi-customer data store (e.g., BDFM data store 902) to facilitate learning, determining, or identifying industry-specific, device-specific, and/or application-specific trends, patterns, thresholds (e.g., device-related thresholds, network-related thresholds, etc.), industrial-automation-system interrelationships between devices or assets, etc., associated with the industrial automation systems associated with the cloud platform. In general, the performance enhancement component 318 can perform a data analysis (e.g., big data analysis) on data (e.g., the multi-industrial enterprise data) maintained (e.g., stored in) the BDFM data store 902 to facilitate learning, determining, identifying, characterizing, simulating, and/or emulating operational industrial-automation-system interrelationships, thresholds, trends, or patterns associated with industrial automation systems as a function of industry type, application type, equipment in use, asset configurations, device configuration settings, or other types of variables.

For example, it can be known that a given industrial asset (e.g., a device, a configuration of device, a machine, etc.) can be used across different industries for different types of industrial applications. Accordingly, the performance enhancement component 318 can identify a subset of the global data stored in BDFM data store 902 relating to the asset or asset type, and perform analysis on this subset of data to determine how the asset or asset type performs over time and under various types of operating conditions for each of multiple different industries or types of industrial applications. The performance enhancement component 318 also can determine the operational behavior of the asset or asset type over time and under various types of operating conditions for each of different sets of operating constraints or parameters (e.g. different ranges of operating temperatures or pressures, different recipe ingredients or ingredient types, etc.). The performance enhancement component 318 can leverage (e.g., use) a large amount of historical data relating to the asset or asset type that has been gathered (e.g., collected and/or aggregated) from many different industrial automation systems to facilitate learning or determining common operating characteristics of many diverse configurations of industrial assets or asset types at a relatively high degree of granularity and under many different operating contexts. The performance enhancement component 318 can use the learned or determined operating characteristics relating to the industrial assets or asset types to facilitate performing training-related or other services in connection with an industrial automation system.

Figure 10:
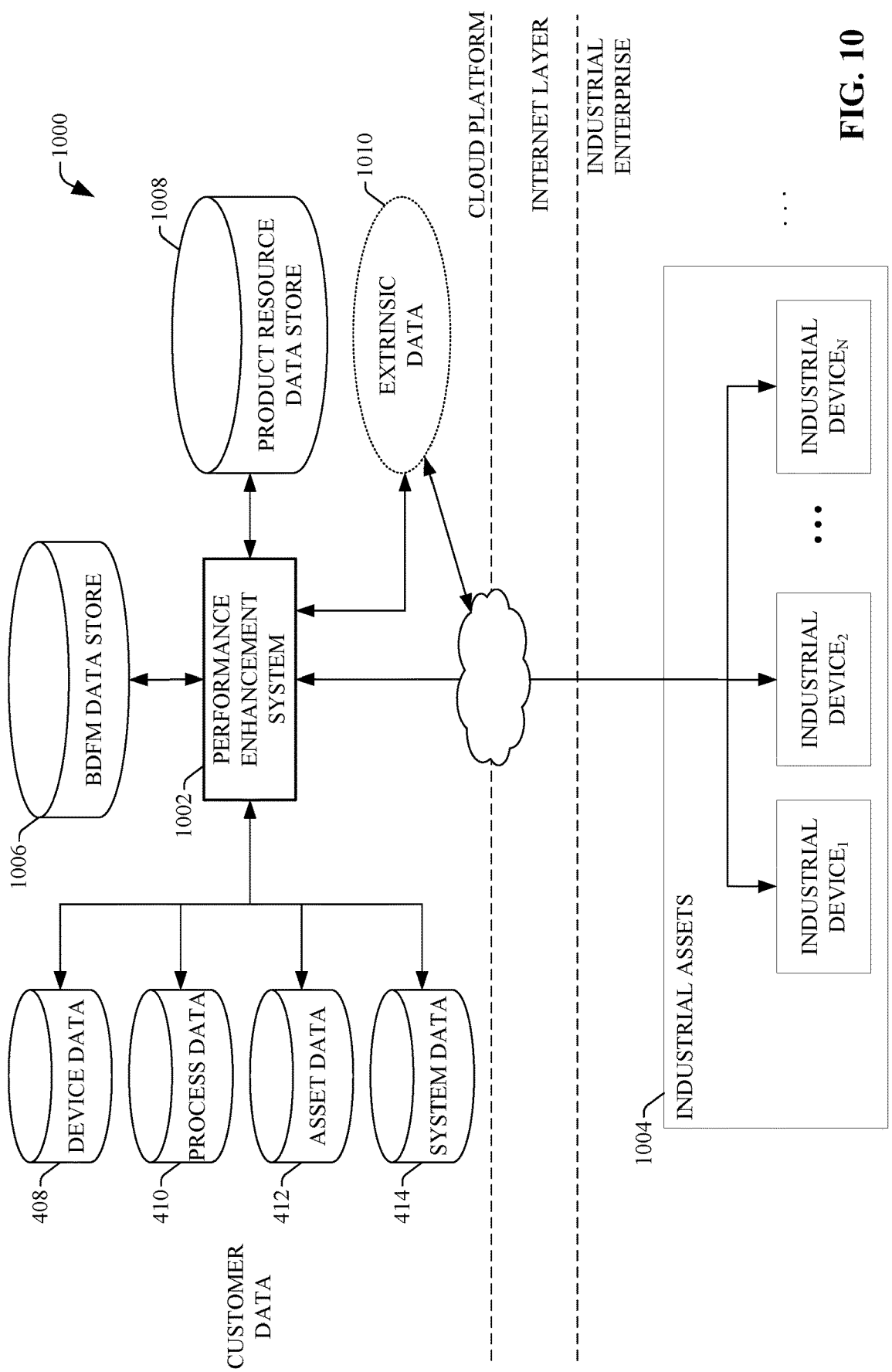
FIG. 10 illustrates a block diagram of a cloud-based system that can employ a performance enhancement system to facilitate enhancing performance, or performing training-related or other services, in connection with industrial automation systems, in accordance with various aspects and embodiments of the disclosed subject matter.

FIG. 10 illustrates a block diagram of a cloud-based system 1000 that can employ a training system to facilitate performing training-related and other services associated with industrial automation systems, in accordance with various aspects and embodiments of the disclosed subject matter. As disclosed herein, the training system 1002 can collect, maintain, and monitor customer-specific data (e.g. device data 408, process data 410, asset data 412, and system data 414) relating to one or more industrial assets 1004 of an industrial enterprise. The training system 1002 also can collect, maintain, and monitor other data, such as user-related or user-specific data of users (e.g., operators, managers, technicians, etc.) associated with an industrial enterprise. In addition, the training system 1002 can collect and organize industrial data anonymously (with customer consent) from multiple industrial enterprises, and can store such industrial data in a BDFM data store 1006 for collective analysis by the training system 1002, for example, as described herein.

The training system 1002 also can collect product resource information and maintain (e.g., store) the product resource information in the cloud-based product resource data store 1008. In general, the product resource data store 1008 can maintain up-to-date information relating to specific industrial devices or other vendor products in connection with industrial automation systems. Product data stored in the product resource data store 1008 can be administered by the training system 1002 and/or one or more product vendors or OEMs. Exemplary device-specific data maintained by the product resource data store 1008 can include product serial numbers, most recent firmware revisions, preferred device configuration settings and/or software for a given type of industrial application, or other such vendor-provided information.

The system 1000 depicted in FIG. 10 can provide training-related or other services to subscribing customers (e.g., owners of industrial assets 1004). For example, customers can enter an agreement with a product vendor or technical support entity to allow their system data to be gathered anonymously and fed into (e.g., communicated to and stored in) the BDFM data store 1006, and this thereby can expand the store of global data available for collective analysis by the training system 1002. In exchange, the vendor or technical support entity can agree to provide customized training-related or other services to the customer (e.g., services for real-time or near real-time system monitoring, services that can facilitate training users to work more efficiently, services for determining preferred user actions or alternate user actions, services for automating user actions, services for enhancing work assignments of users, services for generating a simulation of an industrial automation system, etc.). Alternatively, the customer can subscribe to one or more available training-related or other services that can be provided by the training system 1002, and optionally can allow their system data to be maintained in the BDFM data store 1006. In some embodiments, a customer can be given an option to subscribe to training-related or other services without permitting their data to be stored in the BDFM data store 1006 for collective analysis with data from other systems (e.g., industrial automation systems). In such cases, the customer's data will only be maintained as customer data (e.g., in customer data store 406) for the purposes of performing training-related or other services relating to that particular customer, and the collected customer data will be analyzed in connection with data stored in the BDFM data store 1006 and the product resource data store 1008 without that customer data being migrated for storage in the BDFM data store 1006 for long-term storage and analysis. In another exemplary agreement, customers can be offered a discount on training-related or other services in exchange for allowing their system data to be anonymously migrated to the BDFM data store 1006 for collective analysis by the training system 1002.

In accordance with various aspects, the customer-specific data can include device and/or asset level faults and alarms, process variable values (e.g., temperatures, pressures, product counts, cycle times, etc.), calculated or anticipated key performance indicators for the customer's various assets, indicators of system behavior over time, and other such information. The customer-specific data also can include documentation of firmware versions, configuration settings, and software in use on respective devices of the customer's industrial assets. Moreover, the training system 1002 can take into consideration customer information encoded in customer model 416, which can have a bearing on inferences made by the training system 1002 based on the analysis (e.g., big data analysis) stored in the BDFM data store 1006. For example, customer model 416 may indicate a type of industry that is the focus of the customer's business (e.g., automotive, food and drug, oil and gas, fibers and textiles, power generation, marine, etc.). Knowledge of the customer's industry can facilitate enabling the training system 1002 to correlate the customer-specific data with data relating to similar systems and applications in the same industry, as documented by the data stored in the BDFM data store 1006.

Taken together, customer-specific data and a customer model (e.g., 416) can facilitate accurately modeling the customer's industrial enterprise at a highly granular level, from high-level system behavior over time down to the device and software level. The analyzing (e.g., by the training system 1002) of this customer-specific data in view of global industry-specific and application-specific trends learned via analysis of data stored in the BDFM data storage 1006, as well as vendor-provided device information maintained in the product resource data store 1008, can facilitate performing training-related or other services in connection with industrial automation systems.

In some implementations, the system 1000 (e.g., via the collection component or training system 1002) also can receive, collect, or capture extrinsic data 1010 from one or more sources (e.g., external data sources). The training system 1002 can use or leverage the extrinsic data 1010 received, collected, or captured from sources external to a customer's industrial enterprise, wherein the extrinsic data 1010 can have relevance to operation of the customer's industrial automation system(s). Example extrinsic data 1010 can include, for example, energy cost data, material cost and availability data, transportation schedule information from companies that provide product transportation services for the customer, market indicator data, web site traffic statistics, information relating to known information security breaches or threats, or other information relevant to the operation of the customer's industrial automation system (s). The training system 1002 can retrieve extrinsic data 1010 from substantially any data source, such as, e.g., servers or other data storage devices linked to the Internet, cloud-based storage that maintains extrinsic data of interest, or other sources. The training system 1002 can analyze the extrinsic data 1010 and/or other data (e.g., user-related data associated with users (e.g., operators, managers, technicians, other workers) associated with the industrial automation system(s), device data 408, process data 410, asset data 412, system data 414, etc.) to facilitate performing training-related or other services in connection with the industrial automation system(s).

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 11-15 illustrate various methods in accordance with one or more embodiments of the subject application. While, for purposes of simplicity of explanation, the one or more methods shown herein are shown and described as a series of acts, it is to be understood and appreciated that the disclosed subject matter is not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Furthermore, interaction diagram(s) may represent methods, in accordance with the subject disclosure when disparate entities enact disparate portions of the methods. Further yet, two or more of the disclosed example methods can be implemented in combination with each other, to accomplish one or more features or advantages described herein.

Figure 11:
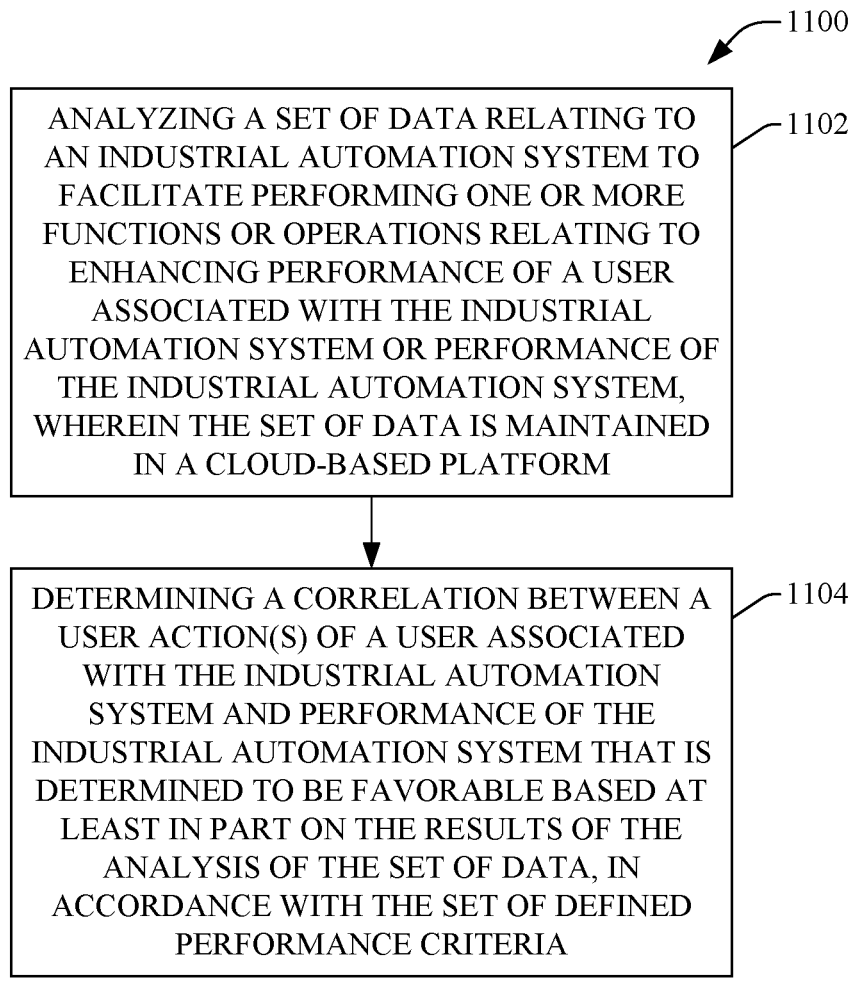
FIG. 11 illustrates a flow diagram of an example method that can facilitate training users associated with an industrial automation system associated with an industrial enterprise based on cloud-based data relating to the industrial enterprise, in accordance with various implementations and embodiments of the disclosed subject matter.

FIG. 11 illustrates a flow diagram of an example method 1100 that can facilitate training users associated with an industrial automation system associated with an industrial enterprise based on cloud-based data relating to the industrial enterprise, in accordance with various implementations and embodiments of the disclosed subject matter. The method 1100 can be implemented by a training system that can comprise a performance enhancement component and/ or another component(s) (e.g., a collection component (e.g., a cloud-based collection component), a data store (e.g., a cloud-based data store), etc.).

At 1102, a set of data relating to an industrial automation system can be analyzed to facilitate performing one or more functions or operations relating to enhancing performance of a user associated with the industrial automation system or enhancing performance of the industrial automation system, wherein the set of data is maintained in a cloud-based platform (e.g., comprising the cloud-based data store). The performance enhancement component can analyze the set of data relating to the industrial automation system. The set of data can comprise data associated with the industrial automation system and/or one or more other industrial automation systems that can comprise an industrial device(s), industrial process(es), or industrial asset(s) that can be the same as or similar to an industrial device(s), industrial process(es), or industrial asset(s) associated with the industrial automation system. The set of data also can comprise data relating to one or more users (e.g., operators, managers, technicians, etc.) that are associated with the industrial automation system and the one or more other industrial automation systems.

The set of data can be data that is stored in a cloud-based data store, wherein the set of data or at least a subset of the data can be received (e.g., collected, obtained, detected, etc.) from the industrial automation system and stored in the cloud-based data store. The set of data can comprise, for example, device-related data (e.g., industrial device-related data), asset-related data, process-related data (e.g., industrial-automation-process-related data), user-related data, customer-related data, and/or other data associated with an industrial enterprise. The user-related data can comprise, for example, data relating to the interactions or behavior of users in connection with the industrial automation system and the performance or response of the industrial automation system in response to the interactions or behavior of the users in connection with the industrial automation system, as more fully disclosed herein. The data can be migrated (e.g., communicated) to the cloud platform using one or more cloud gateways (e.g., communication gateway components) that can serve as uni-directional or bi-directional communication interfaces between industrial devices of the industrial automation system and the cloud platform. The device-related data, asset-related data, process-related data, user-related data, customer-related data, and/or other industrial-automation-system-related data can be stored in the cloud-based data store in association with identification information, such as, for example, a user identifier or other user-specific information, or a customer identifier or other customer-specific information. For example, for a subset of data relating to an industrial process on which a user (e.g., operator) is working, the process-related data (e.g., data relating to the performance of the industrial process) and/or user-related data (e.g., data relating to the interactions or behavior of the user in connection with working on the industrial process) can respectively comprise a user identifier or other user-specific information associated with the user to facilitate associating (e.g., tagging, linking, etc.) the process-related data and/or user-related data with the user, so that the process-related data and/or user-related data can be identified (e.g., by the performance enhancement component or other component) as being associated with the user.

The collection component can facilitate collecting or obtaining the set of data, and can store the set of data in the cloud-based data store. The performance enhancement component can access the cloud-based data store and can receive (e.g., retrieve, obtain, etc.) the set of data from the cloud-based data store. The performance enhancement component can analyze the set of data to facilitate performing one or more functions or operations relating to enhancing performance of a user(s) associated with the industrial automation system or performance of the industrial automation system. For example, the performance enhancement component can analyze the set of data to facilitate determining or identifying a correlation between a user action(s) (e.g., a user action or sequence of user actions) and a performance of the industrial automation system determined to be favorable, in accordance with the set of defined performance criteria, wherein information relating to such correlation can be used to facilitate enhancing performance of a user(s) associated with the industrial automation system or performance of the industrial automation system.

At 1104, a correlation between a user action(s) of a user associated with the industrial automation system and performance of the industrial automation system that is determined to be favorable can be determined or identified based at least in part on the results of the analysis of the set of data, in accordance with the set of defined performance criteria. The performance enhancement component can determine or identify the correlation between the user action(s) of the user associated with the industrial automation system and performance of the industrial automation system that is determined (e.g., by the performance enhancement component)

to be favorable based at least in part on the results of the analysis of the set of data, in accordance with the set of defined performance criteria. For instance, the performance enhancement component can determine or identify one or more instances of the industrial automation system, or a portion (e.g., an industrial process, a subset of industrial devices, etc.) thereof, performing favorably (e.g., performing at least up to a defined threshold level of performance), based at least in part on the data analysis results, in accordance with the set of defined performance criteria. The performance enhancement component also can determine or identify one or more user actions that at least were partially responsible for achieving the one or more instances of favorable performance of the industrial automation system, or a portion thereof, based at least in part on the data analysis results, wherein the industrial-automation-system-related data and/or user-related data of the set of data can be associated with a user identifier or other user-specific information that is associated with the user to facilitate identifying or determining that the user's interactions or behavior with respect to the industrial automation system was at least partially responsible for the favorable performance of the industrial automation system, or portion thereof.

As desired, the performance enhancement component also can identify or determine other instances of less favorable or relatively poor performance of the industrial automation system, or portion thereof, by other users (or the user at other times), based at least in part on the data analysis results, in accordance with the set of defined performance criteria, wherein such less favorable or relatively poor performance of the industrial automation system, or portion thereof, can be associated with user interactions or behaviors with respect to the industrial automation system that are different than the interactions or behaviors of the user that had resulted in the favorable performance of the industrial automation system, or portion thereof. The performance enhancement component can compare the user interactions and behaviors of the user that are associated with the favorable performance of the industrial automation system, or portion thereof, with the different user interactions and behaviors of other users (or the user at other times) that are associated with less favorable or relatively poor performance of the industrial automation system, or portion thereof. Such a comparison by the performance enhancement component can facilitate enabling the performance enhancement component to determine which user interactions or behaviors of the user with respect to the industrial automation system, or portion thereof, were at least partially responsible for the favorable performance of the industrial automation system, or portion thereof. This can facilitate enabling the performance enhancement component to determine or identify the correlation between the user action(s) of the user with respect to the industrial automation system and favorable performance of the industrial automation system.

In some implementations, based at least in part on the determined or identified correlation between the user action(s) of the user and the determined favorable performance of the industrial automation system, the performance enhancement component can facilitate determining training-related or other functions or operations (e.g., determining preferred user actions in relation to the industrial automation system, determining poor or unsafe user practices in relation to the industrial automation system, training users to perform their tasks more efficiently with respect to the industrial automation system (e.g., based at least in part on the preferred user actions), automating preferred user actions, etc.) that can facilitate training users or automating preferred user actions in connection with the industrial automation system.

Figure 12:
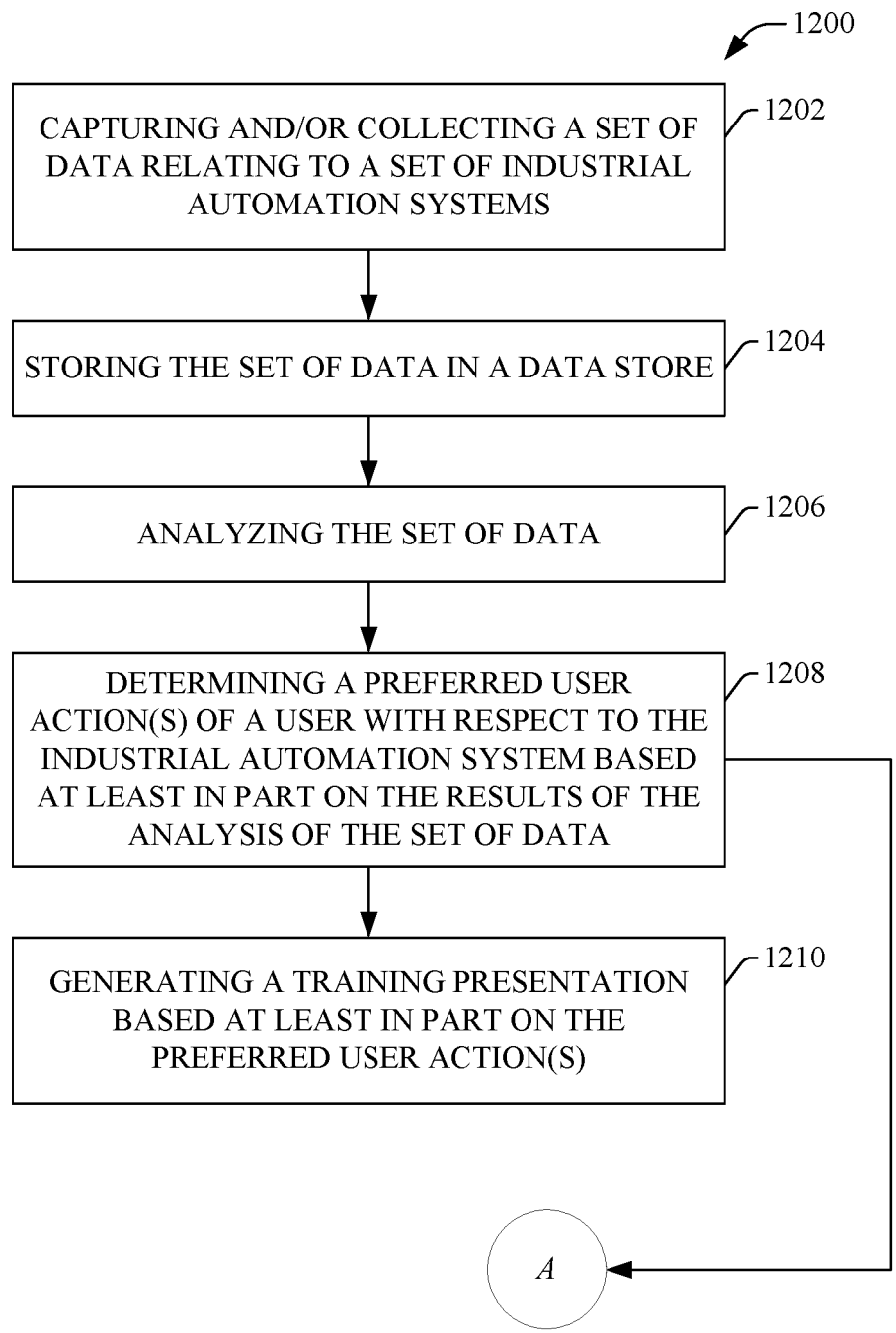
FIG. 12 depicts a flow diagram of an example method that can facilitate training users associated with an industrial automation system associated with an industrial enterprise based on cloud-based data relating to the industrial enterprise, in accordance with various implementations and embodiments of the disclosed subject matter.

FIG. 12 depicts a flow diagram of an example method 1200 that can facilitate training users associated with an industrial automation system associated with an industrial enterprise based on cloud-based data relating to the industrial enterprise, in accordance with various implementations and embodiments of the disclosed subject matter. The method 1200 can be implemented by a training system that can comprise a performance enhancement component and/or another component(s) (e.g., a cloud-based collection component, a cloud-based data store, etc.).

At 1202, a set of data relating to a set of industrial automation systems comprising one or more industrial automation systems can be captured and/or collected. The training system can comprise a collection component that can capture and/or collect the set of data relating to the set of industrial automation systems. The set of data can comprise data relating to industrial devices, industrial assets, industrial processes, and network devices, associated with the one or more industrial automation systems of the set of industrial automation systems. The set of data also can include user-related data or customer-related data. For example, the user-related data can comprise data relating to the interactions or behaviors of respective users (e.g., operators, managers, technicians, etc.) who perform respective tasks in connection with an industrial automation system(s), and performance results of the industrial automation system(s) in response to the performing of the respective user actions (e.g., comprising the interactions or behaviors) by the respective users. The set of industrial automation systems can be associated with one or more industrial enterprises.

In some implementations, all or part of the training system can be located in a cloud platform. For example, the performance enhancement component, the collection component, the data store, and/or another component(s) of the training system can be located in the cloud platform. In other implementations, certain components (e.g., performance enhancement component or collection component) can be located outside of the cloud platform and can access the cloud platform (e.g., the data store in the cloud platform) to facilitate analyzing the data in the data store to facilitate performing functions, operations, or tasks relating to training users associated with industrial automation systems, automating desired (e.g., preferred) actions that have been performed by a user(s), or performing other functions, operations, or tasks. One or more sensor components (e.g., video sensor component, audio sensor component, motion sensor component, location sensor component, etc.) can be distributed throughout the industrial automation system environment to facilitate sensing, detecting, and/or capturing information relating to user interactions or behaviors of users performing work tasks with respect to respective portions of the industrial automation system, information relating to operations, performance, or responses of the respective portions of the industrial automation system in connection with (e.g., in response to) the user interactions or behaviors of the users performing the work tasks with respect to the respective portions of the industrial automation system, or other information relating to the users or the industrial automation system.

At 1204, the set of data can be stored in a data store. The collection component can facilitate storing the set of data in the data store.

At 1206, the set of data can be analyzed. The performance enhancement component can access the cloud-based data store and can retrieve, obtain, or read the set of data from the cloud-based data store. The performance enhancement component can analyze the set of data (e.g., perform big data analysis on the set of data) to facilitate determining or identifying a preferred user action(s) of a user with respect to the industrial automation system, or a portion (e.g., industrial process, subset of industrial devices, etc.) thereof.

At 1208, a preferred user action(s) of the user with respect to the industrial automation system can be determined based at least in part on the results of the analysis of the set of data. The performance enhancement component can analyze the set of data to facilitate determining or identifying one or more actions or behavior of the user in connection with the user performing work tasks on the industrial automation system, or a portion thereof, that resulted in favorable performance of the industrial automation system, or portion thereof (e.g., resulted in performance of the industrial automation system, or portion thereof, that satisfied a defined threshold performance parameter or parameter range), in accordance with the set of defined performance criteria. The performance enhancement component also can facilitate determining or identifying the one or more actions or behavior of the user as resulting in favorable performance of the industrial automation system based at least in part on a comparison of the relative performance of the industrial automation system resulting from the user's actions or behavior with the performance (e.g., relatively poorer performance) of the industrial automation system resulting from another user's (users') actions or behavior(s).

In some implementations, the performance enhancement component also can facilitate modifying a preferred user action(s) to facilitate achieving an even more favorable performance by or response from the industrial automation system, in accordance with the set of defined performance criteria. For instance, the preferred user action(s) can comprise a set of user actions, and the performance enhancement component can analyze the respective user actions in the set of user actions to determine whether any of those user actions can be improved further to further improve the favorable performance of the industrial automation system. For example, the set of user actions may comprise four user actions, wherein the performance enhancement component can determine that three of the user actions are at least substantially optimal as they are, while the remaining user action in the set is substantially less than optimal and can be improved by modifying that remaining user action. The performance enhancement component can determine a modification that can be implemented to modify that remaining user action, and the preferred user action(s) can be modified based at least in part on the modification.

At 1210, a training presentation can be generated based at least in part on the preferred user action(s). The performance enhancement component can generate a training presentation that can comprise information relating to the preferred user action(s). The training presentation can be used to facilitate training other users (e.g., inexperienced or poorer performing users) to perform better and/or more efficiently when performing the work tasks associated with the preferred user action(s) while working with the industrial automation system. The training presentation can be or comprise, for example, a video (e.g., an animated video, a video of a user performing or discussing performance of a work task), a visual illustration, an audio presentation, printed materials (e.g., written instructions), a poster, and/or a placard, presenting or illustrating the preferred user action(s).

In some implementations, the performance enhancement component also can determine or identify poor or unsafe user practices of users in relation to the industrial automation system (e.g., user actions that result in less favorable or poor performance of the industrial automation system or are unsafe), based at least in part on the data analysis results, in accordance with the set of defined performance criteria. For instance, the performance enhancement component can determine or identify actions or behaviors of users in connection with an operation(s) or event(s) associated with the industrial automation system that result in a relatively poor performance or response by the industrial automation system, are at least potentially unsafe as potentially being harmful to a user(s) or to the industrial automation system, and/or that have resulted in harm to a user(s) or the industrial automation system, in accordance with the set of defined performance criteria.

The performance enhancement component can generate a training presentation (e.g., the same training presentation that comprises a preferred user action(s), or a separate training presentation) that can illustrate or present the poor or unsafe user action(s) and/or comprising a set of instructions that can facilitate training users to not perform the poor or unsafe user action(s) in connection with the operation(s) or event(s) associated with the industrial automation system and/or training users to perform the relevant work tasks by performing the preferred user action(s). The performance enhancement component can store the training presentation(s), or a portion thereof, in the cloud-based data store, and/or can provide the training presentation(s) for use (e.g., presentation) in training users.

Figure 13:
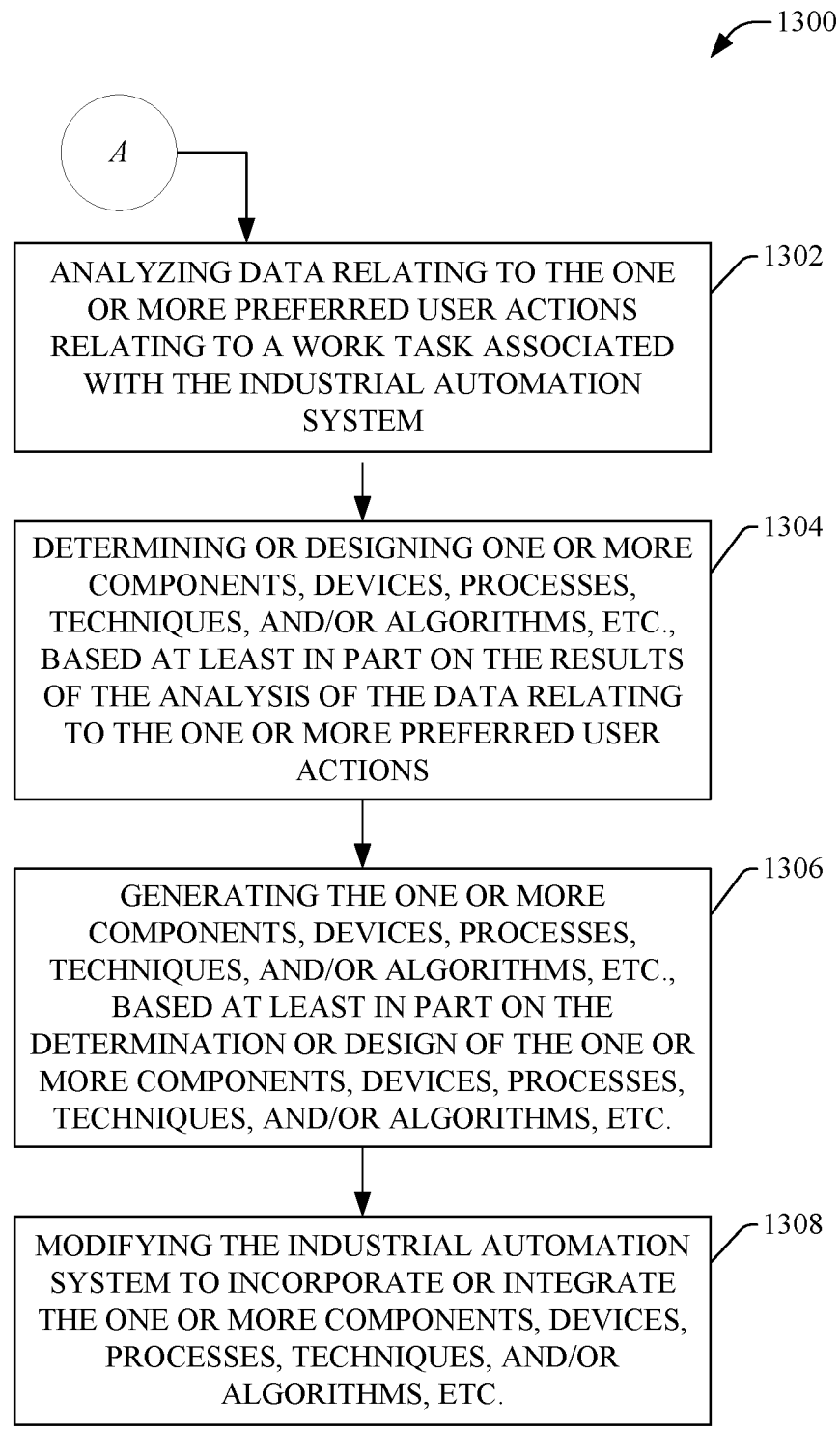
FIG. 13 presents a flow diagram of an example method that can facilitate automating one or more preferred user actions in connection with a work task associated with an industrial automation system, in accordance with various aspects and embodiments of the disclosed subject matter.
Figure 14:
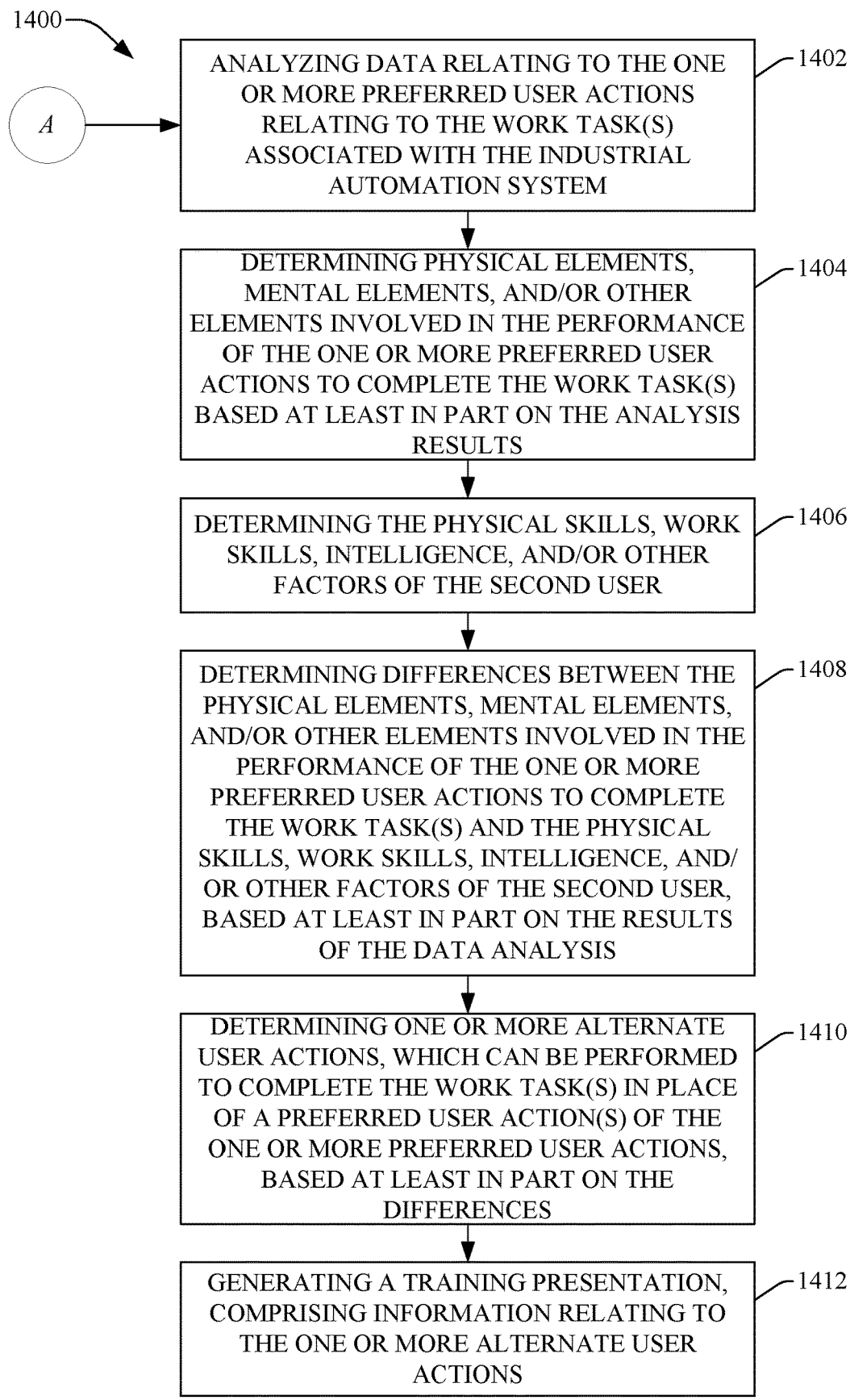
FIG. 14 presents a flow diagram of an example method that can facilitate determining one or more alternate user actions that a user can perform to complete a work task(s) to achieve a same or substantially same performance result as when the work task(s) is completed by a user (e.g., another user) by performing one or more user actions (e.g., preferred user actions), in accordance with various aspects and embodiments of the disclosed subject matter.

In some implementations, after the operation at reference numeral 1208 is performed, the method 1200 can proceed to reference point A. In some implementations, the method 1300, as depicted in FIG. 13, can proceed from reference point A, wherein the preferred user action(s) can be used (e.g., analyzed) to facilitate automating the preferred user action(s), as more fully disclosed herein. In other implementations, the method 1400, as depicted in FIG. 14, can proceed from reference point A, wherein an alternate user action(s), which can be performed in place of a preferred user action(s), can be determined, as more fully disclosed herein.

FIG. 13 presents a flow diagram of an example method 1300 that can facilitate automating one or more preferred user actions in connection with a work task associated with an industrial automation system, in accordance with various aspects and embodiments of the disclosed subject matter. The method 1300 can be implemented by a training system that can comprise a performance enhancement component and/or another component(s) (e.g., a cloud-based collection component, a cloud-based data store, etc.). In some implementations, the method 1300 can proceed from reference point A of method 1200, wherein a preferred user action(s) has been determined or identified in connection with a work task associated with an industrial automation system.

At 1302, data relating to the one or more preferred user actions relating to a work task associated with the industrial automation system can be analyzed. The performance enhancement component can analyze data relating to the one or more preferred user actions to facilitate determining or designing a component(s) (e.g., industrial component), device(s) (e.g., industrial device), process(es) (e.g., industrial process), technique(s), and/or algorithm(s), etc., that can perform (e.g., automatically or dynamically perform) the one or more preferred (user) actions in connection with the work task that had been performed by the user.

At 1304, one or more components, devices, processes, techniques, and/or algorithms, etc., can be determined or designed based at least in part on the results of the analysis of the data relating to the one or more preferred user actions. The performance enhancement component can determine or design the one or more components, devices, processes, techniques, and/or algorithms, etc., based at least in part on the analysis results. In some implementations, the performance enhancement component can emulate or simulate the one or more preferred user actions, emulate or simulate the one or more components, devices, processes, techniques, and/or algorithms, etc., and/or emulate or simulate the industrial automation system, based at least in part on the analysis results. The performance enhancement component can generate a simulation(s) of the operation of the industrial automation system (e.g., as modified to incorporate the emulated or simulated one or more preferred user actions, emulate or simulate the one or more components, devices, processes, techniques, and/or algorithms, etc.) to facilitate determining or designing the one or more preferred user actions, emulate or simulate the one or more components, devices, processes, techniques, and/or algorithms, etc., verifying that the one or more preferred user actions, emulate or simulate the one or more components, devices, processes, techniques, and/or algorithms, etc., will satisfactorily perform or operate to achieve a favorable performance of the industrial automation system that is sufficiently or substantially comparable to the favorable performance of the industrial automation system that was achieved through the performance of the one or more preferred user actions, and/or evaluating the performance of the simulation of the one or more components, devices, processes, techniques, and/or algorithms, etc.

At 1306, the one or more components, devices, processes, techniques, and/or algorithms, etc., can be generated based at least in part on the determination or design of the one or more components, devices, processes, techniques, and/or algorithms, etc. The performance enhancement component or another component(s) can generate the one or more components, devices, processes, techniques, and/or algorithms, etc., based at least in part on the determination or design of the one or more components, devices, processes, techniques, and/or algorithms, etc.

At 1308, the industrial automation system can be modified to incorporate or integrate the one or more components, devices, processes, techniques, and/or algorithms, etc. The performance enhancement component or another component(s) can modify the industrial automation system to incorporate or integrate the one or more components, devices, processes, techniques, and/or algorithms, etc. The industrial automation system, as modified, can perform (e.g., automatically or dynamically perform) the one or more preferred (formerly user) actions in connection with the associated work task for the industrial automation system, rather than having the user or another user perform the one or more preferred user actions. As desired, the performance enhancement component can store information relating to the automating of the one or more preferred user actions in the data store.

FIG. 14 illustrates a flow diagram of another example method 1400 that can facilitate determining one or more alternate user actions that a user can perform to complete a work task(s) to achieve a same or substantially same performance result as when the work task(s) is completed by a user (e.g., another user) by performing one or more user actions (e.g., preferred user actions), in accordance with various aspects and embodiments of the disclosed subject matter. In some instances, a first user is able to perform one or more user actions (e.g., preferred user actions) to complete a work task in connection with the industrial automation system that produces a favorable performance or response by the industrial automation system, where, unfortunately, a second user may not be able to perform the one or more user actions that the first user was able to perform when trying to complete the work task. For example, the second user may have physical limitations or other limitations that can make it difficult, if not impossible, for the second user to perform the one or more user actions the way the first user was able to perform them. The method 1400 can be employed to determine one or more alternate user actions that can be performed by the second user to complete a work task(s) to achieve a same or substantially same performance result as when the work task(s) is completed by the first user through performing one or more user actions (e.g., preferred user actions).

The method 1400 can be implemented by a training system that can comprise a performance enhancement component and/or another component(s) (e.g., a collection component, a cloud-based data store, etc.). In some implementations, the method 1400 can proceed from reference point A of method 1200, wherein a preferred user action(s) has been determined or identified in connection with a work task associated with an industrial automation system.

At 1402, data relating to the one or more preferred user actions relating to the work task(s) associated with the industrial automation system can be analyzed. The performance enhancement component can analyze data relating to the one or more preferred user actions to facilitate determining one or more alternate user actions that another user can perform to complete the work task(s), or a substantially similar work task(s), to facilitate obtaining the same or substantially the same performance results by the industrial automation system as the performance results derived from the performing of one or more preferred user actions to complete the work task in connection with operation of the industrial automation system. The performance enhancement component At 1404, physical elements, mental elements, and/or other elements involved in the performance of the one or more preferred user actions to complete the work task(s) can be determined based at least in part on the analysis results. The performance enhancement component can determine or identify the physical elements, mental elements, and/or other elements involved in the performance of the one or more preferred user actions by the user to complete the work task(s) can be determined based at least in part on the analysis results. The physical elements can comprise or can relate to, for example, physical movements, physical speed of the movements, physical accuracy of the movements, etc., of the user with respect to the performance of the one or more preferred user actions. The mental elements can comprise or can relate to, for example, a type of action the user has taken in response to a condition of the industrial automation system, a reaction time of the user to the condition, etc. The performance enhancement component can determine or derive the mental elements from the actions taken by the user with respect to performing the one or more preferred user actions.

At 1406, the physical skills, work skills, intelligence, and/or other factors of the second user can be determined. The performance enhancement component can determine the physical skills, work skills, intelligence, and/or other factors (e.g., work-related and/or performance-related characteristics) of the second user based at least in part on data analysis results relating to the physical skills, work skills, intelligence, and/or other factors of the second user.

At 1408, differences between the physical elements, mental elements, and/or other elements involved in the performance of the one or more preferred user actions to complete the work task(s) and the physical skills, work skills, intelligence, and/or other factors of the second user can be determined, based at least in part on the results of the data analysis. The performance enhancement component can compare or evaluate the physical elements, mental elements, and/or other elements involved in the performance of the one or more preferred user actions to complete the work task(s) in relation to the physical skills, work skills, intelligence, and/or other factors of the second user. This can facilitate enabling the performance enhancement component to determine alternate user actions that the second user can have the ability to perform to achieve the same or substantially the same performance results by the industrial automation system as the performance results derived from the performing of one or more preferred user actions to complete the work task.

At 1410, one or more alternate user actions, which can be performed to complete the work task(s) in place of a preferred user action(s) of the one or more preferred user actions, can be determined based at least in part on the differences between the physical elements, mental elements, and/or other elements involved in the performance of the one or more preferred user actions to complete the work task(s) and the physical skills, work skills, intelligence, and/or other factors of the second user. The performance enhancement component can determine the one or more alternate user actions, which can be performed by the second user (or another user) in place of a preferred user action(s) of the one or more preferred user actions, to facilitate completing the work task(s) to achieve the same or substantially same result in a different way (e.g., to achieve the same or substantially same favorable performance as can be achieved by performing the one or more preferred user actions). For example, the preferred user actions may comprise four user actions, wherein the performance enhancement component can determine that the second user is able to perform three of the user actions in a manner that is the same or substantially the same as the first user, but due to physical limitations of the second user, the second user is not able to perform the fourth preferred user action in the way that the first user was able to perform it. The performance enhancement component can determine one or more alternate user actions that the second user can perform (e.g., can be physically capable of performing) in place of the fourth preferred user action, wherein performing the one or more alternate user actions can achieve the same or substantially the same result as performing the fourth preferred user action. Employing the method 1400, the performance enhancement component can determine different types of alternate user actions with regard to a work task for different users based at least in part on the respective physical skills, work skills, intelligence, and/or other factors of the different users.

At 1412, a training presentation, comprising information relating to the one or more alternate user actions, can be generated. The training presentation can be or comprise, for example, a video (e.g., an animated video), a visual illustration, an audio presentation, printed materials (e.g., written instructions), and/or a placard, presenting or illustrating the one or more alternate user actions and/or one or more of the preferred user actions (e.g., the sequence of alternate user actions and/or preferred user actions that the second user is able to perform to complete the work task(s)). The training presentation can be used to facilitate training the second user and/or another user(s) to perform the work task(s) associated with the industrial automation system.

Figure 15:
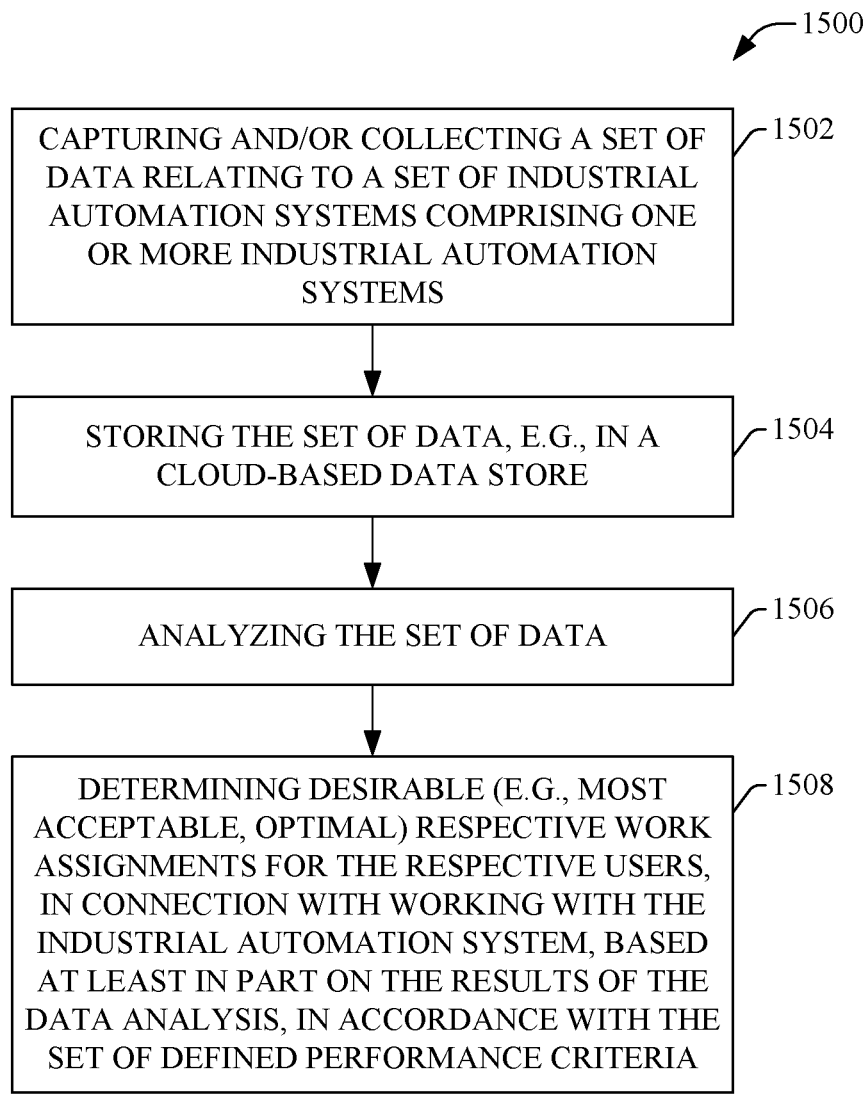
FIG. 15 illustrates a flow diagram of another example method that can facilitate desirably (e.g., acceptably, optimally, etc.) determining respective assignments for respective users who perform work tasks in connection with an industrial automation system, in accordance with various aspects and embodiments of the disclosed subject matter.

FIG. 15 presents a flow diagram of an example method 1500 that can facilitate desirably (e.g., acceptably, optimally, etc.) determining respective assignments for respective users who perform work tasks in connection with an industrial automation system, in accordance with various aspects and embodiments of the disclosed subject matter. The method 1500 can be implemented by a training system that can comprise a performance enhancement component and/or another component(s) (e.g., a cloud-based collection component, a cloud-based data store, etc.).

At 1502, a set of data relating to a set of industrial automation systems comprising one or more industrial automation systems can be captured and/or collected. The training system can comprise a collection component that can capture and/or collect the set of data relating to the set of industrial automation systems. The set of data can comprise data relating to industrial devices, industrial assets, industrial processes, and network devices, associated with the one or more industrial automation systems of the set of industrial automation systems. The set of data also can include user-related data or customer-related data. For example, the user-related data can comprise data relating to the interactions or behaviors of respective users (e.g., operators, managers, technicians, etc.) in connection with an industrial automation system(s) as those respective users perform their respective work tasks. The set of industrial automation systems can be associated with one or more industrial enterprises. The training system can comprise other features or functions, such as those features or functions disclosed herein.

At 1504, the set of data can be stored, for example, in a cloud-based data store. The collection component can facilitate storing the set of data in the data store.

At 1506, the set of data can be analyzed. The performance enhancement component can access the cloud-based data store and can retrieve, obtain, or read the set of data from the cloud-based data store. The performance enhancement component can analyze the set of data (e.g., perform big data analysis on the set of data) to facilitate desirably (e.g., acceptably, optimally, etc.) determining or identifying respective work assignments for respective users who perform work tasks in connection with an industrial automation system.

At 1508, desirable (e.g., most acceptable, optimal) respective work assignments for the respective users, in connection with working with the industrial automation system, can be determined based at least in part on the results of the data analysis, in accordance with the set of defined performance criteria. For example, in connection with operation of the industrial automation system, the work assignments can comprise a first work assignment associated with performing a first set of tasks in relation to a first portion (e.g., industrial process, subset of industrial devices, etc.) of the industrial automation system and a second work assignment associated with performing a second set of tasks in relation to a second portion of the industrial automation system, wherein a first user and a second user each can be at least minimally qualified to perform the first work assignment or the second work assignment. The performance enhancement component can analyze the set of data and can determine that the set of data indicates that the performance or response of industrial automation system will be more favorable if the first user is assigned to perform the first work assignment and the second user is assigned to perform the second work assignment as compared to the performance or response of the industrial automation system if the first user is assigned to perform the second work assignment and the second user is assigned to perform the first work assignment. Based at least in part on this analysis result, the performance enhancement component can determine that the first user is to be assigned, or at least is recommended by the performance enhancement component to be assigned, to perform the first work assignment and the second user is to be assigned, or at least is recommended by the performance enhancement component to be assigned, to perform the second work assignment.

The performance enhancement component can provide (e.g., present, transmit, print, etc.) the desirable (e.g., most acceptable, optimal) respective work assignments for the respective users, in connection with working with the industrial automation system, as an output (e.g., via a display screen, a message, a printout, etc.).

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 16:
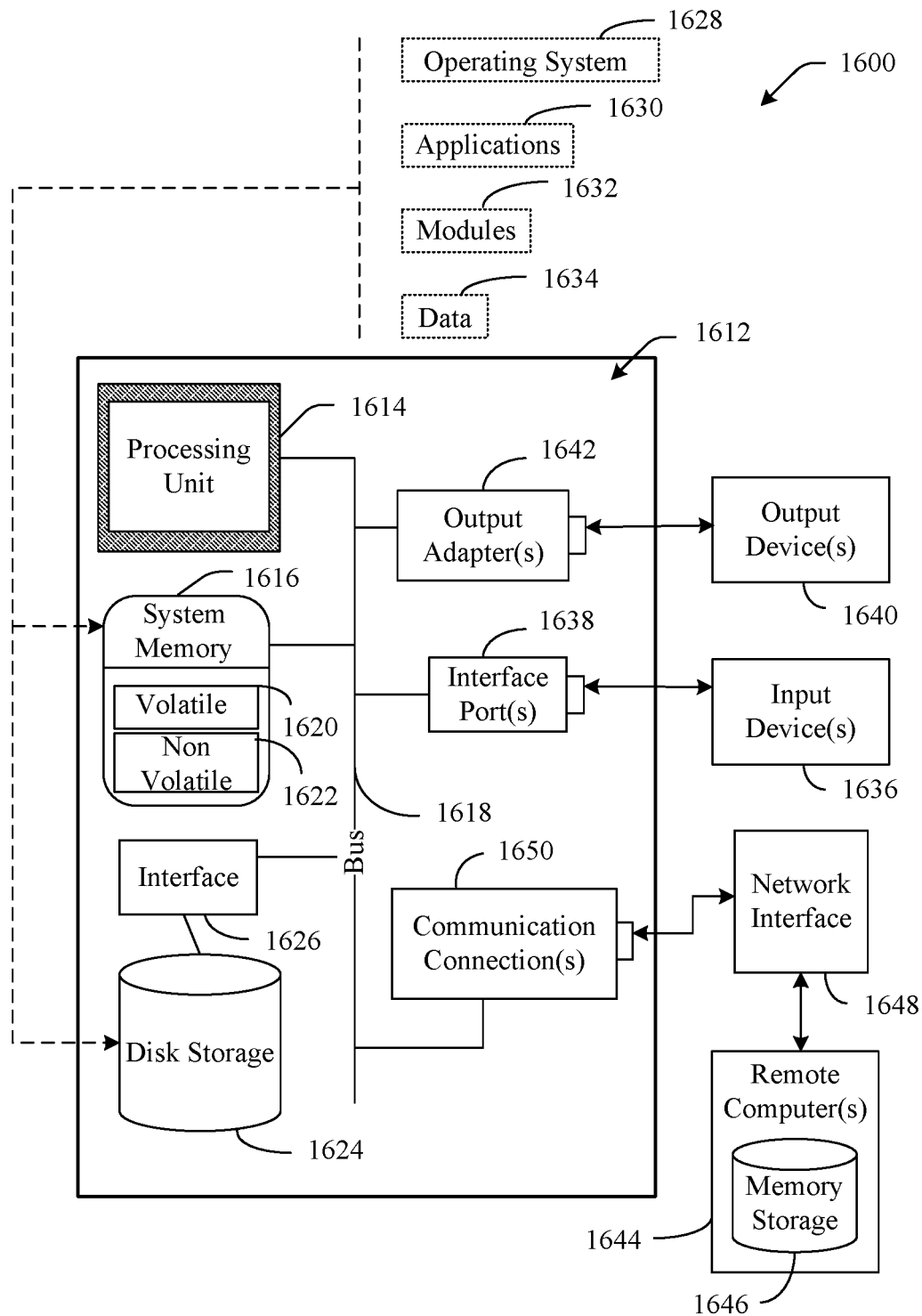
FIG. 16 is an example computing and/or operating environment.
Figure 17:
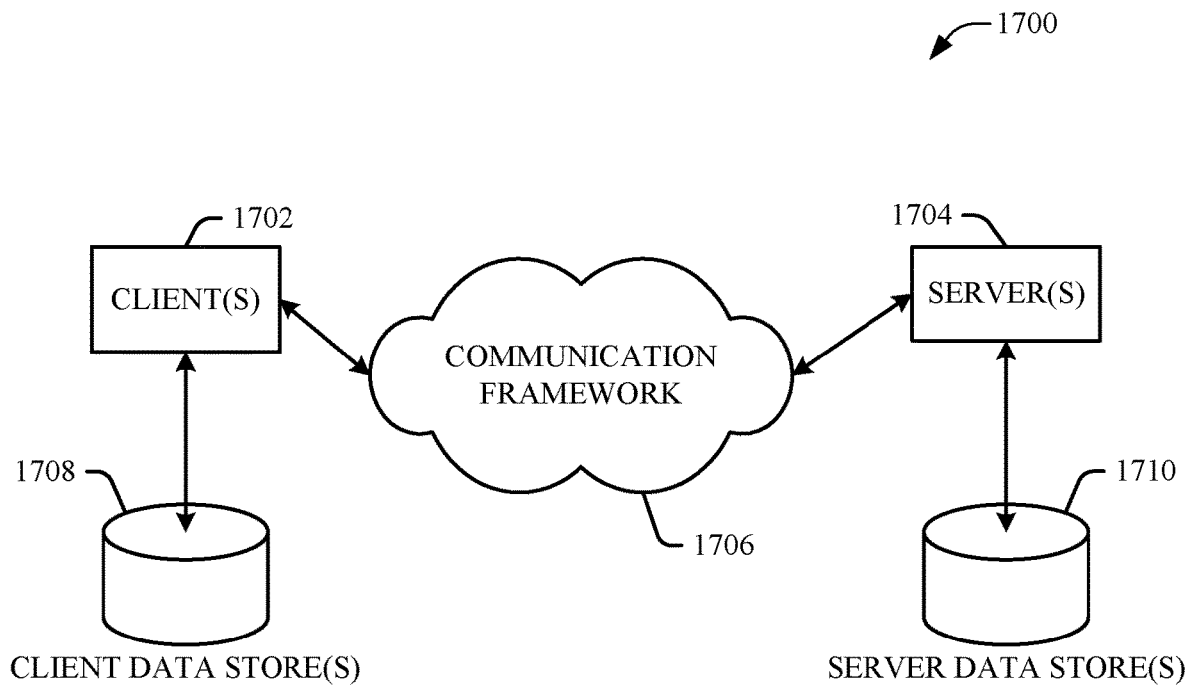
FIG. 17 is an example computing and/or networking environment.

In order to provide a context for the various aspects of the disclosed subject matter, FIGS. 16 and 17 as well as the following discussion are intended to provide a brief, general description of a suitable environment in which the various aspects of the disclosed subject matter can be implemented.

With reference to FIG. 16, an example environment 1600 for implementing various aspects of the aforementioned subject matter includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Multi-core microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable PROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/non-volatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1624 to the system bus 1618, a removable or non-removable interface is typically used such as interface 1626.

It is to be appreciated that FIG. 16 describes software that acts as an intermediary between users and the basic computer resources described in suitable operating environment 1600. Such software includes an operating system 1628. Operating system 1628, which can be stored on disk storage 1624, acts to control and allocate resources of the computer 1612. System applications 1630 take advantage of the management of resources by operating system 1628 through program modules 1632 and program data 1634 stored either in system memory 1616 or on disk storage 1624. It is to be appreciated that one or more embodiments of the subject disclosure can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapters 1642 are provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the system bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

FIG. 17 is a schematic block diagram of a sample computing and/or networking environment 1700 with which the disclosed subject matter can interact. The computing and/or networking environment 1700 can include one or more clients 1702. The client(s) 1702 can be hardware and/or software (e.g., threads, processes, computing devices). The computing and/or networking environment 1700 also can include one or more servers 1704. The server(s) 1704 can also be hardware and/or software (e.g., threads, processes, computing devices). The servers 1704 can house threads to perform transformations by employing one or more embodiments as described herein, for example. One possible communication between a client 1702 and servers 1704 can be in the form of a data packet adapted to be transmitted between two or more computer processes. The computing and/or networking environment 1700 can include a communication framework 1706 that can be employed to facilitate communications between the client(s) 1702 and the server(s) 1704. The client(s) 1702 are operably connected to one or more client data stores 1708 that can be employed to store information local to the client(s) 1702. Similarly, the server(s) 1704 are operably connected to one or more server data stores 1710 that can be employed to store information local to the servers 1704.

What has been described above includes examples of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores computer-executable components; and
a processor, operatively coupled to the memory, that executes the computer-executable components, the computer-executable components comprising:
a collection component configured to collect a set of data associated with a set of devices of an industrial automation system, and store the set of data in a data store that is part of a cloud platform; and
a performance enhancement component configured to determine a correlation between performance of industrial automation work tasks associated with operation of the industrial automation system and a defined favorable performance of the industrial automation system, based on a first result of an analysis of at least a portion of the set of data, to facilitate improvement of performance of the industrial automation system,
wherein, based on the first result of the analysis, the performance enhancement component is configured to determine an action of a user that is performed as part of performance of an industrial automation work task of the industrial automation work tasks and correlates with the defined favorable performance of the industrial automation system,
wherein, as part of the analysis, the performance enhancement component simulates the action of the user to facilitate determining whether the action is able to be automated to have a component or a subset of devices of the set of devices perform the action,
wherein, in response to the performance enhancement component determining based on the simulation of the action, that the action is able to be automated to have the component or the subset of devices perform the action, and based on a second result of the analysis of at least the portion of the set of data, the performance enhancement component is configured to design and generate the component or machine-executable code that emulates performance of the action to automate the performance of the action by having the component or the subset of devices in response to execution of the machine-executable code, perform the action in the industrial automation system in place of the user, wherein, to facilitate the designing, the performance enhancement component simulates operation of the component or the subset of devices, based on the machine-executable code, to verify that the component or the subset of devices perform the action in accordance with a defined performance criterion relating to the defined favorable performance, and
wherein the component or the subset of devices perform the action based on the machine-executable code.

2. The system of claim 1, wherein the action is a first action, wherein the industrial automation work tasks comprise a second industrial automation work task, and wherein the performance enhancement component is further configured to determine performance of a second action as part of performance of the second industrial automation work task associated with the operation of the industrial automation system results in a defined unfavorable performance of the industrial automation system, based on another result of at least another analysis of another portion of the set of data.

3. The system of claim 2, wherein the performance enhancement component is further configured to determine a modification relating to the performance of the second action as part of the second industrial automation work task, based on the other result of the other analysis, to facilitate the improvement of the performance of the industrial automation system.

4. The system of claim 3, wherein the defined performance criterion is a first defined performance criterion, wherein the performance enhancement component is further configured to modify a simulation model of the industrial automation system, based on the modification, to generate a modified simulation model, wherein the modified simulation model facilitates simulation of a modified industrial automation system that results from implementation of the modification in the industrial automation system,
wherein the performance enhancement component is further configured to determine a predicted response of the modified industrial automation system under a set of operating conditions, based on the modified simulation model, and
wherein, based on the predicted response, the performance enhancement component is further configured to determine whether performance of the modified industrial automation system satisfies a second defined performance criterion relating to a favorable performance of the modified industrial automation system.

5. The system of claim 3, wherein the performance enhancement component is further configured to generate a set of instructions relating to the modification and communicate the set of instructions to at least one of a device of the set of devices or the user associated with the industrial automation system, to facilitate implementation of the modification relating to the performance of the second action.

6. The system of claim 1, wherein the performance enhancement component is further configured to determine operational responses of a device of the set of devices under various operating conditions over a period of time and, based on the operational responses of the device, generate a virtual device that at least one of simulates or emulates operation of the device under the various operating conditions, and wherein the virtual device is usable in a simulation model of the industrial automation system to simulate performance of the device or the industrial automation system under the various operating conditions.

7. The system of claim 1, wherein at least one of the collection component or the performance enhancement component is part of the cloud platform.

8. The system of claim 7, further comprising an interface component configured to interface the cloud platform with the industrial automation system via a cloud gateway device of the industrial automation system to facilitate communication of the set of data from the industrial automation system to at least one of the collection component or the performance enhancement component.

9. The system of claim 1, further comprising:
a set of sensor components associated with at least one of the industrial automation system or a set of users associated with the industrial automation system, wherein the set of sensor components is configured to sense conditions associated with at least one of the industrial automation system or the set of users, and generate a subset of the set of data based on the conditions associated with at least one of the industrial automation system or the set of users.

10. The system of claim 1, wherein the set of data comprises at least one of first data relating to an industrial device of the set of devices, second data relating to an industrial process associated with the set of devices, third data relating to an industrial asset associated with the industrial automation system, fourth data relating to a network-related device of the set of devices that facilitates data communications associated with the industrial automation system, fifth data relating to an operating system associated with the industrial automation system, sixth data relating to software associated with the industrial automation system, seventh data relating to firmware associated with the industrial automation system, eighth data relating to the user of a set of users associated with the industrial automation system, ninth data associated with a communication device associated with the user, or tenth data relating to at least one customer entity associated with the industrial automation system.

11. A method, comprising:
receiving, by a system comprising a processor, a set of data associated with a set of devices of an industrial automation system for storage in a data store associated with a cloud platform that is associated with the industrial automation system;
determining, by the system, a correlation between performance of a first portion of automation-related work tasks associated with operation of the industrial automation system and a defined favorable performance result of the industrial automation system, based on a first result of a first analysis of at least a first portion of the set of data, to facilitate enhancing performance of the industrial automation system, wherein the first portion of automation-related work tasks comprises an automation-related work task, and wherein a group of actions, comprising a first action and a second action, is performed to perform the industrial automation work task;
based on the first result of the first analysis, determining, by the system, a work action of a user that is performed as part of the performance of the first portion of automation-related work tasks and correlates with the defined favorable performance result of the industrial automation system, in accordance with a defined performance criterion;
determining, by the system, whether a component or a subset of devices of the set of devices is able to perform the work action of the user to automate performance of the work action based on a simulation of the work action of the user; and
in response to determining, based on the simulation of the work action, that the component or the subset of devices is able to perform the work action, and based on a second result of the first analysis, designing, by the system, the component or executable code that emulates performance of the work action to automate the performance of the work action by having the component or the subset of devices perform the work action in the industrial automation system in place of the user, wherein the component or the executable code is generated based on the designing, wherein, to facilitate the designing, operation of the component or the subset of devices is simulated, based on the machine-executable code, to verify that the component or the subset of devices is able to perform the work action in accordance with the defined performance criterion relating to the defined favorable performance, and wherein the component or the subset of devices perform the work action based on execution of the executable code.

12. The method of claim 11, wherein the defined performance criterion is a first defined performance criterion, and wherein the method further comprises:
based on a third result of a second analysis of a second portion of the set of data, determining, by the system, that performance of a second work action as part of performance of a second automation-related work task associated with the operation of the industrial automation system does not satisfy a second defined performance criterion relating to favorable performance of the industrial automation system.

13. The method of claim 12, further comprising:
determining, by the system, a modification to modify the performance of the second action associated with the operation of the industrial automation system, based on the second result of the second analysis, to facilitate the enhancing of the performance of the industrial automation system.

14. The method of claim 13, further comprising:
at least one of:
generating, by the system, instructions relating to the modification, wherein the instructions facilitate implementing the modification in connection with the industrial automation system, or
generating, by the system, a recommendation that recommends that the modification be implemented in connection with the industrial automation system; and
transmitting, by the system, at least one of the instructions or the recommendation to at least one of a device of the set of devices or the user associated with the industrial automation system, to facilitate implementing the modification in connection with the industrial automation system.

15. The method of claim 11, further comprising:
determining, by the system, operational responses of an industrial process associated with at least one device of the set of devices under various operating conditions over a period of time; and
based on the operational responses of the industrial process, generating, by the system, a virtual industrial process that at least one of simulates or emulates performance of the industrial process under the various operating conditions, and wherein the virtual industrial process is included in a simulation model of the industrial automation system to simulate performance of the virtual industrial process or the industrial automation system under the various operating conditions.

16. The method of claim 11, wherein the first analysis of at least the first portion of the set of data comprises analyzing a subset of data relating to the work action and how the performance of the work action correlates with the defined favorable performance of the industrial automation system, and wherein the method further comprises:
based on the first analysis, determining, by the system, that the component or the subset of devices is able to perform the work action of the user in connection with the operation of the industrial automation system to automate the performance of the work action;
based on the designing of the component or the executable code, generating, by the system, the component or the executable code that emulates the performance of the work action to automate the performance of the work action by having the component or the subset of devices perform the work action in the industrial automation system in place of the user; and
modifying, by the system, the industrial automation system to incorporate the component or the executable code into the industrial automation system.

17. The method of claim 11, further comprising:
detecting, by the system, conditions associated with at least one of the industrial automation system or the performance of the first portion of automation-related work tasks associated with the operation of the industrial automation system; and
generating, by the system, a subset of the set of data based on the conditions associated with at least one of the industrial automation system or the performance of the first portion of automation-related work tasks.

18. The method of claim 11, further comprising:
interfacing, by the system, the cloud platform with the industrial automation system; and
monitoring, by the system, the industrial automation system via the interfacing of the cloud platform with the industrial automation system to facilitate the receiving of the set of data and the storage of the set of data in the data store, wherein the data store is located in the cloud platform.

19. A non-transitory machine-readable storage medium storing executable instructions that, in response to execution, cause a system comprising a processor to perform operations, comprising:
analyzing at least a portion of a set of data associated with a set of devices of an industrial automation system, wherein the set of data is obtained from the set of devices via an interface between a cloud platform and the industrial automation system and stored in a data store of the cloud platform;
determining a correlation between performance of a first portion of industrial-automation-related work tasks relating to operation of the industrial automation system and a defined favorable performance result of the industrial automation system, based on a first result of analyzing at least a portion of the set of data, to facilitate enhancing performance of the industrial automation system, wherein the first portion of industrial-automation-related work tasks comprises an industrial-automation-related work task;
based on the first result of the analyzing, determining an action of a user that is performed in connection with performance of the industrial-automation-related work task and correlates with the defined favorable performance result of the industrial automation system;
simulating the action of the user to facilitate determining whether the action is able to be automated to have a component or a subset of devices of the set of devices perform the action; and
in response to determining, based on the simulating of the action, that the action is able to be automated to have the component or the subset of devices perform the action, and based on a second result of the analyzing of at least the portion of the set of data, determining the component or executable code that emulates performance of the action to automate the performance of the action by enabling at least one of the component or the subset of devices to perform the action in the industrial automation system in place of the user, wherein, in connection with the determining the component or executable code that emulates performance of the action, operation of the component or the subset of devices is simulated, based on the executable code, to verify that the component or the subset of devices perform the action in satisfaction of a defined performance criterion relating to the defined favorable performance result, wherein the component or the executable code is generated based on the determining the component or the executable code, and wherein the component or the subset of devices perform the action in response to execution of the executable code.

20. The non-transitory machine-readable storage medium of claim 19, wherein the operations further comprise:
determining that performance of a second portion of industrial-automation-related work tasks relating to the operation of the industrial automation system does not achieve the defined favorable performance result of the industrial automation system, based on a third result of a second analysis of at least a second portion of the set of data;
determining a modification relating to the performance of the second portion of industrial-automation-related work tasks associated with the operation of the industrial automation system, based at least in part on the third result of the second analysis, to facilitate the enhancing of the performance of the industrial automation system; and
transmitting a set of instructions relating to the modification to at least one of a device of the set of devices or the user associated with the industrial automation system, to facilitate implementation of the modification relating to the performance of the second portion of industrial-automation-related work tasks.

* * * * *